(12) United States Patent
Yamada et al.

(10) Patent No.: US 11,106,125 B2
(45) Date of Patent: Aug. 31, 2021

(54) TRANSPARENT SCREEN, IMAGE PROJECTION LAMINATED PLATE, IMAGE DISPLAY SYSTEM, AND METHOD FOR PRODUCING TRANSPARENT SCREEN

(71) Applicant: AGC Inc., Chiyoda-ku (JP)

(72) Inventors: Naruki Yamada, Tokyo (JP); Yukihiro Tao, Tokyo (JP); Tsuneo Ichimatsu, Tokyo (JP); Yusuke Sato, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/837,022

(22) Filed: Apr. 1, 2020

(65) Prior Publication Data

US 2020/0233297 A1  Jul. 23, 2020

Related U.S. Application Data

(63) Continuation of application No. PCT/JP2018/038890, filed on Oct. 18, 2018.

(30) Foreign Application Priority Data

Oct. 24, 2017  (JP) .............................. JP2017-205634

(51) Int. Cl.
  *G03B 21/62*  (2014.01)
  *B60K 35/00*  (2006.01)
  (Continued)

(52) U.S. Cl.
  CPC .............. *G03B 21/62* (2013.01); *B60K 35/00* (2013.01); *G02B 5/045* (2013.01); *G02B 5/1857* (2013.01);
  (Continued)

(58) Field of Classification Search
  CPC .... G03B 21/625; G03B 21/60; G03B 21/602; G03B 21/56; G02B 5/045
  (Continued)

(56) References Cited

U.S. PATENT DOCUMENTS 4,277,145 A * 7/1981 Hareng .................. G02F 1/135
  349/20
4,357,074 A * 11/1982 Nardini ..................... E06B 9/24
  359/592

(Continued)

FOREIGN PATENT DOCUMENTS

JP  2008-216592 A  9/2008
JP  2012-83538 A  4/2012
  (Continued)

*Primary Examiner* — Clayton E. LaBalle
*Assistant Examiner* — Kevin C Butler
(74) *Attorney, Agent, or Firm* — Oblon, McClelland, Maier & Neustadt, L.L.P.

(57) ABSTRACT

A transparent screen, wherein a direction normal to a reference surface is defined as a first direction, a direction which is perpendicular to the first direction and in which each reflective inclined surface extends as seen from the first direction is defined as a second direction, and a direction which is perpendicular to the first direction and the second direction and in which the reflective inclined surfaces are arranged side by side is defined as a third direction, and in at least a part of an image projection area, to which the image is projected, in a section perpendicular to the second direction, the reflective inclined surfaces are formed so that inclination angles of the reflective inclined surfaces, measured on a per-respective reflective inclined surface basis, decrease, in a stepwise manner or continuously, away from one end in the third direction toward another end in the third direction.

18 Claims, 51 Drawing Sheets

(51) Int. Cl.
  *G02B 5/18* (2006.01)
  *G03B 21/602* (2014.01)
  *G02B 5/04* (2006.01)
  *G03B 21/56* (2006.01)
  *G03B 21/60* (2014.01)
  *G03B 21/625* (2014.01)
  *H04N 9/31* (2006.01)

(52) U.S. Cl.
  CPC ............. *G03B 21/56* (2013.01); *G03B 21/60* (2013.01); *G03B 21/602* (2013.01); *G03B 21/625* (2013.01); *B60K 2370/1529* (2019.05); *H04N 9/3141* (2013.01)

(58) Field of Classification Search
  USPC .......................................................... 359/454
  See application file for complete search history.

(56) References Cited

U.S. PATENT DOCUMENTS

| | | | | |
|---|---|---|---|---|
| 5,999,314 | A | * | 12/1999 | Asakura ............... G02B 5/3066 359/485.02 |
| 2003/0058390 | A1 | * | 3/2003 | Fujii ..................... G02B 5/045 349/113 |
| 2008/0304150 | A1 | * | 12/2008 | Yamauchi .............. G03B 21/60 359/459 |
| 2017/0008295 | A1 | | 1/2017 | Osakabe et al. |
| 2019/0030856 | A1 | * | 1/2019 | Hayasaki ........... G02B 27/0101 |

FOREIGN PATENT DOCUMENTS

| | | | | |
|---|---|---|---|---|
| JP | 2015-179201 | A | 10/2015 | |
| JP | 2015179201 | * | 10/2015 | ............. B60R 11/02 |
| JP | WO 2015/186668 | A1 | 12/2015 | |
| JP | 2017156452 | * | 7/2017 | ............... G02B 3/08 |
| JP | 2017-156452 | A | 9/2017 | |
| JP | 2018-109687 | A | 7/2018 | |

* cited by examiner

FIG.34
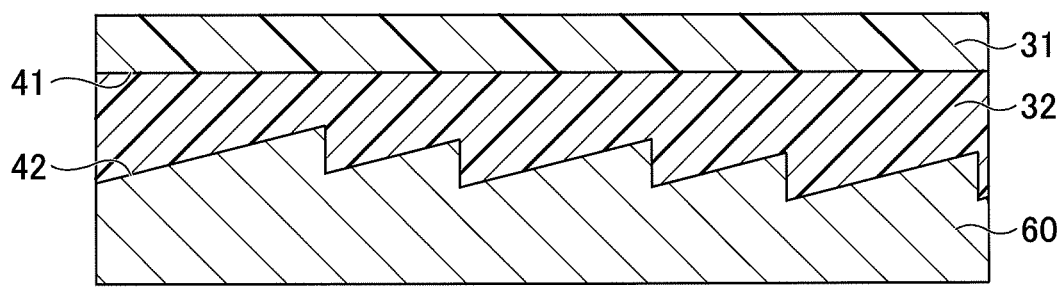
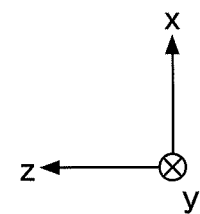
FIG.35
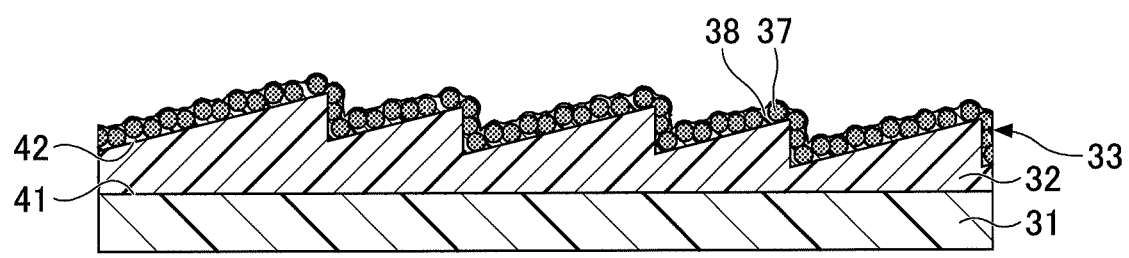
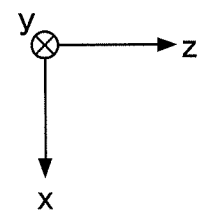

FIG.36
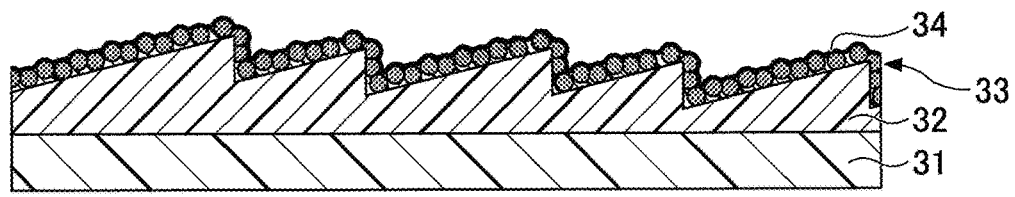
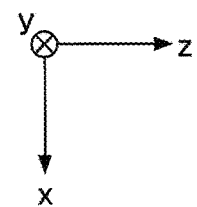
FIG.37
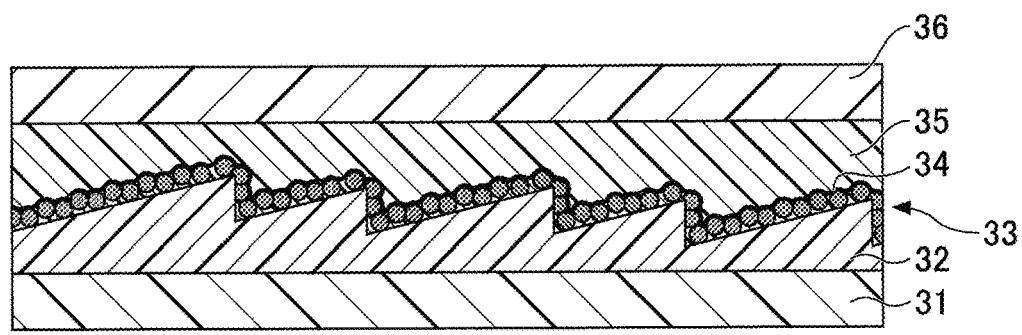
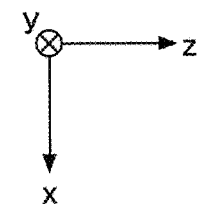

TRANSPARENT SCREEN, IMAGE PROJECTION LAMINATED PLATE, IMAGE DISPLAY SYSTEM, AND METHOD FOR PRODUCING TRANSPARENT SCREEN

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2018/038890 filed on Oct. 18, 2018 and designating the U.S., which claims priority to Japanese Patent Application No. 2017-205634 filed on Oct. 24, 2017. The entire contents of the foregoing applications are incorporated herein by reference.

BACKGROUND OF THE INVENTION

1. Field of the Invention

The present invention relates to a transparent screen, an image projection-laminated plate, an image display system, and a method for producing the transparent screen.

2. Description of the Related Art

An image projection structure described in PTL 1 includes a first transparent layer having a random unevenness formed on its surface, a reflective film formed on a surface of the first transparent layer where the random unevenness is formed, and a second transparent layer formed on the reflective film. This image projection structure functions as a transparent window in a case where an image is not projected, and functions as a screen when an image is projected. PTL 1: International Publication No. 2015/186668

SUMMARY OF THE INVENTION

Problems to be Solved by the Invention

FIG. 39 is a figure illustrating a conventional transparent screen. A conventional transparent screen 120 displays an image projected by a projector 112 for an observer 113. The transparent screen 120 includes a first transparent layer 132, a reflective layer 133 configured to reflect light of a projected image, and a second transparent layer 135 arranged at an opposite side of the reflective layer 133 from the first transparent layer 132. The first transparent layer 132 includes unevenness on a flat surface that is in contact with the reflective layer 133. Along this unevenness, the reflective layer 133 is formed.

Incidentally, a phenomenon referred to as "hotspot" may occur. The hotspot is a phenomenon in which the center of a screen appears to be shining brightly when an image is projected from a projector onto the screen. The hotspot is caused by specular reflection of incident light on the surface of the screen that is in contact with the open air, and is observed in the specular direction.

Conventionally, the direction in which a hotspot is observed is the same as the direction in which a bright image is observed. There does not exist any direction in which the entire image can be observed brightly. When the image is observed from any given direction, there is a great difference between the brightness of an image-central portion and the brightness at an outer edge of the image.

It is an object of the present disclosure to provide a transparent screen capable of separating a direction in which a hotspot is observed and a direction in which a bright image is observed, and capable of producing a direction in which the entire image can be observed brightly.

Means for Solving the Problems

According to an aspect of the present disclosure, provided is a transparent screen including a first transparent layer, a reflective layer configured to reflect light of a projected image, and a second transparent layer disposed at an opposite side of the reflective layer from the first transparent layer, the transparent screen allowing background scenery to be seen, wherein when an opposite surface of the first transparent layer from the reflective layer is defined as a reference surface, the reflective layer includes a plurality of reflective inclined surfaces inclined with respect to the reference surface and reflecting light of the image, the plurality of reflective inclined surfaces have unevenness, and are formed in a stripe pattern as seen from a direction normal to the reference surface, the direction normal to the reference surface is defined as a first direction, a direction which is perpendicular to the first direction and in which each of the plurality of reflective inclined surfaces extend as seen from the first direction is defined as a second direction, and a direction which is perpendicular to the first direction and the second direction and in which the plurality of reflective inclined surfaces are arranged side by side is defined as a third direction, in at least a part of an image projection area, to which the image is projected, in a section perpendicular to the second direction, the plurality of reflective inclined surfaces are formed so that inclination angles of the plurality of reflective inclined surfaces, measured on a per-respective reflective inclined surface basis, decrease, in a stepwise manner or continuously, away from one end in the third direction toward another end in the third direction.

Advantageous Effects of Invention

According to a transparent screen of the present disclosure, a direction in which a hotspot is observed and a direction in which a bright image is observed can be separated, and a direction in which the entire image can be observed brightly can be produced.

BRIEF DESCRIPTION OF THE DRAWINGS

FIG. 34 is a drawing illustrating an example of a step for forming a plurality of inclined surfaces on a first transparent layer in a stripe pattern;

FIG. 35 is a drawing illustrating an example of a step for forming unevenness on the inclined surfaces of the first transparent layer;

FIG. 36 is a drawing illustrating an example of a step for forming a reflective layer;

FIG. 37 is a drawing illustrating an example of a step for forming a second transparent layer;

DETAILED DESCRIPTION OF THE PREFERRED EMBODIMENTS

Figure 1:
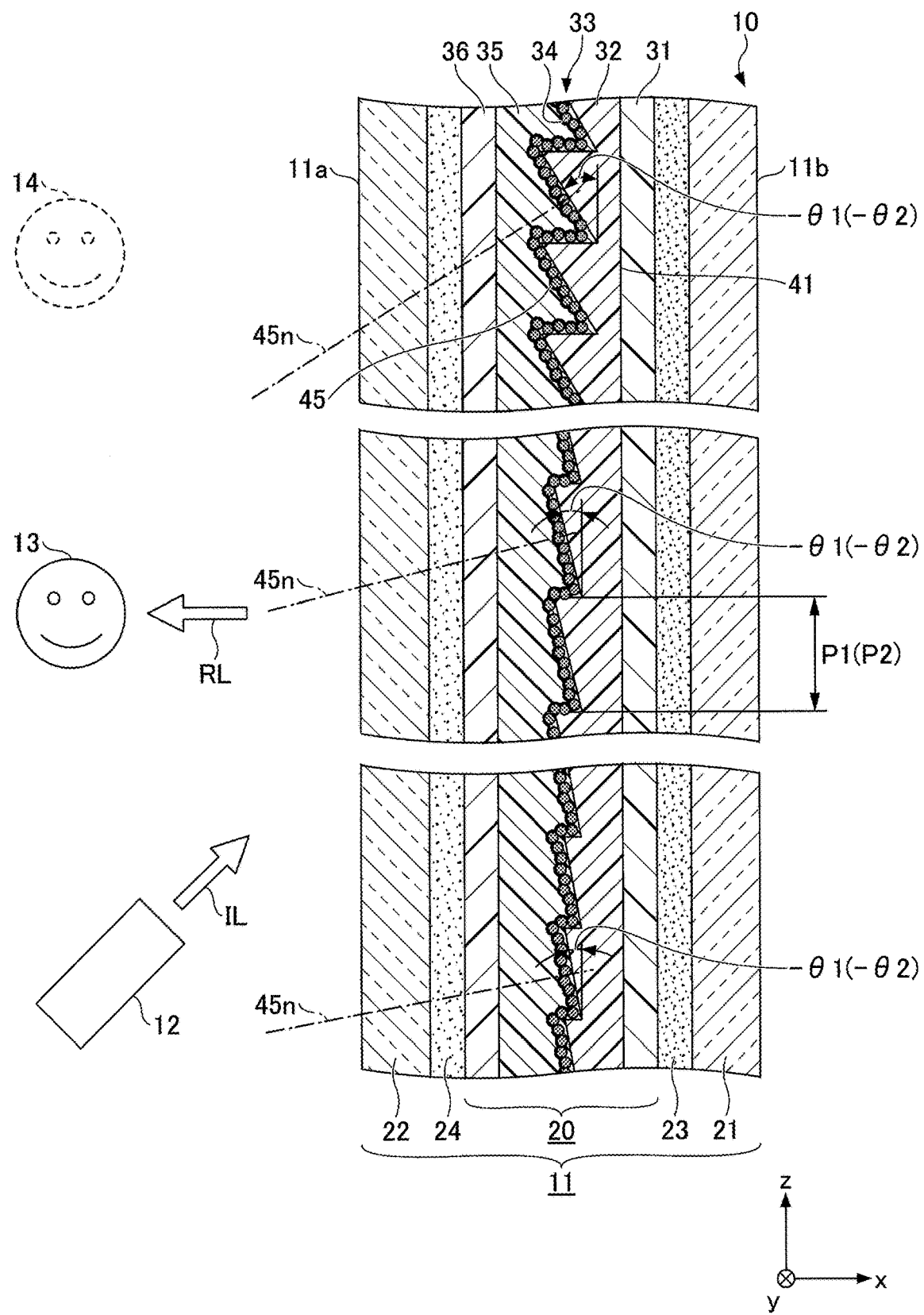
FIG. 1 is a drawing illustrating an image display system according to an embodiment.

Hereinafter, embodiments for implementing the present invention will be described with reference to the drawings. In the drawings, the same or corresponding components are denoted by the same or corresponding reference numerals, and description thereof is omitted. In this specification, an observer-side of a transparent screen will be referred to as a front side, and an opposite side of the transparent screen from the observer will be referred to as a rear side.

(Image Display System)

FIG. 1 is a drawing illustrating an image display system according to an embodiment. In FIG. 1, a structure of a transparent screen 20 is illustrated in an enlarged manner.

The image display system 10 includes an image projection-laminated plate 11 through which background scenery can be seen and a projector 12 projecting an image onto the image projection-laminated plate 11. The projector 12 is a generally used projector.

(Image Projection-Laminated Plate)

The image projection-laminated plate 11 displays, for an observer 13 at a front side, an image projected from the front side, and allows the observer 13 at the front side to see background scenery at the rear side. The background scenery at the rear side only needs to be visible when an image is not projected, and may be visible or invisible when an image is projected.

The image projection-laminated plate 11 includes a front surface 11a facing the front side and in contact with the open air and a rear surface 11b facing the rear side and in contact with the open air. Hotspots are generated by regular reflection of incident light IL on the front surface 11a and the rear surface 11b. A hotspot is observed at a position in a regular reflection direction (for example, a position of an observer 14 indicated by a broken line), and is not observed at other positions (for example, the position of the observer 13 indicated by a solid line).

The image projection-laminated plate 11 may be either a flat plate or a curved plate. The curved plate may have either a shape that is convex toward the observer 13 or a shape that is concave toward the observer 13.

The application of the image projection-laminated plate 11 is not particularly limited, but examples of applications of the image projection-laminated plate 11 include windows for vehicles such as cars and trains, windows for buildings, windows for show windows, windows for refrigerated showcases, and partitions for partitioning off an interior of a vehicle and an interior of a building.

The image projection-laminated plate 11 includes the transparent screen 20, a first transparent plate 21 arranged at one side (for example, a rear side) of the transparent screen 20, and a second transparent plate 22 arranged at the opposite side (for example, a front side) of the transparent screen 20.

The transparent screen 20 displays an image projected from the front side for the observer 13 at the front side, and allows the observer 13 at the front side to see the background scenery at the rear side. The structure of the transparent screen 20 will be described later.

(Transparent Plate)

For example, glass plates are used as the first transparent plate 21 and the second transparent plate 22. In this case, a laminated glass is obtained as the image projection-laminated plate 11. For example, a method for manufacturing laminated glass includes the following steps (1) to (3). (1) A laminate obtained by stacking, in this order, the first glass plate 21, the first adhesive layer 23, the transparent screen 20, the second adhesive layer 24, and the second glass plate 22 is placed in a vacuum bag. The stacking order may be reversed. (2) The vacuum bag is pressurized and heated in an atmosphere furnace and the like while the inside of the rubber vacuum bag in which the laminate is placed is evacuated. (3) The laminate removed from the vacuum bag is pressurized and heated in an autoclave.

Examples of glass for glass plates include soda lime glass, aluminosilicate glass, alkali-free glass, borosilicate glass, and the like. The glass may be either non-tempered glass or tempered glass. Non-tempered glass is obtained by forming molten glass into a plate and slowly cooling it. Examples of molding method include a float method and a fusion method. The tempered glass may be either a physically tempered glass or a chemically tempered glass. The physically tempered glass is a glass produced by tempering its glass surface by rapidly cooling a uniformly heated glass plate heated to a temperature at a softening point and causing compressive stress on the glass surface by a temperature difference between the glass surface and the inside of the glass. The chemically tempered glass is a glass obtained by tempering its glass surface by causing a compressive stress on the glass surface by an ion exchange method or the like.

The glass plate is either a flat plate or a curved plate. Examples of methods of bending formation for bending a flat plate into a curved plate include gravity formation, press formation, and the like. In the bending formation, the glass surface may be tempered by rapidly cooling a uniformly heated glass plate heated to a temperature at a softening point and causing compressive stress on the glass surface by a temperature difference between the glass surface and the inside of the glass. The physically tempered glass is thereby obtained. It should be noted that the chemically tempered glass is obtained by causing a compressive stress on the glass surface by an ion exchange method or the like after the bending formation.

The plate thickness of the glass plate is not particularly limited, but is, for example, 0.1 mm or more and 20 mm or less.

As the first transparent plate 21 and the second transparent plate 22, a resin plate may be used. One of the first transparent plate 21 and the second transparent plate 22 may be a glass plate, and the other thereof may be a resin plate. Also, the number of transparent plates included in the image projection-laminated plate may be three or more.

(Adhesive Layer)

The first adhesive layer 23 bonds the first transparent plate 21 and the transparent screen 20. Also, the second adhesive layer 24 bonds the second transparent plate 22 and the transparent screen 20. The thicknesses of the first adhesive layer 23 and the second adhesive layer 24 are not limited, but, for example, the thicknesses are 0.01 mm or more and 1.5 mm or less, preferably 0.3 mm or more and 0.8 mm or less.

The first adhesive layer 23 and the second adhesive layer 24 may be formed of different materials, but are preferably formed of the same material. The first adhesive layer 23 and the second adhesive layer 24 are made of, for example, thermoplastic resin, thermosetting resin, or UV curable resin, and are preferably formed of one or more types selected from vinyl polymer, ethylene-vinyl monomer copolymer, styrene copolymer, cycloolefin copolymer, polyurethane resin, urethane acrylate resin, fluorine resin, and acrylic resin.

Typical examples of the thermoplastic resin include polyvinyl butyral resin (PVB) and ethylene-vinyl acetate copolymer resin (EVA). A typical example of the thermosetting resin is urethane acrylate resin. In the case of thermoplastic resin or thermosetting resin, adhesive treatment is performed by heat treatment. In the case of UV-curable resin, bonding is performed by UV irradiation. Urethane acrylate resin can also be cured by ultraviolet light.

(Transparent Screen)

The transparent screen 20 displays, for an observer 13 at a front side, an image projected from the front side, and allows the observer 13 at the front side to see background scenery at the rear side. When the haze value of the transparent screen 20 is 10% or less, a sufficient degree of transparency is obtained and the background scenery can be seen clearly. The haze value of the transparent screen 20 is 0% or more. The haze values of glass plates used as the first transparent plate 21 or the second transparent plate 22 are usually 1% or less.

The haze value is measured in accordance with Japanese Industrial Standards (JIS K7136), and is derived as a percentage of transmitted light that has deviated by 2.5 degrees or more from incident light due to forward scatter, relative to transmitted light that has passed through a test plate, to be measured, in a plate thickness direction. As a light source used for measuring the haze value, an illuminant D65 described in Japanese Industrial Standards (JIS Z8720: 2012) is used.

The transparent screen 20 may not have flexibility, but may have flexibility so that the transparent screen 20 can be deformed into various shapes.

Figure 2:
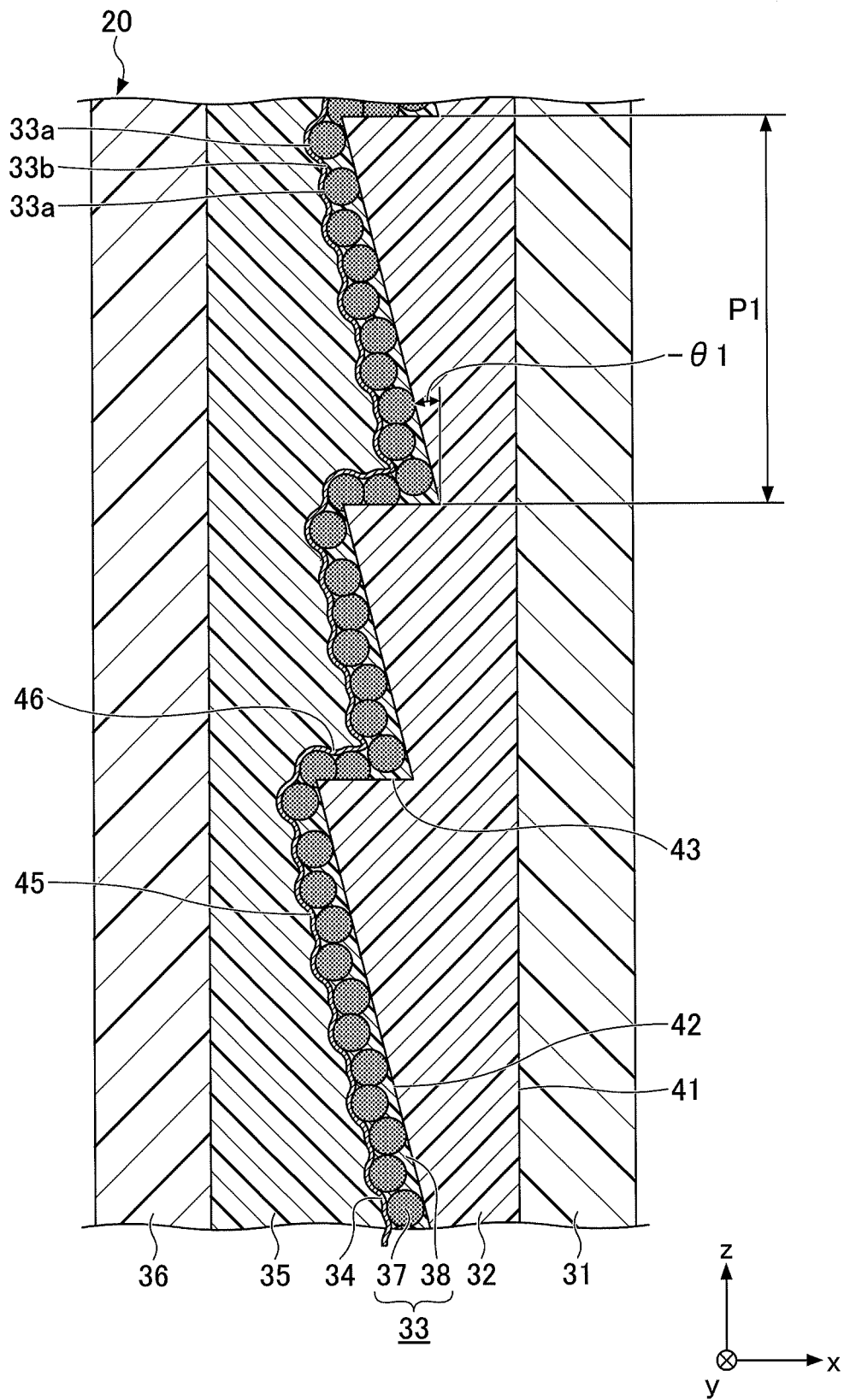
FIG. 2 is a drawing illustrating a transparent screen according to an embodiment.

FIG. 2 is a drawing illustrating a transparent screen according to an embodiment. In FIG. 2, the unevenness of reflective inclined surfaces 45 of a reflective layer 34 is overemphasized. The transparent screen 20 includes a base material sheet 31, a first transparent layer 32, a reflective layer 34, a second transparent layer 35, a protective sheet 36, and the like, which are arranged in this order from the rear side to the front side.

The base material sheet 31 may be either a transparent glass sheet or a transparent resin sheet, but is preferably a transparent resin sheet from the viewpoint of flexibility. The transparent resin sheet is made of, for example, polycarbonate, PET, PEN, cycloolefin polymer, or polyester.

The first transparent layer 32 is formed on a surface of the base material sheet 31, and has an unevenness on an opposite surface from the base material sheet 31. For example, the first transparent layer 32 is formed of a transparent resin. The resin may be any of light-curing resin, thermoplastic resin, and thermosetting resin, and, for example, the resin is molded by an imprint method. The first transparent layer 32 may be formed in a sawtooth shape in a cross section.

The reflective layer 34 is formed in a zigzag shape along the unevenness on the surface of the first transparent layer 32. The reflective layer 34 has the unevenness on its front surface, and displays an image by diffusing light of the image projected from the front side to the front side. In addition, the reflective layer 34 allows the background scenery to be seen by transmitting a part of the light from the rear side to the front side. Preferably, the unevenness is irregular unevenness.

The reflective layer 34 may be formed of a material that reflects light, for example, a metal such as aluminum or silver, a metal oxide, or a metal nitride. The reflective layer 34 may have a single-layer structure or a multi-layer structure, and may include at least one of a metal layer and a dielectric layer. As a method for forming the reflective layer 34, for example, a vacuum evaporation method or a sputtering method is used.

The reflective layer 34 may include a dielectric multi-layer film. A dielectric multi-layer film can be formed by a method of stacking a plurality of dielectric materials having different refractive indexes. Examples of dielectric materials having high refractive indexes include $Si_3N_4$, AlN, NbN, $SnO_2$, ZnO, SnZnO, $Al_2O_3$, MoO, NbO, $TiO_2$ and $ZrO_2$. Examples of dielectric materials having refractive indexes lower than the dielectric materials having high refractive indexes include $SiO_2$, $MgF_2$, and $AlF_3$.

The unevenness of the reflective layer 34 is embedded in the second transparent layer 35. The second transparent layer 35 may be formed of a transparent resin similarly to the first transparent layer 32, and is preferably formed of a resin having substantially the same refractive index as the first transparent layer 32.

The protective sheet 36 may be formed similarly to the base material sheet 31, and is preferably formed of the same material as the base material sheet 31. It should be noted that the base material sheet 31 and the protective sheet 36 may have any configuration, and the transparent screen 20 is not required to have at least one of the base material sheet 31 and the protective sheet 36.

(Details of Transparent Screen)

The first transparent layer 32 is formed in a sawtooth shape in a cross section. Where a surface 41 of the first transparent layer 32 opposite from the reflective layer 34 is used as a reference surface 41, the first transparent layer 32 has a plurality of inclined surfaces 42 inclined with respect to the reference surface 41. The plurality of inclined surfaces 42 are formed in a stripe pattern as seen from a direction normal to the reference surface 41. The stripe line may be a straight or curve line.

Next, the sizes, shapes, and the like of the inclined surfaces 42 will be described. In the explanation about the inclined surfaces 42, as illustrated in FIG. 1 and FIG. 2, a direction normal to the reference surface 41 may be referred to as an x direction, a direction which is perpendicular to the x direction and in which the inclined surfaces 42 extend may be referred to as a y direction, a direction which is perpendicular to the x direction and the y direction and in which the plurality of inclined surfaces 42 are arranged side by side may be referred to as a z direction. The x direction is a first direction, the y direction is a second direction, and the z direction is a third direction.

As illustrated in FIG. 1 and FIG. 2, in a section perpendicular to the y direction in which the front surface of the transparent screen faces the left-hand side, an inclination angle $\theta 1$ ($\theta 1$ is more than −90 degrees and is less than 90 degrees) is defined as positive in a clockwise direction, and is defined as negative in a counterclockwise direction. When the inclination angle $\theta 1$ of the inclined surface 42 is 0 degrees, this means that the inclined surface 42 is parallel to the reference surface 41. In FIG. 1 and FIG. 2, since the inclination angle $\theta 1$ is defined as negative, the magnitude of the inclination angle $\theta 1$ is represented as "−$\theta 1$".

The inclination angle $\theta 1$ of an inclined surface 42 is set on the basis of: the positional relationship between the projector 12, the observer 13, and the transparent screen 20; the refractive index of the transparent screen 20; and the like. The reason why the refractive index of the transparent screen 20 is taken into consideration is that an incident light IL and a reflective light RL refract at an interface between the transparent screen 20 and the open air. The inclination angle $\theta 1$ of the inclined surface 42 is set so that, when the observer 13 standing at a preconfigured position sees an image, hotspots are not seen and the entire image looks bright.

The inclination angle $\theta 1$ of an inclined surface 42 is, for example, −42 degrees or more and 42 degrees or less, and preferably, −30 degrees or more and 30 degrees or less, and more preferably, −25 degrees or more and 25 degrees or less. In a case where the transparent screen 20 is used for a windshield of a car and is used as being tilted with respect to the observer 13, (1) in a case where a long throw projector is used as the projector 12, the inclination angle $\theta 1$ of the inclined surface 42 may be −24 degrees or more and 18 degrees or less, and preferably, −20 degrees or more and 15 degrees or less, and more preferably, −16 degrees or more and 12 degrees or less, and (2) in a case where a short focus projector is used as the projector 12, the inclination angle $\theta 1$ of the inclined surface 42 may be −27 degrees or more and 30 degrees or less, and preferably, −23 degrees or more and 25 degrees or less, and more preferably, −18 degrees or more and 19 degrees or less. Conversely, in a case where the transparent screen 20 is used as window glass for trains and buildings, partitions in rooms, window glass for refrigerators, and the like and is used as being suspended in parallel with the observer 13, the inclination angle $\theta 1$ of the inclined surface 42 may be 4 degrees or more and 32 degrees or less, and preferably, 5 degrees or more and 28 degrees or less, and more preferably, 6 degrees or more and 24 degrees or less.

As illustrated in FIG. 1, in at least a part of the image projection area in a section perpendicular to the y direction, the plurality of inclined surfaces 42 are formed so that the inclination angles $\theta 1$ of the inclined surfaces 42, measured on a per-respective inclined surface 42 basis, decrease, in a stepwise manner or continuously, away from one end in the z direction (for example, the lower end) toward another end in the z direction (for example, the upper end). For example, an inclination angle $\theta 1$ of an inclined surface 42 at the top in FIG. 1 (a negative value in FIG. 1) is less than an inclination angle $\theta 1$ of an inclined surface 42 at the bottom in FIG. 1 (a negative value in FIG. 1). The inclination angles $\theta 1$ of the inclined surfaces 42 may change only in a negative range, may change only in a positive range, and may change over both the negative range and the positive range. In FIG. 1, the inclination angle $\theta 1$ decreases in a stepwise manner or continuously from the lower end to the upper end, but the inclination angle $\theta 1$ may decrease in a stepwise manner or continuously from the upper end to the lower end. The inclination angle $\theta 1$ is determined according to the positions of the projector 12 and the observer 13.

Figure 40:
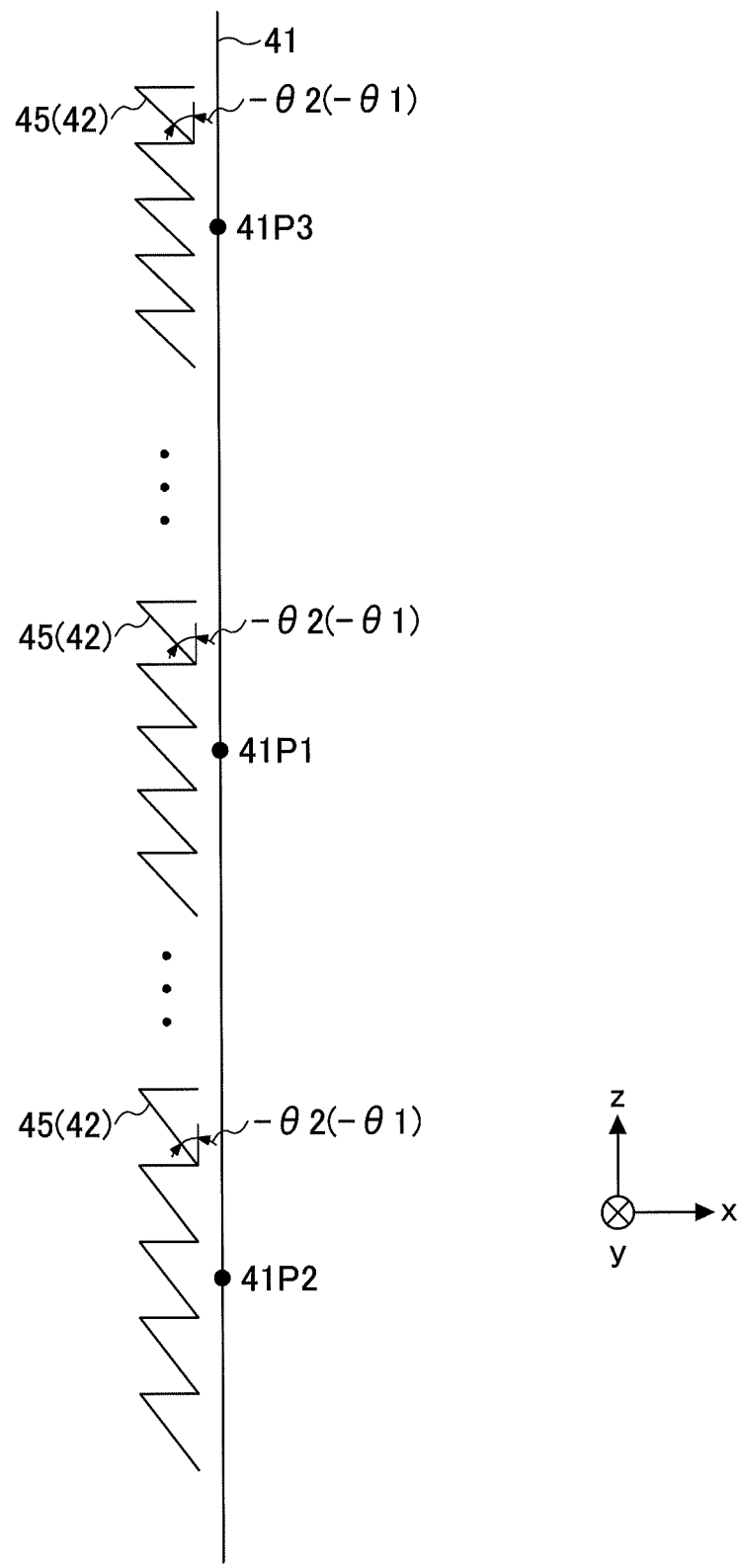
FIG. 40 is a drawing illustrating a relationship between a position of a reflective inclined surface or an inclined surface in the z direction and an inclination angle of the reflective inclined surface or the inclined surface according to an embodiment.

FIG. 40 illustrates a relationship between a position of an inclined surface 42 in the z direction and an inclination angle $\theta 1$ of an inclined surface 42. As illustrated in FIG. 40, a first point 41P1, a second point 41P2, and a third point 41P3 are located on the reference surface 41. The first point 41P1 is a midpoint between the second point 41P2 and the third point 41P3, which are 100 mm apart in the z direction, and the first point 41P1 is set arbitrarily. The second point 41P2 is a point away from the first point 41P1 by 50 mm toward one end in the z direction (for example, a negative side in the z direction). The average value of the inclination angles $\theta 1$ of five successive inclined surfaces 42 closest to the first point 41P1 is $\theta 1A$ (a negative value in FIG. 40). The average value of the inclination angles $\theta 1$ of five successive inclined surfaces 42 closest to the second point 41P2 is $\theta 1B$ (a negative value in FIG. 40). The average value of the inclination angles $\theta 1$ of five successive inclined surfaces 42 closest to the third point 41P3 is $\theta 1C$ (a negative value in FIG. 40). The average values $\theta 1A$, $\theta 1B$, and $\theta 1C$ satisfy an expression of "$\theta 1B > \theta 1A > \theta 1C$".

A pitch P1 of inclined surfaces 42 in the z direction is, for example, 15 μm or more, and preferably 20 μm or more. When the pitch P1 of the inclined surface 42 in the z direction is 15 μm or more, the exit angle of a diffracted light with the highest intensity among diffracted lights described below can be reduced, which makes it less likely that a double image of an image is seen as a ghost. The pitch P1 of the inclined surface 42 in the z direction is 300 μm or less. When the pitch P1 of the inclined surface 42 in the z direction is 300 μm or less, the stripes of the inclined surfaces 42 are so narrow that they cannot be seen from the observer 13.

The pitch P1 of the inclined surface 42 in the z direction may have irregularity in a manner similar to a pitch P2 of a reflective inclined surface 45 in the z direction explained later. Therefore, as will be described in detail later, diffraction of light passing through the transparent screen 20 from the rear side to the front side can be reduced, and background scenery is less likely to appear double.

Between a plurality of adjacent inclined surfaces 42, a step surface 43 is formed to connect the plurality of adjacent inclined surfaces 42. The step surface 43 is perpendicular to the reference surface 41 in FIG. 2, but may be inclined. It should be noted that, between a plurality of adjacent inclined surfaces 42, not only the step surface 43 but also a parallel surface parallel to the reference surface 41 may be formed.

The transparent screen 20 further includes, between the first transparent layer 32 and the reflective layer 34, an unevenness layer 33 for forming an unevenness on the inclined surfaces 42 of the first transparent layer 32. The unevenness layer 33 includes particles 37 and a matrix 38.

The particles 37 contain either inorganic particles or organic particles. Examples of materials of the inorganic particles include silicon dioxide, partial nitrides of silicon dioxide, titanium oxide, aluminum oxide, mixed crystal materials of silicon dioxide and aluminum oxide, zirconium oxide, and zinc oxide. Examples of materials of the organic particles include polystyrene resin, acrylic resin, and polyurethane resin.

The matrix 38 contains at least one of an inorganic material and an organic material. Examples of the inorganic materials include silicon dioxide, titanium oxide, zirconia oxide, and sodium silicate. Examples of the organic materials include polyvinyl alcohol resin, polyvinyl butyral resin, epoxy resin, acrylic resin, polyester resin, polycarbonate resin, melamine resin, polyurethane resin, urethane acrylate resin, and silicone resin. The organic material may be any of a thermosetting resin, a photosetting resin, and a thermoplastic resin.

The absolute value of the difference in the refractive index between the particles 37 and the matrix 38 is smaller-the-better, and is, for example, 0.1 or less, preferably 0.05 or less, and more preferably 0.02 or less. Also, the absolute value of the difference in the refractive index between the particles 37 and the first transparent layer 32 is smaller-the-better, and is, for example, 0.1 or less, preferably 0.05 or less, and more preferably 0.02 or less. Further, the absolute value of the difference in the refractive index between the matrix 38 and the first transparent layer 32 is smaller-the-better, and is, for example, 0.1 or less, preferably 0.05 or less, and more preferably 0.02 or less.

The percentage of the particles 37 in the unevenness layer 33 is, for example, 1% or more by volume and 80% or less by volume, and is preferably 5% or more by volume and 60% or less by volume.

The unevenness layer 33 has unevenness on the surface in contact with the reflective layer 34, and has a structure in which the protrusion portions 33a and the recess portions 33b are alternately arranged in a section perpendicular to the y direction.

Regarding the regularity of the unevenness shape of the unevenness layer 33, when the variation in the particle sizes of the particles 37 is decreased, regularity is likely to be attained, and when the variation in the particle sizes of the particles 37 is increased, regularity is lost and random unevenness can be attained. Also, when the total volume of the particles 37 is smaller than the volume of the matrix 38, random unevenness can be attained. In particular, when the volume of the particles 37 is 100% or less relative to the volume of the matrix 38, regularity can be reduced.

By giving regularity to the unevenness shape of the unevenness layer 33, the light scattering directions are likely to be uniform, which can increase the luminance.

A surface roughness Ra of the unevenness layer 33 is sufficiently smaller than a length L1 (L1=|P1/cos(θ1)|) of the inclined surface 42 in an inclination direction, and is, for example, 0.01 µm or more and 10 µm or less. In this specification, the "surface roughness Ra" means arithmetic average roughness described in Japanese Industrial Standards (JIS B0601). The surface roughness Ra of the unevenness layer 33 is measured in the y direction. The surface roughness Ra of the unevenness layer 33 is measured in the y direction instead of the z direction so that a noise does not occur due to the first transparent layer 32 being formed in a sawtooth shape in a section perpendicular to the y direction.

The reflective layer 34 has a thickness of, for example, 5 nm or more and 5000 nm or less, and is formed along the unevenness of the unevenness layer 33. Therefore, the reflective layer 34 has a plurality of reflective inclined surfaces 45 which are inclined with respect to the reference surface 41 and which are configured to reflect the light of the projected image. A step surface 46 or the like is formed between adjacent reflective inclined surfaces 45. The plurality of reflective inclined surfaces 45 are formed in a stripe pattern as seen from the direction normal to the reference surface 41. The lines of the stripe may be a straight or curve line.

The sizes, shapes, and the like of the reflective inclined surfaces 45 will be described with reference to FIG. 3 and the like. In the explanation about the reflective inclined surfaces 45, the x direction, the y direction, and z direction are adopted in a manner similar to the inclined surfaces 42.

The y direction is a direction which is perpendicular to the x direction and which is a direction in which the reflective inclined surfaces 45 extend. The z direction is a direction which is perpendicular to the x direction and the y direction and in which the plurality of reflective inclined surfaces 45 are arranged side by side. The x direction is a first direction, the y direction is a second direction, and the z direction is a third direction.

Figure 3:
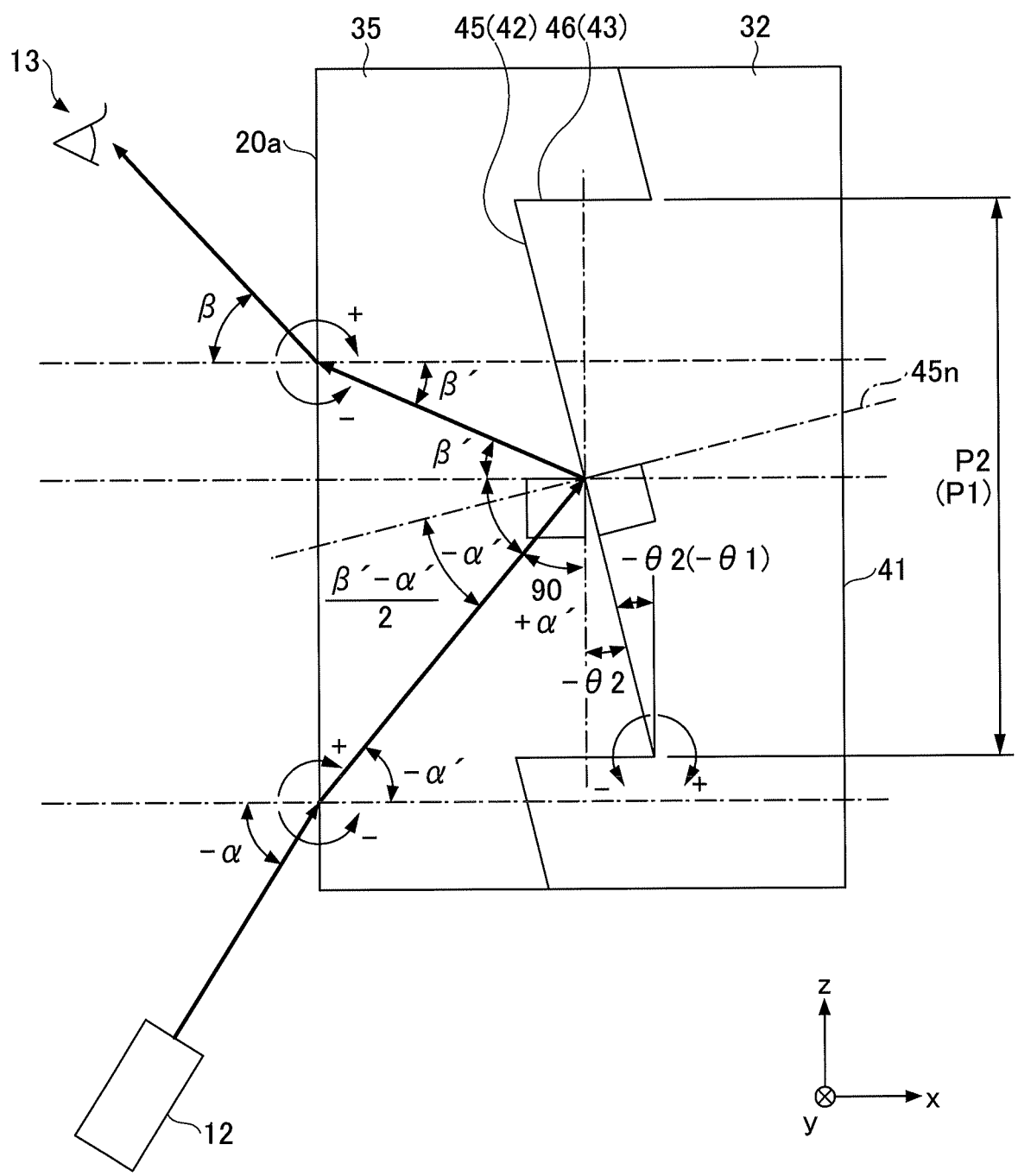
FIG. 3 is a drawing illustrating a path of light of an image emitted from a projector and reflected by a reflective inclined surface to reach an observer, according to an embodiment.

FIG. 3 is a drawing illustrating a path of light of an image emitted from a projector and reflected by a reflective inclined surface to reach an observer, according to an embodiment. As illustrated in FIG. 3, in the section perpendicular to the y direction, the light of the image projected from the projector 12 is incident on the front surface 20a of the transparent screen 20 at a first incidence angle α and refracted at a first refraction angle α'. Next, the light of the image is reflected by a reflective inclined surface 45 inclined at an inclination angle θ2 with respect to the reference surface 41. Thereafter, the light of the image is incident on the front surface 20a of the transparent screen 20 at a second incidence angle β' and is refracted at a second refraction angle β to enter the eyes of the observer 13.

Here, the first incidence angle α representing the position of the projector 12 and the second refraction angle β representing the position of the observer 13 are appropriately set according to the use of the transparent screen 20, and may be set for each reflective inclined surface 45. The first incidence angle α and the second refraction angle β may be set collectively for a plurality of consecutive reflective inclined surfaces 45.

The first refraction angle α' and the second incidence angle β' are set using Snell's law. More specifically, the first refraction angle α' is set by substituting a relative refractive index n of a material existing immediately before the reflective inclined surface 45 (i.e., the second transparent layer 35 in FIG. 3) with respect to the atmosphere and the first incidence angle α into an expression $\sin(\alpha)/\sin(\alpha')=n$. Likewise, the second incidence angle β' is set by substituting the above relative refractive index n and the second refraction angle β into an expression of $\sin(\beta)/\sin(\beta')=n$. In setting the first refraction angle α' and the second incidence angle β', a refractive index of a material existing between the second transparent layer 35 and the atmosphere (for example, the second transparent plate 22 as illustrated in FIG. 1) can be disregarded. Even in a case where the second transparent plate 22 exists, the first refraction angle α' and the second incidence angle β' may be derived according to Snell's law, assuming that the second transparent layer 35 and the atmosphere are in contact with each other. The obtained values do not vary regardless of whether the second transparent plate 22 is provided or not.

Further, as illustrated in FIG. 3, in a section perpendicular to the y direction in which the front surface 20a of the transparent screen 20 faces the left-hand side, each of the first incidence angle α, the first refraction angle α', the second incidence angle β', the second refraction angle β, and the inclination angle θ2 is defined as positive in a clockwise direction, and is defined as negative in a counterclockwise direction. Each of the first incidence angle α, the first refraction angle α', the second incidence angle β', the second refraction angle β, and the inclination angle θ2 is more than −90 degrees and is less than 90 degrees. When the inclination angle θ2 of the reflective inclined surface 45 is 0 degrees, this means that the reflective inclined surface 45 is parallel to the reference surface 41. In FIG. 3, since the first incidence angle α, the first refraction angle α', and the inclination angle θ2 are negative, the magnitudes thereof are represented as "−α'", "−α'''" and "−β2".

The inclination angles θ2 of the reflective inclined surfaces 45 are set on the basis of: the positional relationship between the projector 12, the observer 13, and the transparent screen 20; the refractive index of the transparent screen 20; and the like. The reason why the refractive index of the transparent screen 20 is taken into consideration is that an incident light IL and a reflective light RL refract at an interface between the transparent screen 20 and the atmosphere. The inclination angle θ2 of the reflective inclined surface 45 is set so that, when the observer 13 standing at a preconfigured position sees an image, hotspots are not seen and the entire image looks bright. The inclination angle θ2 of the reflective inclined surface 45 and the inclination angle θ1 of the inclined surface 42 are substantially the same between the reflective inclined surface 45 and the inclined surface 42 which are at the same z direction position.

The inclination angle θ2 of the reflective inclined surface 45 is, for example, −42 degrees or more and 42 degrees or less, and preferably, −30 degrees or more and 30 degrees or less, and more preferably, −25 degrees or more and degrees or less. In a case where the transparent screen 20 is used for a windshield of a car and is used as being tilted with respect to the observer 13, (1) in a case where a long throw projector is used as the projector 12, the inclination angle θ2 of the reflective inclined surface 45 may be −24 degrees or more and 18 degrees or less, and preferably, −20 degrees or more and 15 degrees or less, and more preferably, −16 degrees or more and 12 degrees or less, (2) in a case where a short focus projector is used as the projector 12, the inclination angle θ2 of the reflective inclined surface 45 may be −27 degrees or more and 30 degrees or less, and preferably, −23 degrees or more and 25 degrees or less, and more preferably, −18 degrees or more and 19 degrees or less. Conversely, in a case where the transparent screen 20 is used as window glass for trains and buildings, partitions in rooms, window glass for refrigerators, and the like and is used as being suspended in parallel with the observer 13, the inclination angle θ2 of the reflective inclined surface 45 may be 4 degrees or more and 32 degrees or less, and preferably, 5 degrees or more and 28 degrees or less, and more preferably, 6 degrees or more and 24 degrees or less.

As illustrated in FIG. 1, in at least a part of the image projection area, to which an image is projected, in a section perpendicular to the y direction, the plurality of reflective inclined surfaces are formed so that the inclination angles θ2 of the reflective inclined surfaces 45, measured on a per-respective reflective inclined surface basis 45, decrease, in a stepwise manner or continuously, away from one end in the z direction (for example, the lower end) to another end in the z direction (for example, the upper end). For example, the inclination angle θ2 of the reflective inclined surface 45 at the top in FIG. 1 (a negative value in FIG. 1) is less than the inclination angle θ2 of the reflective inclined surface 45 at the bottom in FIG. 1 (a negative value in FIG. 1). Of lights diffusely reflected by the plurality of reflective inclined surfaces 45 located at different positions in the z direction, a light with the highest intensity can be directed to the observer 13. Therefore, the difference between a brightness in an image-central portion and a brightness in an image outer peripheral portion can be reduced, and a direction in which the entire image can be observed brightly can be produced. The inclination angles θ2 of the reflective inclined surfaces 45 may change only in a negative range, may change only in a positive range, and may change over both the negative range and the positive range. Although, in FIG. 1, the inclination angle θ2 decreases, in a stepwise manner or continuously, away from the lower end to the upper end, the inclination angle θ2 may decrease, in a stepwise manner or continuously, from the upper end to the lower end. The inclination angle θ2 is determined according to the positions of the projector 12 and the observer 13.

FIG. 40 illustrates a relationship between a position of a reflective inclined surface 45 in the z direction and an inclination angle θ2 of the reflective inclined surface 45. As illustrated in FIG. 40, the first point 41P1, the second point 41P2, and the third point 41P3 are located on the reference surface 41. The first point 41P1 is a midpoint between the second point 41P2 and the third point 41P3, which are 100 mm apart in the z direction, and the first point 41P1 is set arbitrarily. The second point 41P2 is a point away from the first point 41P1 by 50 mm toward one end in the z direction (for example, a negative side in the z direction). The third point 41P3 is a point away from the first point 41P1 by 50 mm toward another end in the z direction (for example, a positive side in the z direction). The average value of the inclination angles θ2 of five successive reflective inclined surfaces 45 closest to the first point 41P1 is θ2A (a negative value in FIG. 40). The average value of the inclination angles θ2 of five successive reflective inclined surfaces 45 closest to the second point 41P2 is θ2B (a negative value in FIG. 40). The average value of the inclination angles θ2 of five successive reflective inclined surfaces 45 closest to the third point 41P3 is θ2C (a negative value in FIG. 40). The inclination angles θ2A, θ2B, and θ2C satisfy an expression of "θ2B>θ2A>θ2C".

As illustrated in FIG. 3, in at least a part of the image projection area in a section perpendicular to the y direction, the reflective inclined surfaces 45 may be formed to satisfy an expression of θ2=(α'+β')/2. Since the reflective inclined surfaces 45 have minute unevenness, the lights reflected by the reflective inclined surfaces 45 are diffused. In a case where the reflective inclined surfaces 45 are formed to satisfy an expression of θ2=(α'+β')/2, a light with the highest intensity among lights diffusely reflected lights by the reflective inclined surfaces 45 can be directed to the observer 13. Of lights diffusely reflected by the plurality of reflective inclined surfaces 45 located at different positions in the z direction, a light with the highest intensity can be directed to the observer 13. Therefore, the difference between a brightness in an image-central portion and a brightness in an image outer peripheral portion can be reduced, and a direction in which the entire image can be observed brightly can be produced.

As illustrated in FIG. 1, in at least a part of the image projection area in a section perpendicular to the y direction, a plurality of reflective inclined surfaces 45 may be formed to have normals 45n approaching other in accordance with being further toward a front direction away from the transparent screen 20. Of lights diffusely reflected by the plurality of reflective inclined surfaces 45 located at different positions in the z direction, a light with the highest intensity can be directed to the observer 13. Therefore, the difference between a brightness in an image-central portion and a brightness in an image outer peripheral portion can be reduced, and a direction in which the entire image can be observed brightly can be produced. A direction of the normal 45n of the reflective inclined surface 45 can be expressed as θ2+90 degrees or θ2−90 degrees. The measurement method for measuring the inclination angle θ2 will be explained later together with the measurement method for measuring the pitch P2.

A pitch P2 of the reflective inclined surface 45 in the z direction is, for example, 15 μm or more, and preferably 20 μm or more. When the pitch P2 of the reflective inclined surface 45 in the z direction is 15 μm or more, the exit angle of a diffracted light with the highest intensity among diffracted lights described below can be reduced, which makes it less likely that a double image of an image is seen as a ghost. The pitch P2 of the reflective inclined surface 45 in the z direction is 300 μm or less. When the pitch P2 of the reflective inclined surface 45 in the z direction is 300 μm or less, the stripes of the reflective inclined surfaces 45 are so narrow that they cannot be seen from the observer 13. The pitch P2 of the reflective inclined surface 45 in the z direction and the pitch P1 of the inclined surface 42 in the z direction are substantially the same between the reflective inclined surfaces 45 and the inclined surfaces 42 which are at the same z direction position. The measurement method for measuring the pitch P2 will be explained later.

As illustrated in FIG. 2, between adjacent reflective inclined surfaces 45, a step surface 46 is formed to connect the adjacent reflective inclined surfaces 45. The step surface 46 is perpendicular to the reference surface 41 in FIG. 2, but may be inclined. It should be noted that, between adjacent reflective inclined surfaces 45, not only the step surface 46 but also a parallel surface parallel to the reference surface 41 may be formed.

The reflective inclined surface 45 has unevenness, and has a structure in which protrusion portions 45a and recess portions 45b are alternately arranged in a section perpendicular to the y direction. The unevenness of the reflective inclined surface 45 may be either regular or irregular, but preferably irregular.

The surface roughness Ra of the reflective inclined surface 45 is sufficiently shorter than a length L2 ($L2=|P2/\cos(\theta 2)|$) of the reflective inclined surface 45 in an inclination direction, and is, for example, 0.01 μm or more and 10 μm or less. The surface roughness Ra of the reflective inclined surface 45 is measured in the y direction. The surface roughness Ra of the reflective inclined surface 45 is measured in the y direction instead of the z direction so that noise does not occur due to the first transparent layer 32 being formed in a sawtooth shape in a section perpendicular to the y direction.

Figure 4:
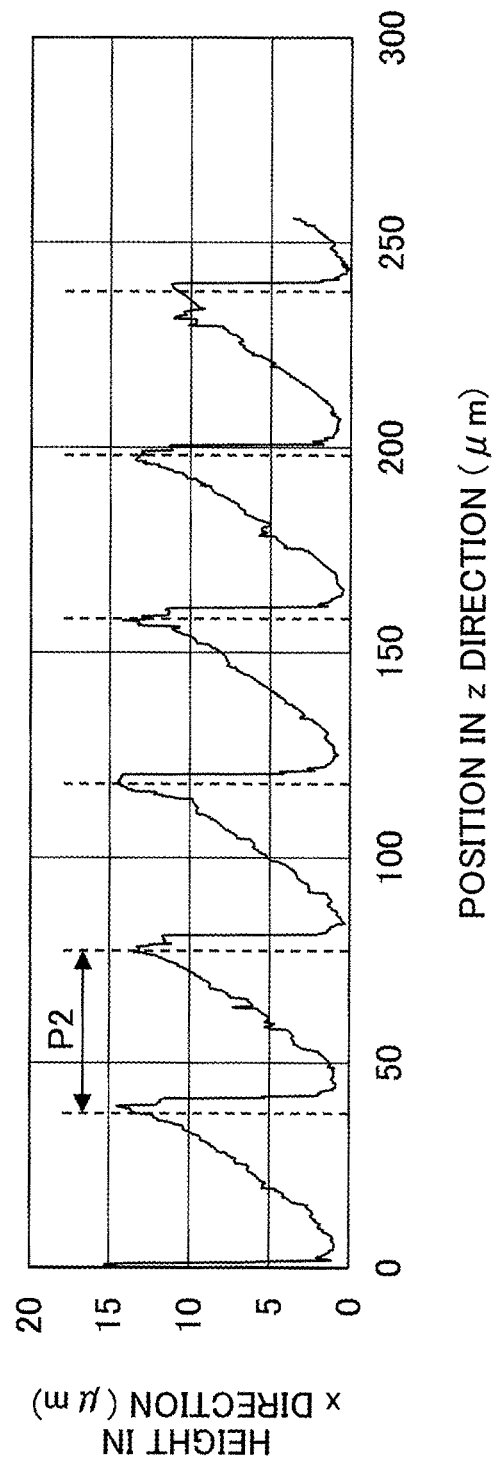
FIG. 4 is a drawing illustrating a primary profile illustrating a front surface (including reflective inclined surfaces, step surfaces, and the like) of a reflective layer according to an embodiment.
Figure 5:
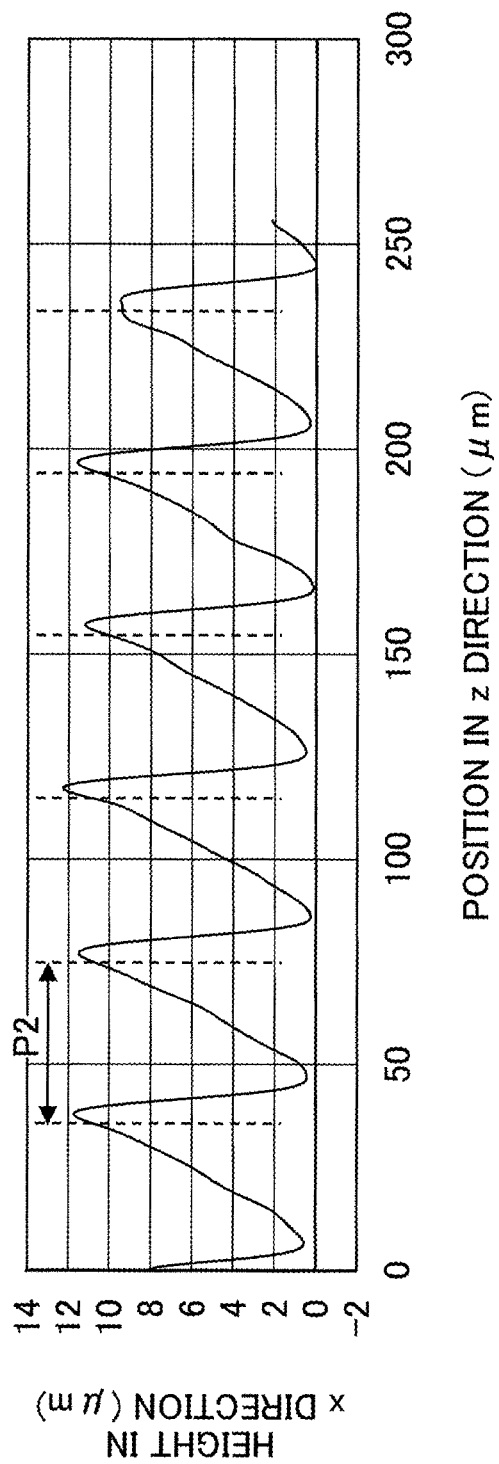
FIG. 5 is a drawing illustrating a waviness profile obtained by applying a short wavelength cut filter to the primary profile of FIG. 4.
Figure 6:
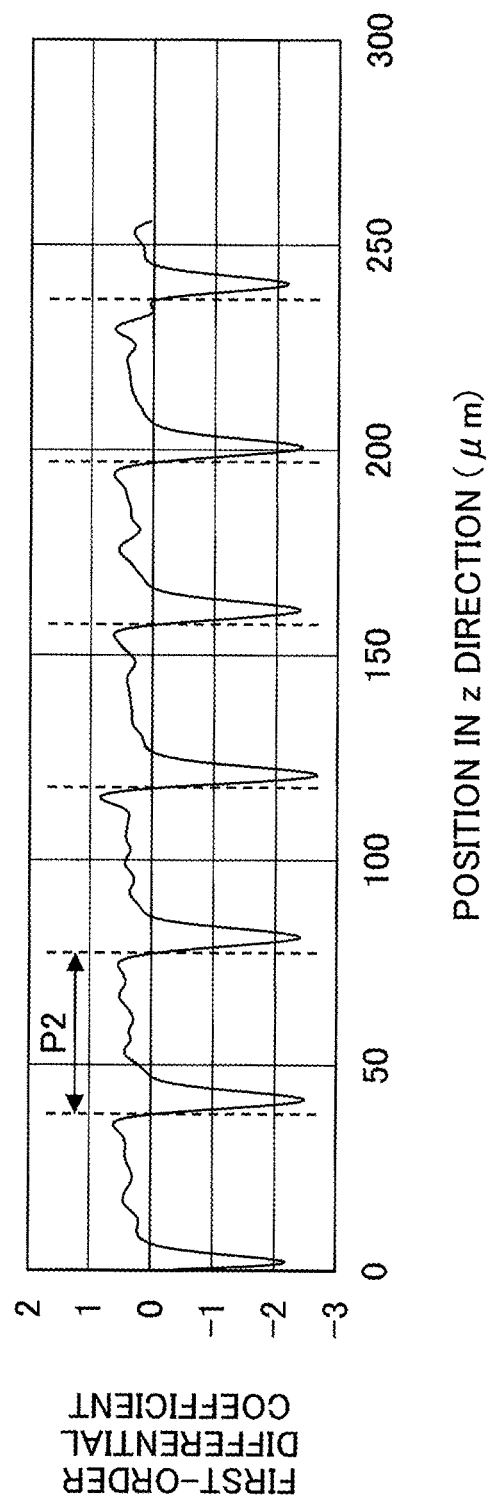
FIG. 6 is a drawing illustrating a first-order differential coefficient of the waviness profile of FIG. 5.
Figure 7:
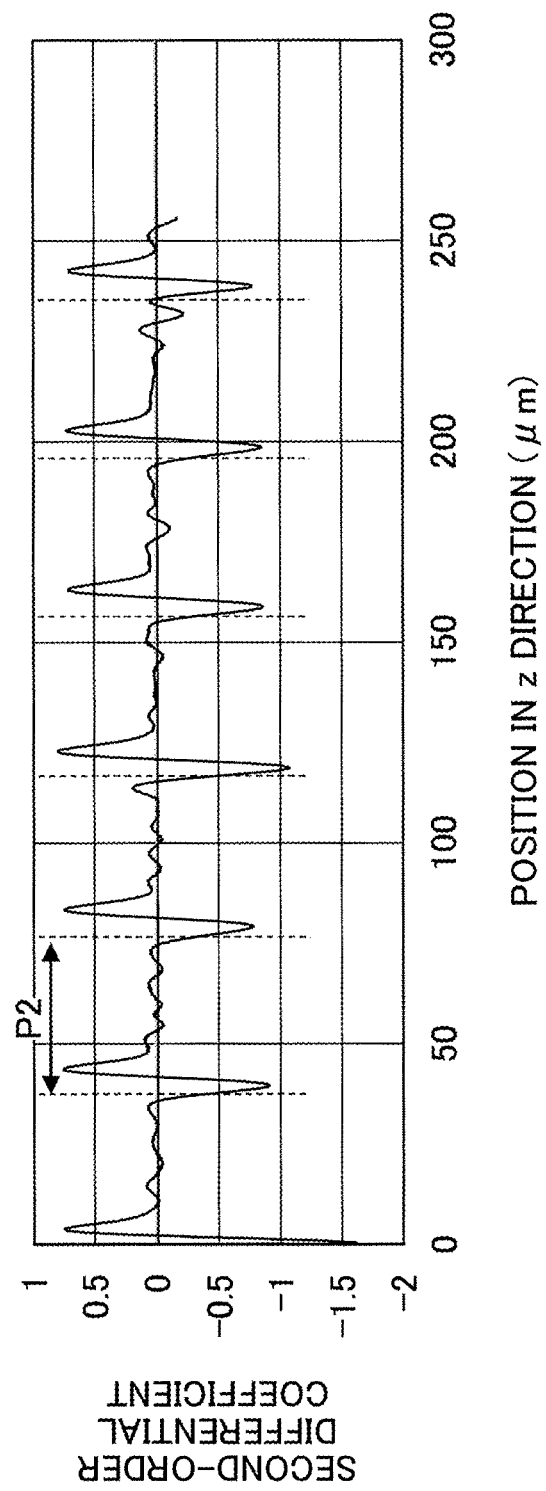
FIG. 7 is a drawing illustrating a second-order differential coefficient of the waviness profile of FIG. 5.

A measurement method for measuring the pitch P2 of the reflective inclined surface 45 in the z direction will be explained with reference to FIGS. 4 to 7 and the like. FIG. 4 is a drawing illustrating a primary profile of a front surface (including reflective inclined surfaces, step surfaces, and the like) of the reflective layer according to an embodiment. In FIG. 4, the horizontal axis represents a z direction position, and the vertical axis represents an x direction position. FIG. 5 is a drawing illustrating a waviness profile obtained by applying a short wavelength cut filter to the primary profile of FIG. 4. FIG. 6 is a drawing illustrating a first-order differential coefficient of the waviness profile of FIG. 5. FIG. 7 is a drawing illustrating a second-order differential coefficient of the waviness profile of FIG. 5. In FIG. 4 to FIG. 7, a dotted line represents a convex vertex point of the reflective inclined surface 45.

First, the primary profile (see FIG. 4) of the front surface (including the reflective inclined surfaces 45 and the step surfaces 46) of the reflective layer 34 is measured with a commercially available laser microscope. The primary profile is measured in a section which passes through the center point of a projection lens of the projector 12 and the center point of the eyes of the observer 13 and which is perpendicular to the y direction.

Subsequently, the waviness profile as illustrated in FIG. 5 is obtained by applying a short wavelength cut filter to the primary profile as illustrated in FIG. 4 to remove wavelength components having wavelengths shorter than 10 μm from the primary profile. Small unevenness formed on the reflective inclined surfaces 45 and step surfaces 46 can be removed by removing wavelength components having wavelengths shorter than 10 μm from the primary profile.

Thereafter, the waviness profile illustrated in FIG. 5 is first-order differentiated to obtain a first-order differential coefficient shown in FIG. 6, and the waviness profile illustrated in FIG. 5 is second-order differentiated to obtain a second-order differential coefficient illustrated in FIG. 7. A position at which the first-order differential coefficient becomes zero and the second-order differential coefficient becomes negative are defined as a convex vertex point of the reflective inclined surface 45.

A section between a convex vertex point of any given reflective inclined surface 45 and a convex vertex point of a subsequent reflective inclined surface 45 is defined as a single pitch section. A length of a single pitch section in the z direction is the pitch P2 of the reflective inclined surface 45 in the z direction.

Herein, at a position a predetermined distance away from a convex vertex point of any given reflective inclined surface 45, a convex vertex point of a subsequent reflective inclined surface 45 is set. The "predetermined distance" is the cutoff value (10 μm) of the short wavelength cut filter. Accordingly, a noise of minute unevenness formed on the reflective inclined surfaces 45 can be removed. The surface roughness Ra of the reflective inclined surface 45 is 10 μm or less as described above.

It should be noted that the cutoff value of the short wavelength cut filter is not limited to 10 μm. For the cutoff value of the short wavelength cut filter, a minimum value is selected, within a range equal to or more than 5 μm and equal to or less than 50 μm, so that a ratio (PV2/PV1) of a PV value (PV2) of a waviness profile to a PV value (PV1) of a primary profile becomes 0.5 or more. The ratio (PV2/PV1) decreases as the cutoff value increases. A PV value means the maximum height difference (difference between Peak and Valley) in the x direction.

A ratio (PV1/P2) of a maximum height difference (PV1) of reflective inclined surfaces in the x direction to a pitch (P2) of reflective inclined surface 45 in the z direction is 0.6 or less. When the ratio PV1/P2 is 0.6 or less, the absolute values of the inclination angles θ2 of the majority of the reflective inclined surfaces 45 can be 45 degrees or less, and accordingly, forward scatter can be reduced, and haze can be reduced. For example, in a case where an arithmetic mean value $P2_{AVE}$ of the pitch P2 is 40 μm, a maximum value $P2_{MAX}$ of P2 is 52 μm, a minimum value $P2_{MIN}$ of P2 is 28 m, and PV1 is 13 μm, the ratio PV1/P2 is 0.25 to 0.46. The ratio PV1/P2 is preferably 0.01 or more.

Figure 8:
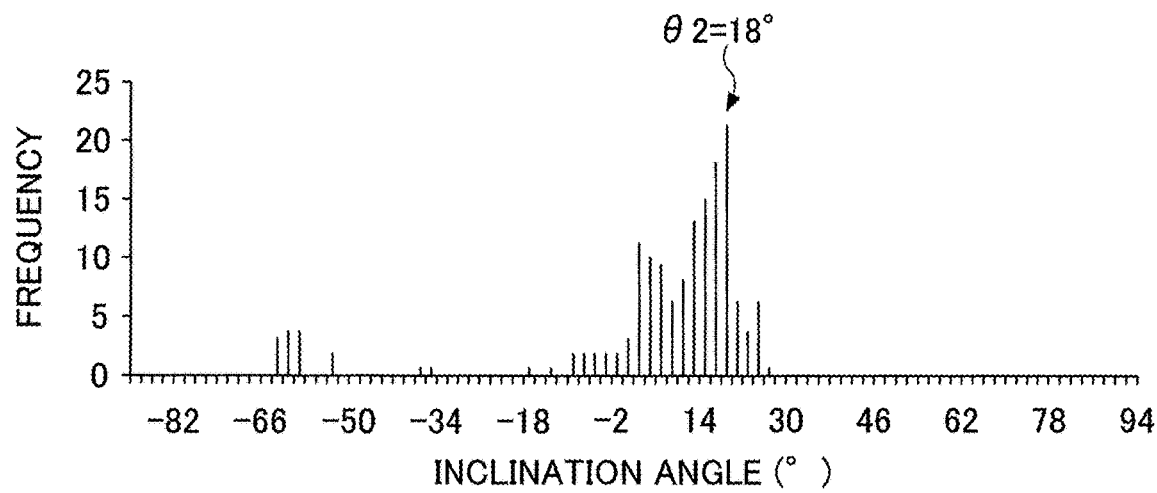
FIG. 8 is a drawing illustrating a histogram of inclination angles of a primary profile in a single pitch section according to an embodiment.

The measurement method for measuring the inclination angle θ2 of the reflective inclined surface 45 will be explained with reference to FIG. 8 and the like. FIG. 8 is a drawing illustrating a histogram of inclination angles of a primary profile in a single pitch section according to an embodiment. In FIG. 8, the horizontal axis denotes an inclination angle (degrees), and the vertical axis denotes a frequency. The inclination angle of the primary profile is measured at 160 points (including the start point and the end point of the single pitch section) that equally divide the single pitch section.

First, a histogram (see FIG. 8) of inclination angles of the primary profile (see FIG. 4) in a single pitch section is generated. Herein, the class width is assumed to be 2 degrees, and the class value is assumed to be k (k is an even number equal to or more than −90 and equal to or less than 90). The range of each class is equal to or more than k−1 and equal to or less than k+1.

Subsequently, a class value of a class of which frequency is the highest in the histogram as illustrated in FIG. 8 is assumed to be an inclination angle θ2 of reflective inclined surfaces 45. For example, according to the histogram as illustrated in FIG. 8, the inclination angle θ2 of the reflective inclined surface 45 is 18 degrees.

The reason why the class value of the class of which frequency is the highest is adopted as the inclination angle θ2 of the reflective inclined surface 45 is to exclude inclinations of step surfaces 46 and the like. Since the size of a reflective inclined surface 45 in the z direction is larger than the size of the step surface 46 and the like in the z direction, inclinations of the step surfaces 46 and the like can be excluded when the class value of the class of which frequency is the highest is adopted as the inclination angle θ2 of the reflective inclined surface 45.

In a manner as described above, for each reflective inclined surface 45, the pitch P2 of the reflective inclined surface 45 in the z direction and the inclination angle θ2 of the reflective inclined surface 45 are measured.

Incidentally, depending on through which of a position of a reflective inclined surface 45 and a position of a step surface 46 in the z direction the light passing through the transparent screen 20 from the rear side to the front side (hereinafter referred to as "background-transmitted light") travels, the background-transmitted light travels over a different distance through the reflective layer 34, and accordingly, the transmittance of the background-transmitted light differs. More specifically, as compared with when the background-transmitted light travels through the reflective inclined surface 45, when the background-transmitted light travels through the step surface 46, the background-transmitted light travels over a longer distance through the reflective layer 34, and accordingly, the transmittance of the background-transmitted light becomes lower. Therefore, the transmittance of the background-transmitted light changes in accordance with the z direction position.

Therefore, in at least a part of the image projection area in a section perpendicular to the y direction, a plurality of reflective inclined surfaces 45 having irregular pitches P2 in the z direction may be formed in order to reduce periodic changes of the transmittance of the background-transmitted light in the z direction and reduce diffraction of the background-transmitted light. Accordingly, the diffraction of the background-transmitted light can be reduced, and background scenery is less likely to appear double.

In the present specification, "a plurality of reflective inclined surfaces 45 having irregular pitches P2 in the z direction may be formed" means that, with respect to 50 reflective inclined surfaces 45 arranged continuously in the z direction, both of a first condition and a second condition described below are satisfied. Both of the first condition and the second condition described below being satisfied means that different pitches P2 are arranged irregularly. Herein, in a case where the maximum rate of change in the pitch P2 is less than 10% of an arithmetic mean value $P2_{AVE}$ of the pitch P2, the pitches P2 are considered to be the same within the range of the error. The maximum rate of change in the pitch P2 is a maximum value of $(P2_{MAX}-P2_{AVE})/P2_{AVE} \times 100$ and $(P2_{AVE}-P2_{MIN})/P2_{AVE} \times 100$. $P2_{MAX}$ is the maximum value of P2, and $P2_{MIN}$ is the minimum value of P2. The maximum rate of change in the pitch P2 is preferably 10% or more, more preferably 13% or more, and still more preferably 15% or more.

Figure 9:
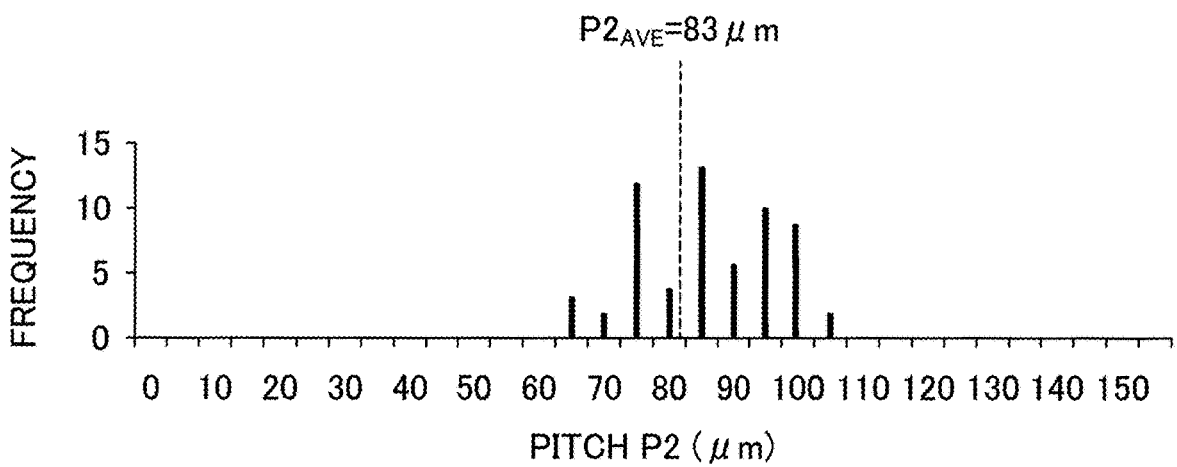
FIG. 9 is a drawing illustrating a histogram of pitches of reflective inclined surfaces in a z direction according to an embodiment.

The first condition is that at least one pitch P2 that is 95% or less or 105% or more of the arithmetic mean value $P2_{AVE}$ exists. The first condition will be explained with reference to FIG. 9. FIG. 9 is a drawing illustrating a histogram of pitches of reflective inclined surfaces in the z direction according to an embodiment.

First, with respect to 50 reflective inclined surfaces 45 arranged continuously in the z direction, pitches P2 of reflective inclined surfaces 45 in the z direction are measured for the respective reflective inclined surfaces 45. Subsequently, the arithmetic mean value $P2_{AVE}$ of the pitch P2 measured is calculated. Thereafter, for each reflective inclined surface 45, a ratio of the pitch P2 to the arithmetic mean value $P2_{AVE}$ is calculated as a percentage ($P2/P2_{AVE} \times 100$). For calculation of this percentage ($P2/P2_{AVE} \times 100$), an actually measured value is used instead of the class value. In FIG. 9, $P2_{AVE}$ is 83 μm.

A ratio ($N1/N2 \times 100$) of a total number N1 of reflective inclined surfaces 45 of which percentages are 95% or less or 105% or more to a total number N2 (N2=50≥N1) of reflective inclined surfaces 45 is also referred to as an error deviation rate. The error deviation rate ($N1/N2 \times 100$) being more than 0 is the first condition. The error deviation rate is preferably 5% or more, more preferably 25% or more, and particularly preferably 50% or more.

The second condition is that an absolute value of correlation coefficients R(ΔP) derived from the following expression (1) is less than 0.5. The correlation coefficient R(ΔP) is a value representing consistency between a waviness profile x(z) (see FIG. 5) and a curve x(z+ΔP) obtained by shifting the waviness profile x(z) in the z direction by ΔP. A position at z=0 is a position at a convex vertex point of a reflective inclined surface 45 (position indicated by a dotted line in FIG. 5). ΔP is any given value equal to or more than $10 \times P2_{AVE}$ and equal to or less than $50 \times P2_{AVE}$.

$$R(\Delta P) = \sum_{z=0}^{50 \times P2_{AVE}} \frac{(x(z) \times x(z+\Delta P))}{(x(z) \times x(z))} \quad \text{[Math 1]}$$

In the above expression (1), z is increased from 0 (μm) to $50 \times P2_{AVE}$ (μm) with an increment of 0.25 (μm) to obtain R(ΔP). At this occasion, an expression of $x(z+50 \times P2_{AVE})=x(z)$ is assumed to be satisfied, and accordingly, x(z=0) is adopted as the value of $x(z=50 \times P2_{AVE})$. When the absolute value of R(ΔP) is less than 0.5, it can be said there is not periodicity in the waviness profile x(z). The absolute value of the correlation coefficient R(ΔP) being less than 0.5 is the second condition.

A relationship between irregularity of pitches P2 of reflective inclined surfaces 45 in the z direction and the diffraction of the background-transmitted light will be explained with reference to FIGS. 10 to 29 and FIGS. 41 to 52 and the like. In Test Examples 1 to 8 described below, a relationship between an exit angle and an intensity of background-transmitted light vertically incident on the rear surface of the transparent screen 20 and exiting from the front side of the transparent screen 20 was derived through simulation. The scalar difference calculation was used for the simulation. The exit angle represents an inclination of the exit light relative to the incident light, with a clockwise direction being positive and a counterclockwise direction being negative. In any of the following Test Examples 1 to 8, the arithmetic mean value $P2_{AVE}$ of the pitch P2 was assumed to be 40 μm. Whether the first condition is satisfied or not, whether the second condition is satisfied or not, and the like in Test Example 1 to Test Example 8 are summarized in Table 1. Error deviation rates and maximum rates of change in the pitch P2 in Test Example 1 to Test Example 8 are summarized in Table 1. It should be noted that a relationship between an exit angle and an intensity of a background-transmitted light is mainly determined by pitches P2 of reflective inclined surfaces 45 in the z direction. The inclination angle θ2 of the reflective inclined surface 45 and PV1/P2 do not appreciably affect the relationship between the exit angle and the intensity of background-transmitted light.

TABLE 1

|  | Test Example 1 | Test Example 2 | Test Example 3 | Test Example 4 | Test Example 5 | Test Example 6 | Test Example 7 | Test Example 8 |
| --- | --- | --- | --- | --- | --- | --- | --- | --- |
| Error Deviation Rate (%) | 0 | 0 | 44 | 62 | 82 | 6 | 6 | 44 |
| Maximum Rate of Change in P2 (%) | 0 | 3 | 5 | 13 | 15 | 3 | 30 | 10 |
| First Condition | Not Satisfied | Not Satisfied | Satisfied | Satisfied | Satisfied | Satisfied | Satisfied | Satisfed |
| Second Condition | Not Satisfied | Not Satisfied | Not Satisfied | Satisfied | Satisfied | Not Satisfied | Satisfied | Satisfied |

In Table 1, "Satisfied" indicates that a given condition was satisfied, and "Not Satisfied" indicates that a given condition was not satisfied. In Test Example 1, the first condition was not satisfied (see FIG. 10 (more specifically FIG. 11)), and the second condition was not satisfied, either (see FIG. 12). In Test Example 2, the first condition was not satisfied (see FIG. 14 (more specifically FIG. 15)), and the second condition was not satisfied, either (see FIG. 16). In Test Example 3, the first condition was satisfied (see FIG. 18 (more specifically, FIG. 19)), but the second condition was not satisfied (see FIG. 20). In Test Example 4, the first condition was satisfied (see FIG. 22 (more specifically, FIG. 23)), and the second condition was also satisfied (see FIG. 24). In Test Example 5, the first condition was satisfied (see FIG. 26 (more specifically, FIG. 27)), and the second condition was also satisfied (see FIG. 28). In Test Example 6, the first condition was satisfied (see FIG. 41 (more specifically FIG. 42)), but the second condition was not satisfied (see FIG. 43). In Test Example 7, the first condition was satisfied (see FIG. 45 (more specifically FIG. 46)), and the second condition was also satisfied (see FIG. 47). In Test Example 8, the first condition was satisfied (see FIG. 49 (more specifically FIG. 50)), and the second condition was also satisfied (see FIG. 51).

Figure 10:
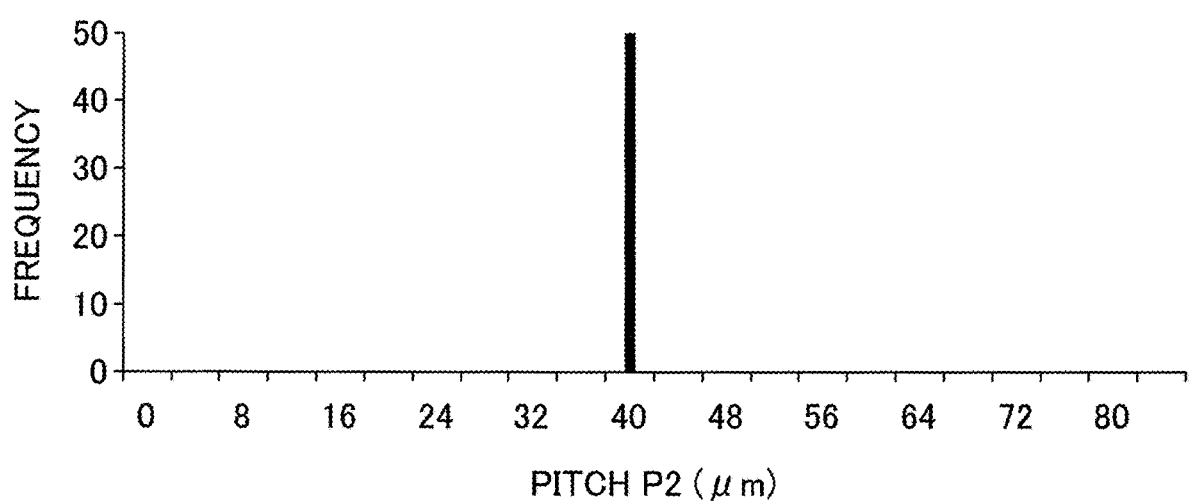
FIG. 10 is a drawing illustrating a histogram (class width 4.0 μm) of pitches of reflective inclined surfaces in the z direction according to Test Example 1.
Figure 11:
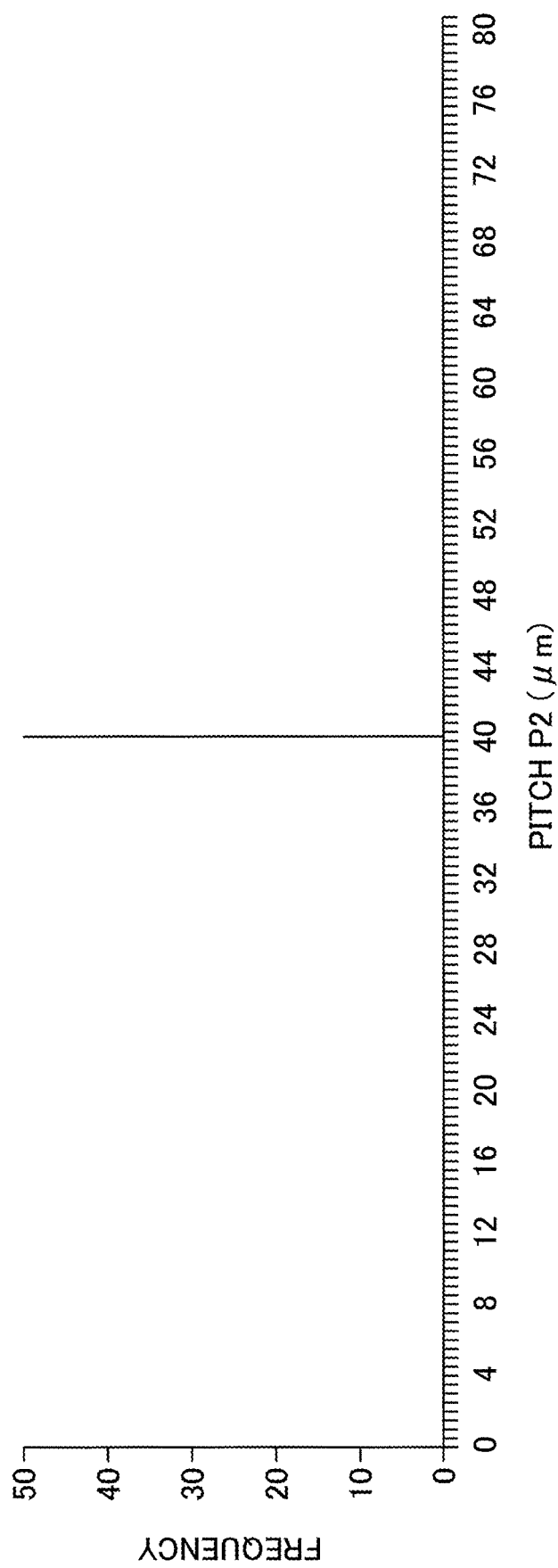
FIG. 11 is a drawing illustrating a histogram (class width 0.5 μm) of pitches of the reflective inclined surfaces in the z direction according to Test Example 1.
Figure 12:
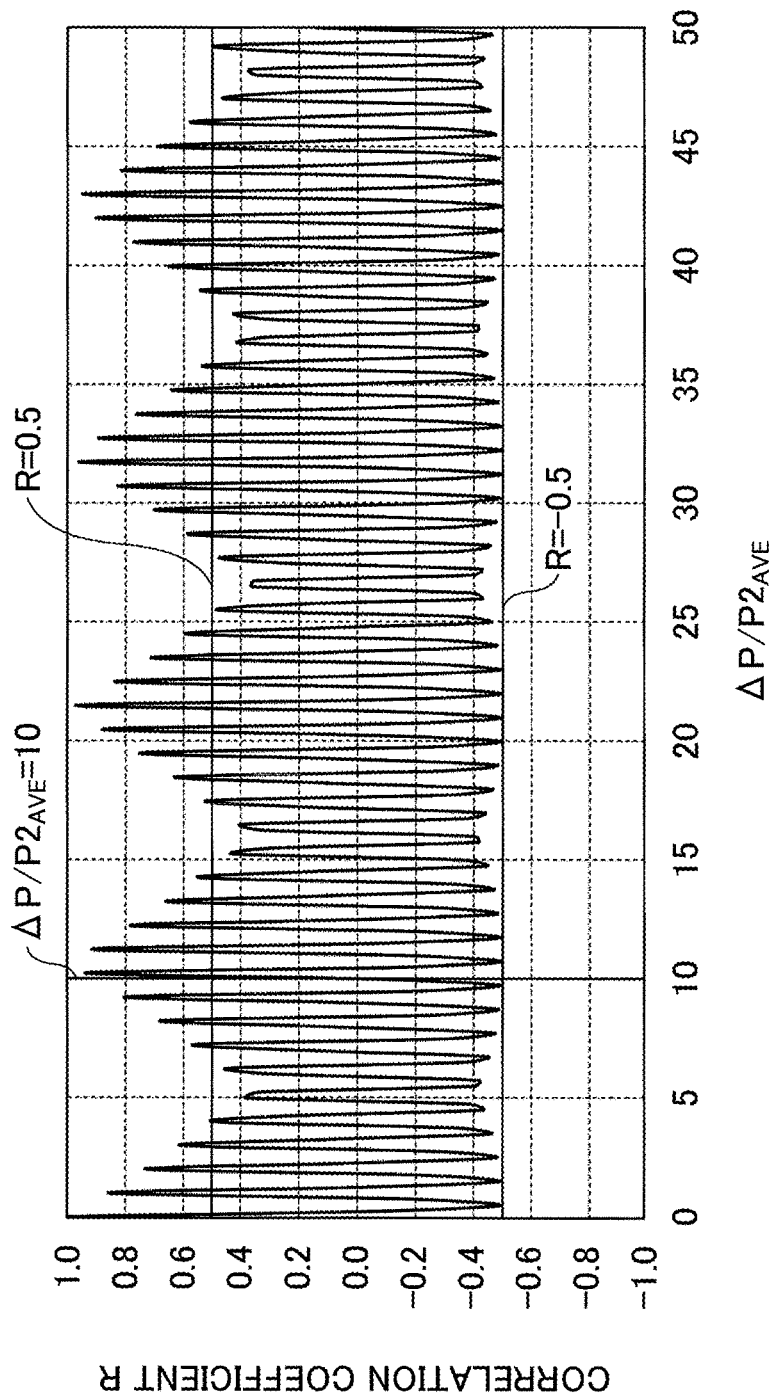
FIG. 12 is a drawing illustrating a correlation coefficient $R(\Delta P)$ of a waviness profile according to Test Example 1.
Figure 13:
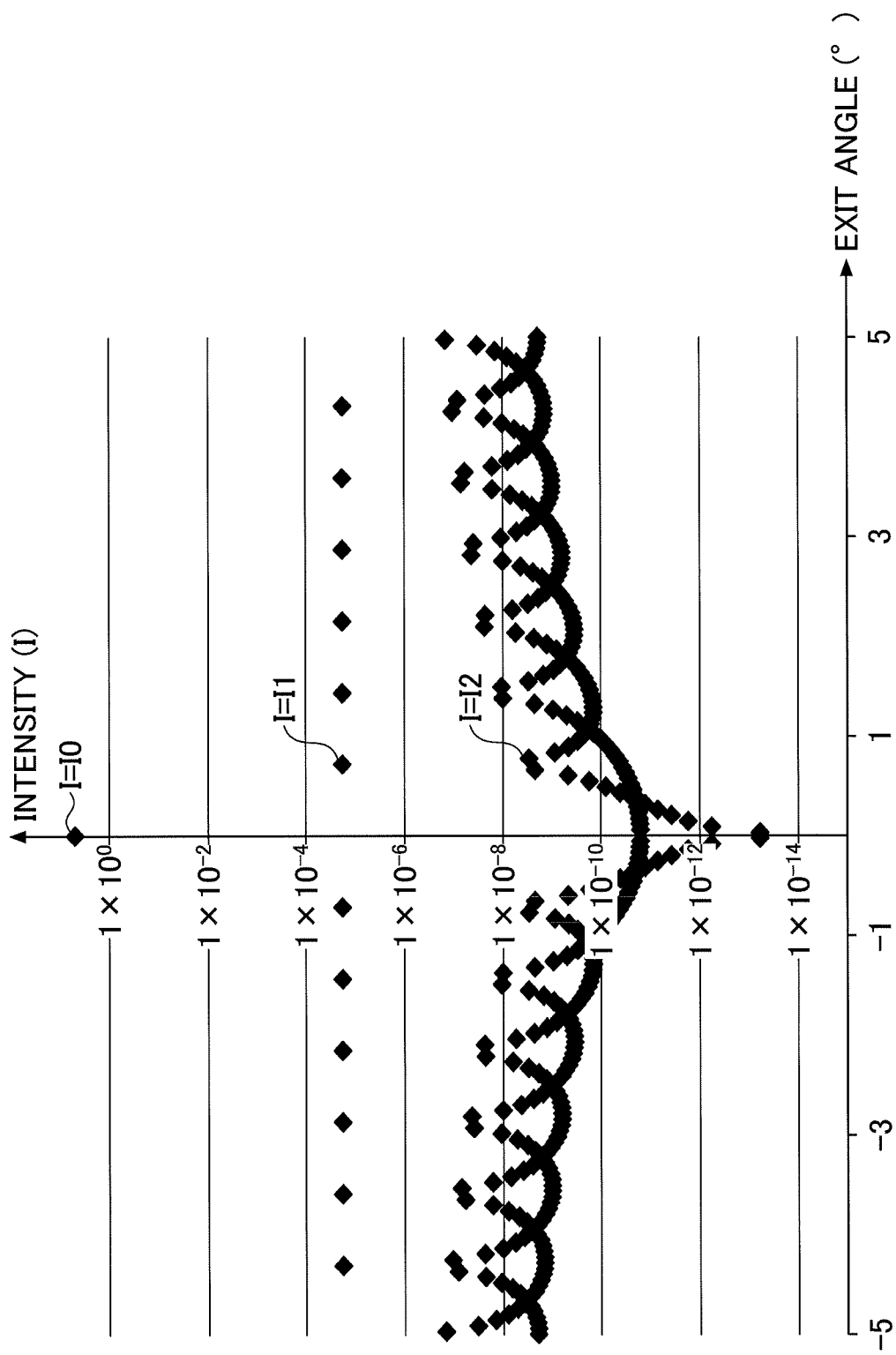
FIG. 13 is a drawing illustrating a relationship between an exit angle and an intensity of background-transmitted light according to Test Example 1.

FIG. 10 is a drawing illustrating a histogram (class width 4.0 μm) of pitches of reflective inclined surfaces in the z direction according to Test Example 1. FIG. 11 is a drawing illustrating a histogram (class width 0.5 μm) of pitches of reflective inclined surfaces in the z direction according to Test Example 1. FIG. 12 is a drawing illustrating a correlation coefficient R(ΔP) of a waviness profile according to Test Example 1. FIG. 13 is a drawing illustrating a relationship between an exit angle and an intensity of a background-transmitted light according to Test Example 1. An intensity was measured with every 0.014 degrees of an exit angle. In Test Example 1, an intensity ratio (I1/I2) of an intensity I1 (see FIG. 13) of a diffracted light with the highest intensity among lights diffracted by the repeating structures of the reflective inclined surfaces (which may be hereinafter also simply referred to as "diffracted light") to an intensity I2 (see FIG. 13) of a light at a measurement point adjacent to the diffracted light was 7 or more (more specifically about $10^3$), and therefore, the diffracted light was observed as a double image. In Test Example 1, an intensity ratio (I0/I1) of an intensity I0 of a light of which exit angle is 0 degrees to the intensity I1 of the diffracted light with the highest intensity was $10^5$ or more.

Figure 14:
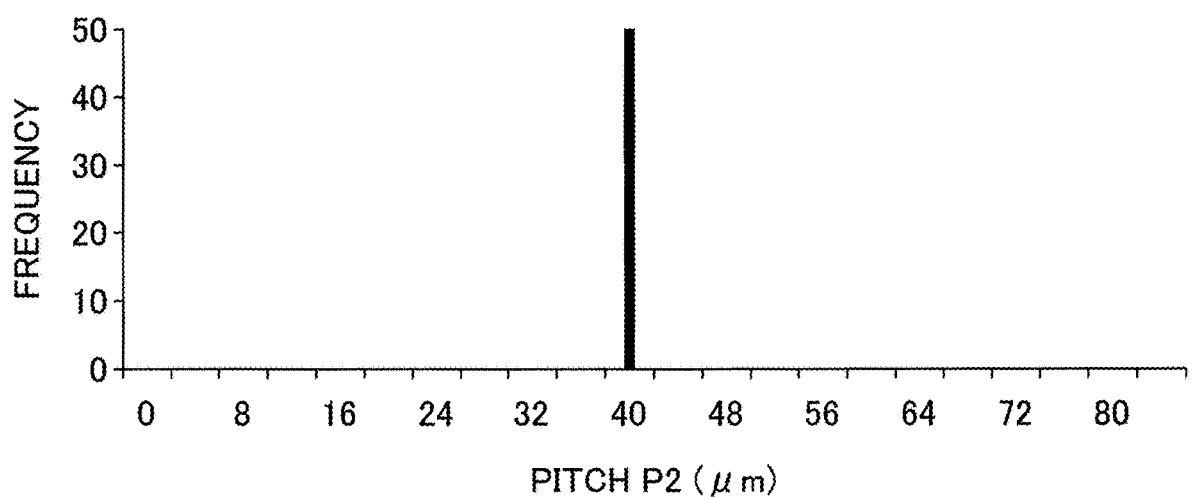
FIG. 14 is a drawing illustrating a histogram (class width 4.0 μm) of pitches of reflective inclined surfaces in the z direction according to Test Example 2.
Figure 15:
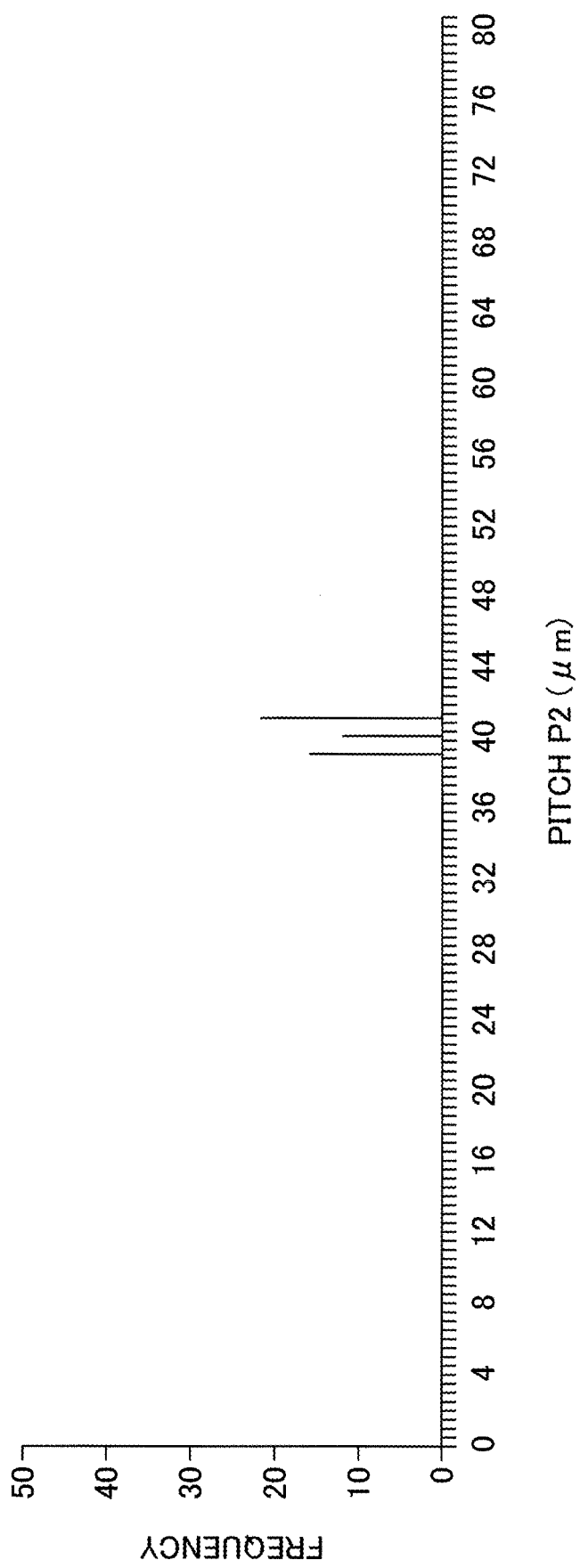
FIG. 15 is a drawing illustrating a histogram (class width 0.5 μm) of pitches of the reflective inclined surfaces in the z direction according to Test Example 2.
Figure 16:
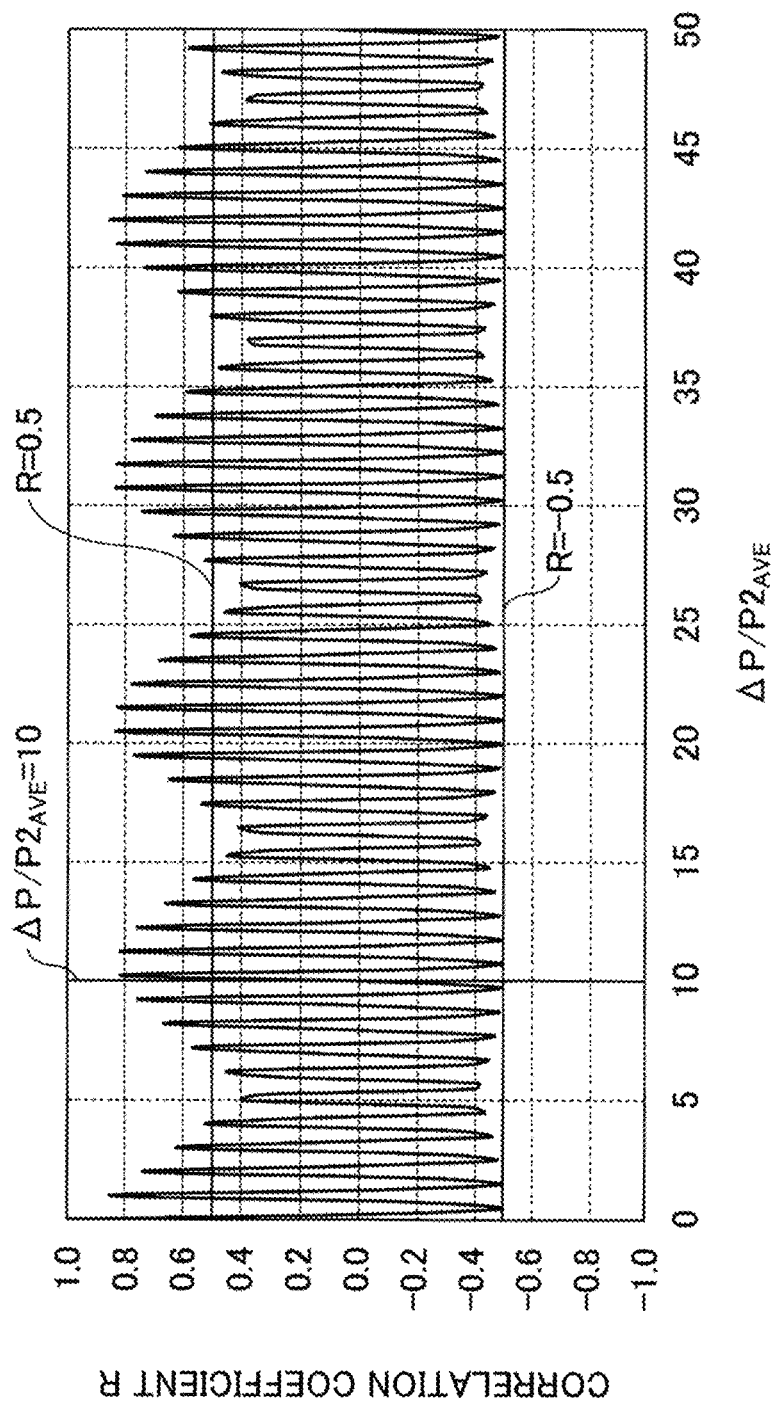
FIG. 16 is a drawing illustrating a correlation coefficient $R(\Delta P)$ of a waviness profile according to Test Example 2.
Figure 17:
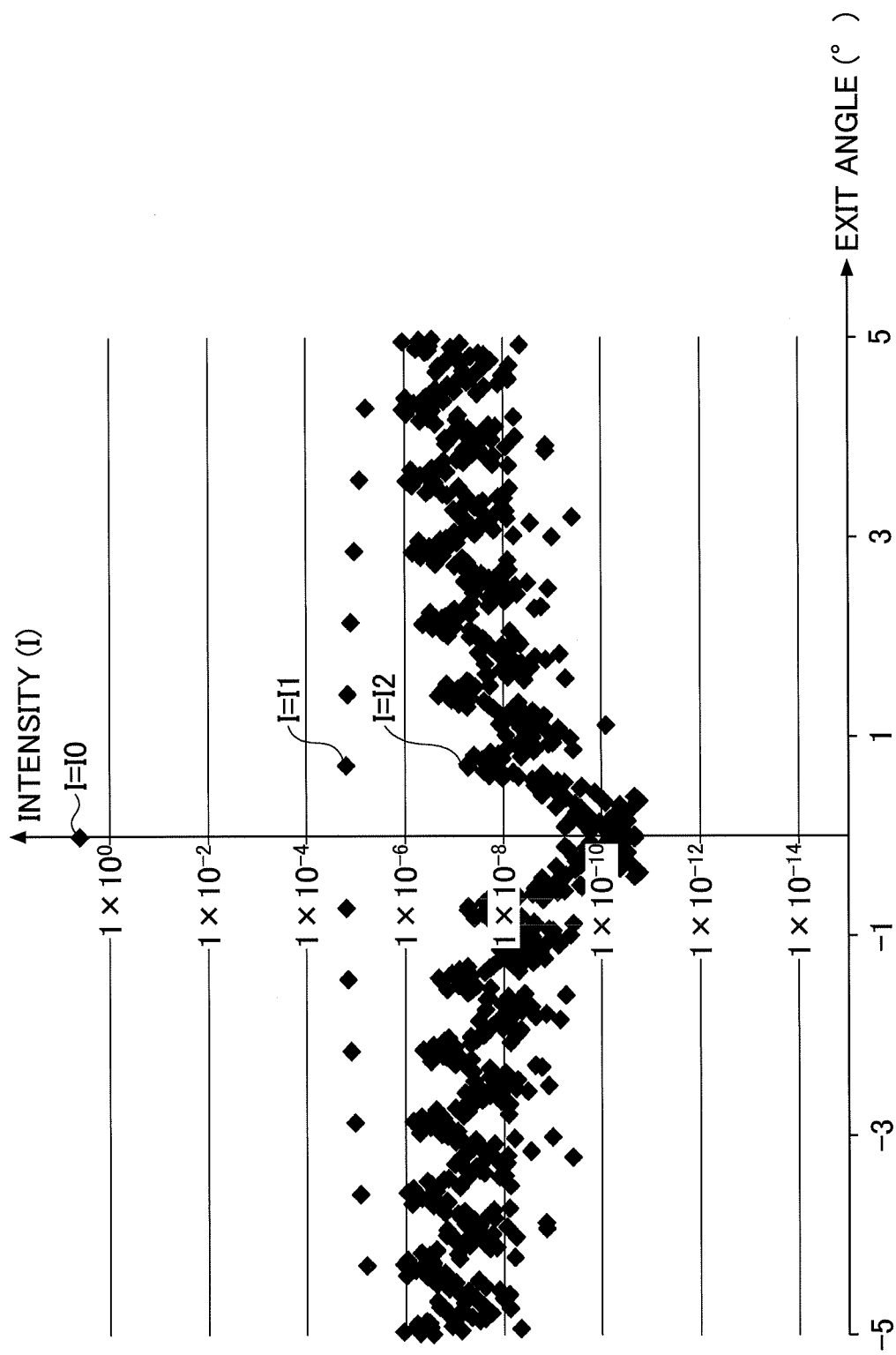
FIG. 17 is a drawing illustrating a relationship between an exit angle and an intensity of background-transmitted light according to Test Example 2.

FIG. 14 is a drawing illustrating a histogram (class width 4.0 μm) of pitches of reflective inclined surfaces in the z direction according to Test Example 2. FIG. 15 is a drawing illustrating a histogram (class width 0.5 μm) of pitches of reflective inclined surfaces in the z direction according to Test Example 2. FIG. 16 is a drawing illustrating a correlation coefficient R(ΔP) of a waviness profile according to Test Example 2. FIG. 17 is a drawing illustrating a relationship between an exit angle and an intensity of a background-transmitted light according to Test Example 2. An intensity was measured with every 0.014 degrees of an exit angle. In Test Example 2, an intensity ratio (I1/I2) of an intensity I1 (see FIG. 17) of a diffracted light with the highest intensity among diffracted lights to an intensity I2 (see FIG. 17) of a light at a measurement point adjacent to the diffracted light was 7 or more (more specifically about $10^2$), and therefore, the diffracted light was observed as a double image. In Test Example 2, an intensity ratio (I0/I1) of an intensity I0 of a light of which exit angle is 0 degrees to the intensity I1 of the diffracted light with the highest intensity was $10^5$ or more.

Figure 18:
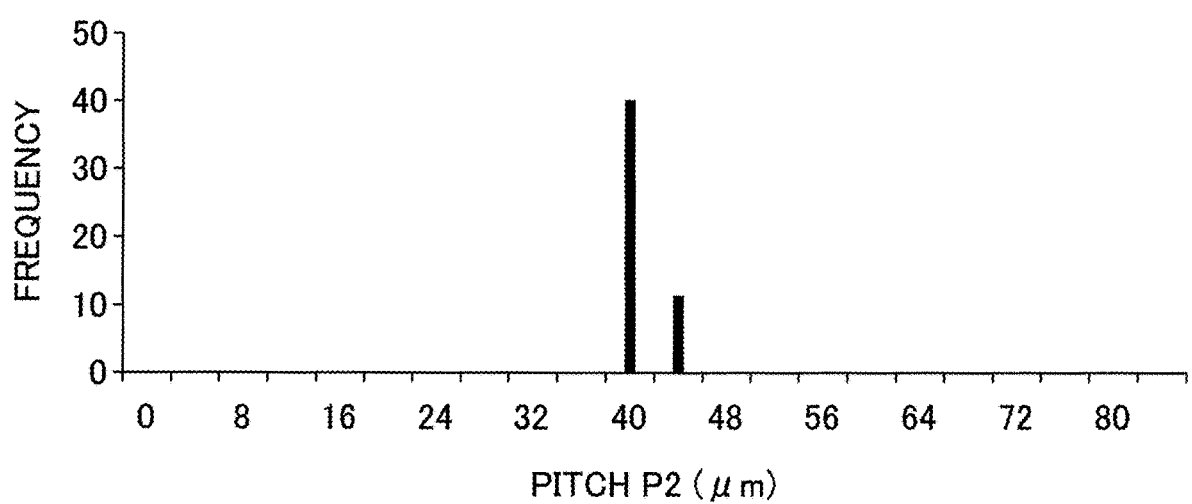
FIG. 18 is a drawing illustrating a histogram (class width 4.0 μm) of pitches of reflective inclined surfaces in the z direction according to Test Example 3.
Figure 19:
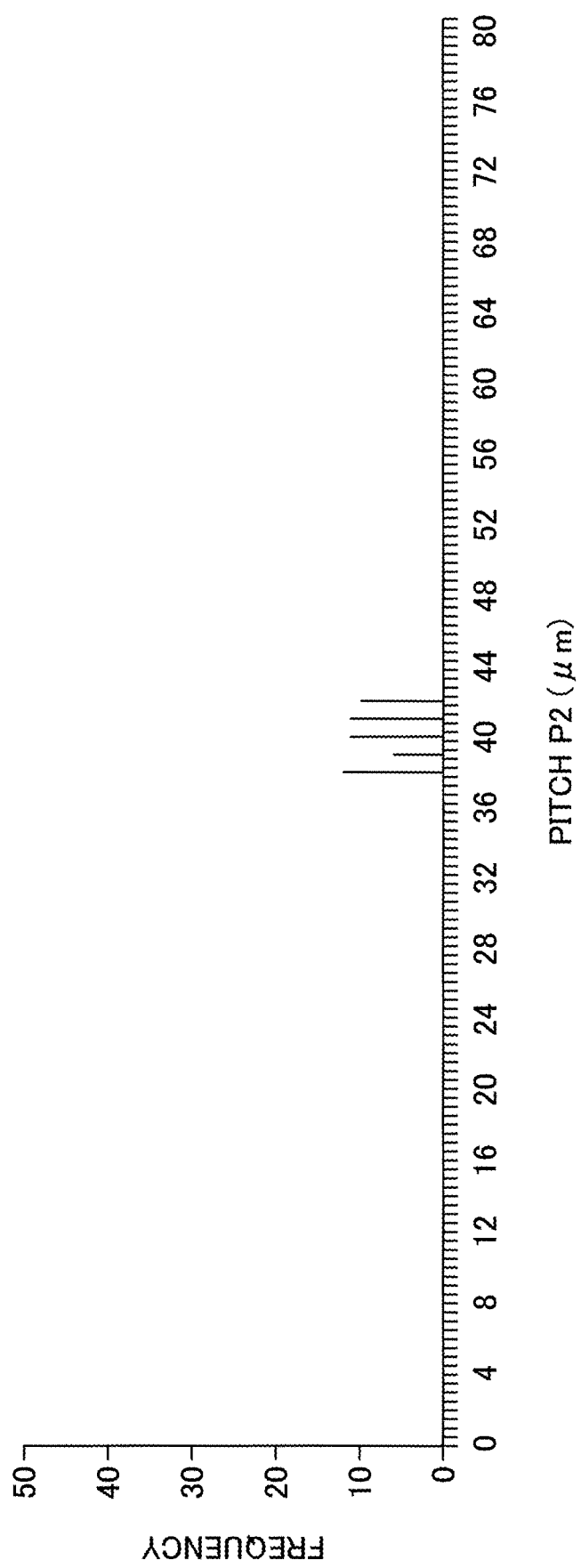
FIG. 19 is a drawing illustrating a histogram (class width 0.5 μm) of pitches of the reflective inclined surfaces in the z direction according to Test Example 3.
Figure 20:
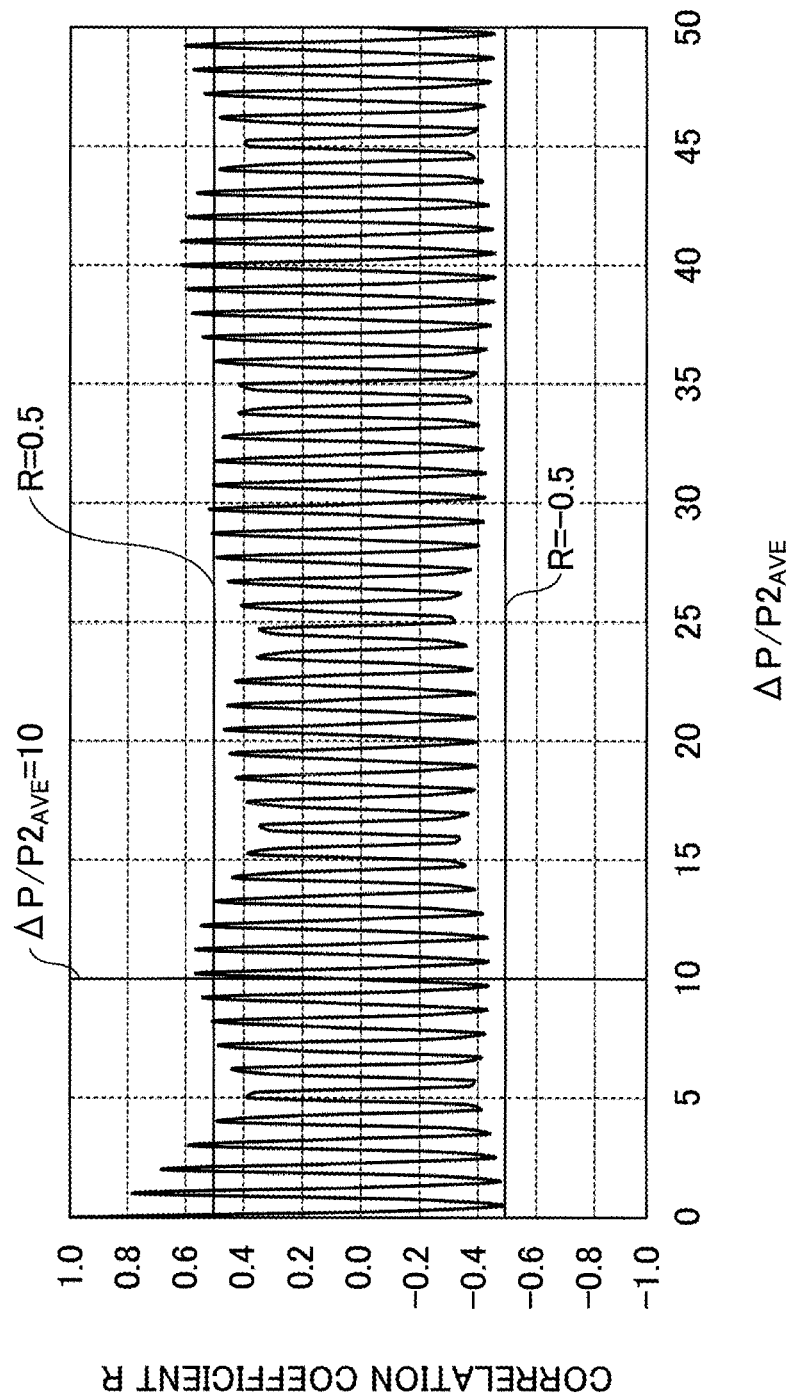
FIG. 20 is a drawing illustrating a correlation coefficient $R(\Delta P)$ of a waviness profile according to Test Example 3.
Figure 21:
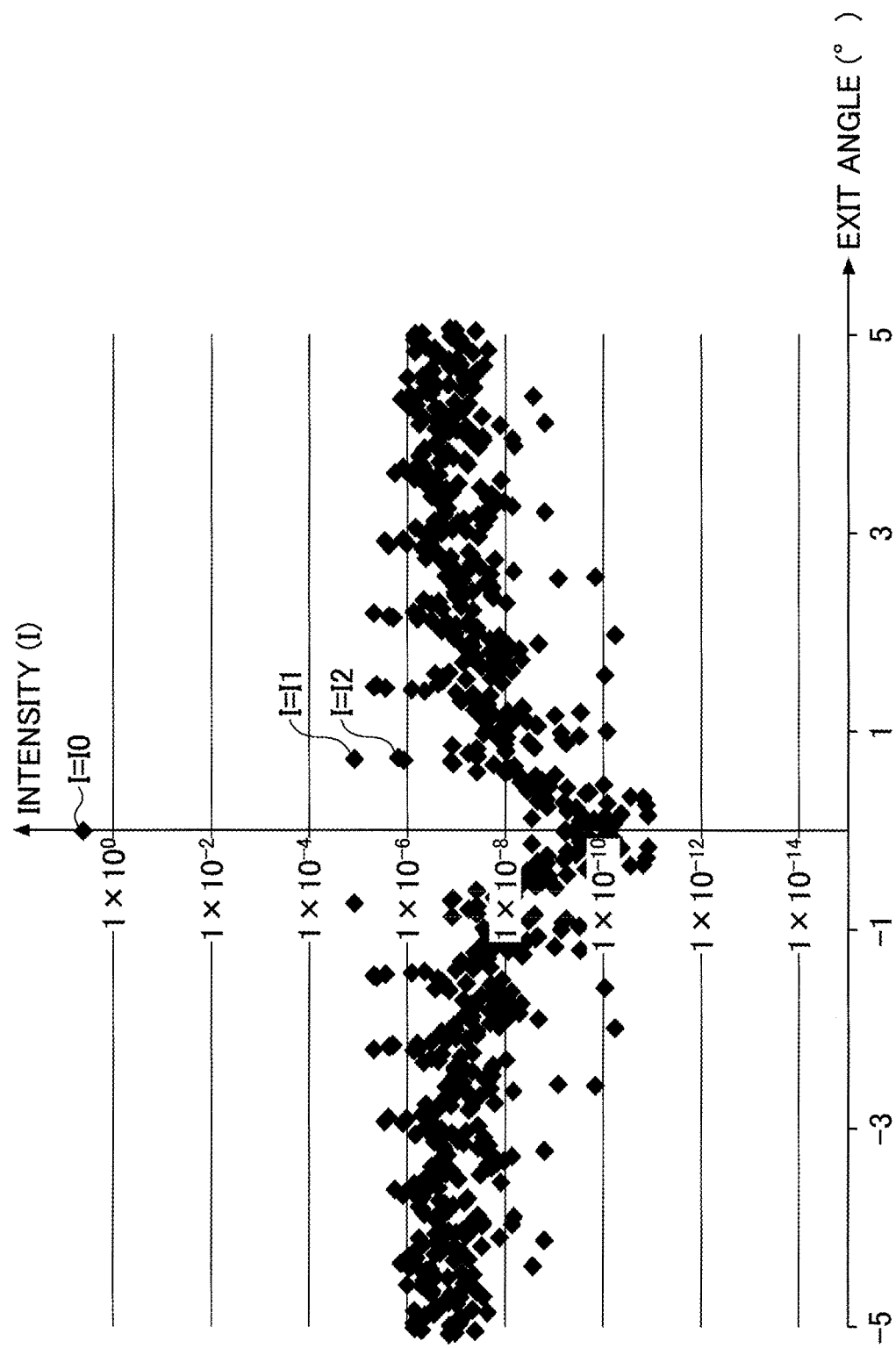
FIG. 21 is a drawing illustrating a relationship between an exit angle and an intensity of a background-transmitted light according to Test Example 3.

FIG. 18 is a drawing illustrating a histogram (class width 4.0 μm) of pitches of reflective inclined surfaces in the z direction according to Test Example 3. FIG. 19 is a drawing illustrating a histogram (class width 0.5 μm) of pitches of reflective inclined surfaces in the z direction according to Test Example 3. FIG. 20 is a drawing illustrating a correlation coefficient R(ΔP) of a waviness profile according to Test Example 3. FIG. 21 is a drawing illustrating a relationship between an exit angle and an intensity of a background-transmitted light according to Test Example 3. An intensity was measured with every 0.014 degrees of an exit angle. In Test Example 3, an intensity ratio (I1/I2) of an intensity I1 (see FIG. 21) of a diffracted light with the highest intensity among diffracted lights to an intensity I2 (see FIG. 21) of a light at a measurement point adjacent to the diffracted light was 7 or more (more specifically about 10), and therefore, the diffracted light was observed as a double image. In Test Example 3, an intensity ratio (I0/I1) of an intensity I0 of a light of which exit angle is 0 degrees to the intensity I1 of the diffracted light with the highest intensity was $10^5$ or more.

Figure 22:
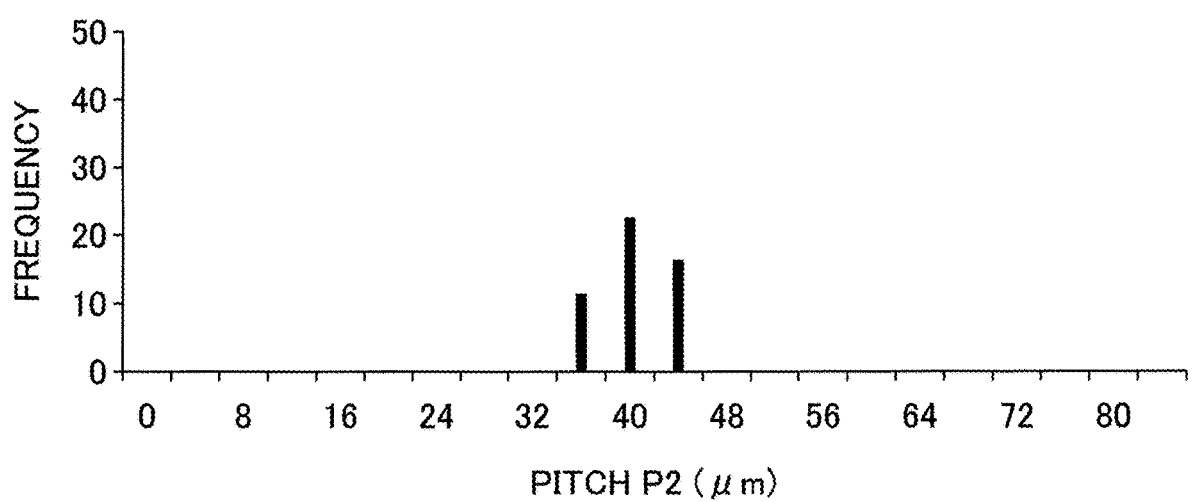
FIG. 22 is a drawing illustrating a histogram (class width 4.0 μm) of pitches of reflective inclined surfaces in the z direction according to Test Example 4.
Figure 23:
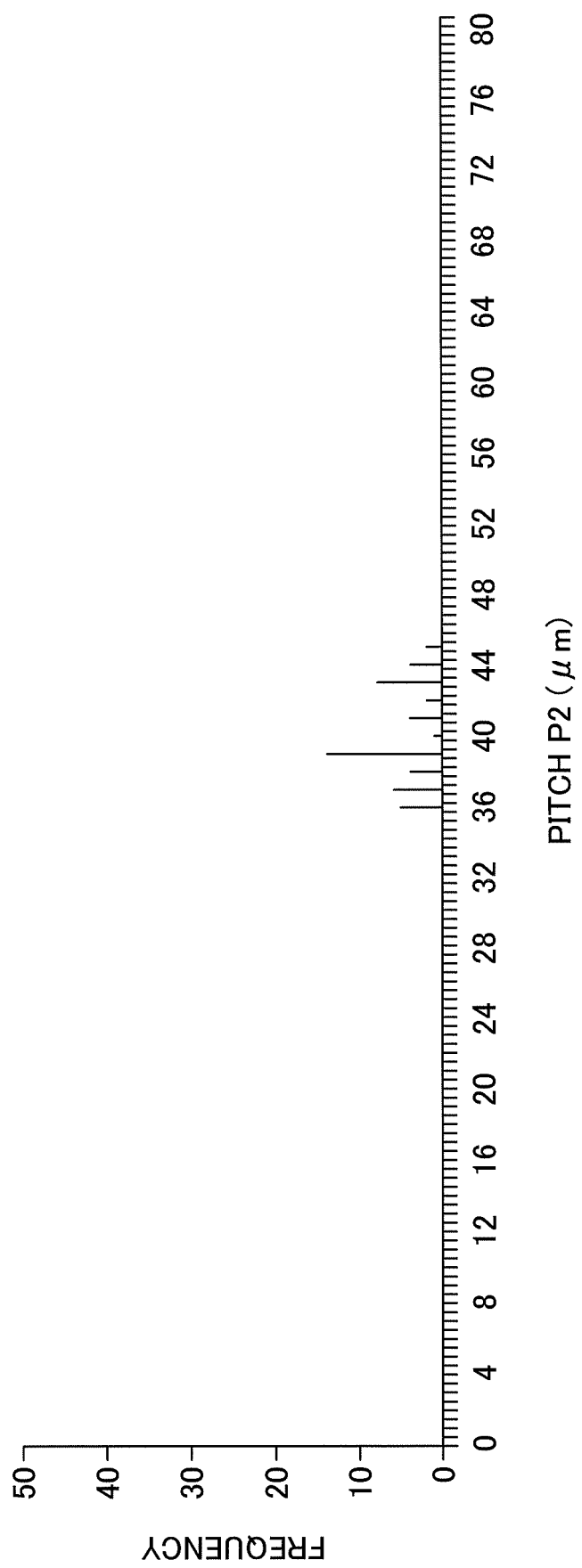
FIG. 23 is a drawing illustrating a histogram (class width 0.5 μm) of pitches of reflective inclined surfaces in the z direction according to Test Example 4.
Figure 24:
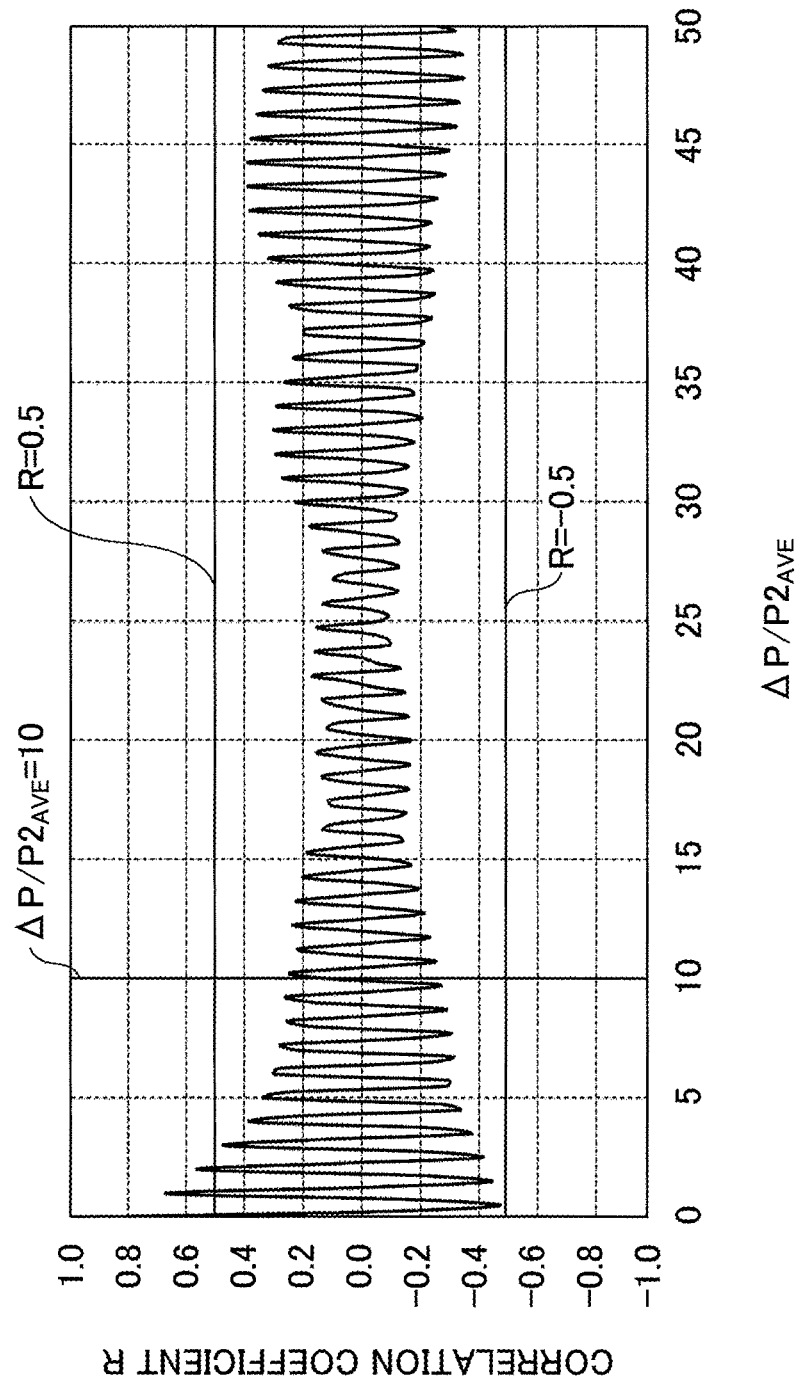
FIG. 24 is a drawing illustrating a correlation coefficient $R(\Delta P)$ of a waviness profile according to Test Example 4.
Figure 25:
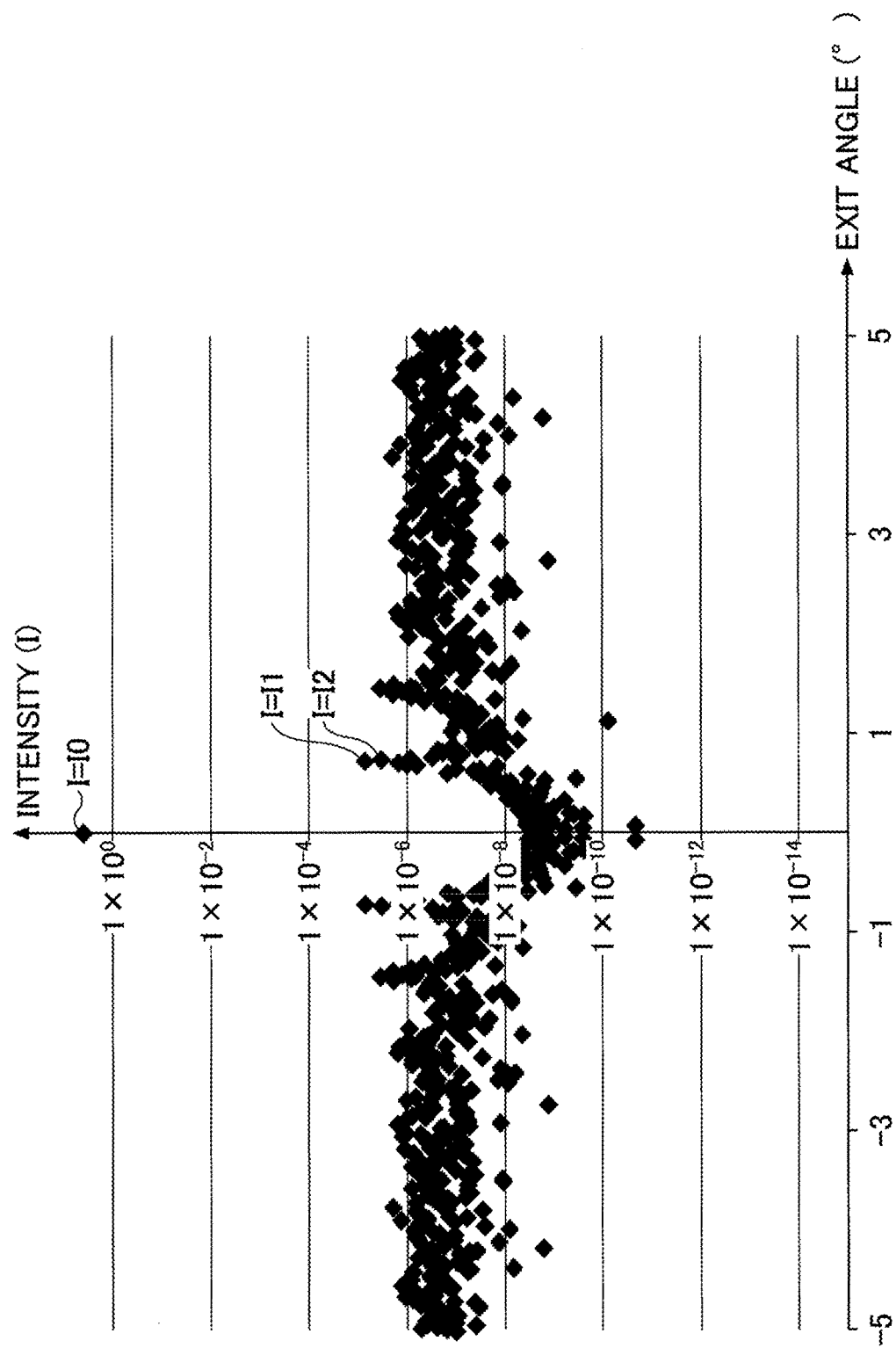
FIG. 25 is a drawing illustrating a relationship between an exit angle and an intensity of background-transmitted light according to Test Example 4.

FIG. 22 is a drawing illustrating a histogram (class width 4.0 μm) of pitches of reflective inclined surfaces in the z direction according to Test Example 4. FIG. 23 is a drawing illustrating a histogram (class width 0.5 μm) of pitches of reflective inclined surfaces in the z direction according to Test Example 4. FIG. 24 is a drawing illustrating a correlation coefficient R(ΔP) of a waviness profile according to Test Example 4. FIG. 25 is a drawing illustrating a relationship between an exit angle and an intensity of a background-transmitted light according to Test Example 4. An intensity was measured with every 0.014 degrees of an exit angle. An intensity was measured with every 0.014 degrees of an exit angle. In Test Example 4, an intensity ratio (I1/I2) of an intensity I1 (see FIG. 25) of a diffracted light with the highest intensity among diffracted lights to an intensity I2 (see FIG. 25) of a light at a measurement point adjacent to the diffracted light was less than 7, and therefore, the diffracted light was not observed as a double image. In Test Example 4, an intensity ratio (I0/I1) of an intensity I0 of a light of which exit angle is 0 degrees to the intensity I1 of the diffracted light with the highest intensity was $10^5$ or more. Since the intensity ratio (I0/I1) was $10^5$ or more, even when the intensity ratio (I1/I2) was less than 7, a point light source of background scenery was not observed as a line.

Figure 26:
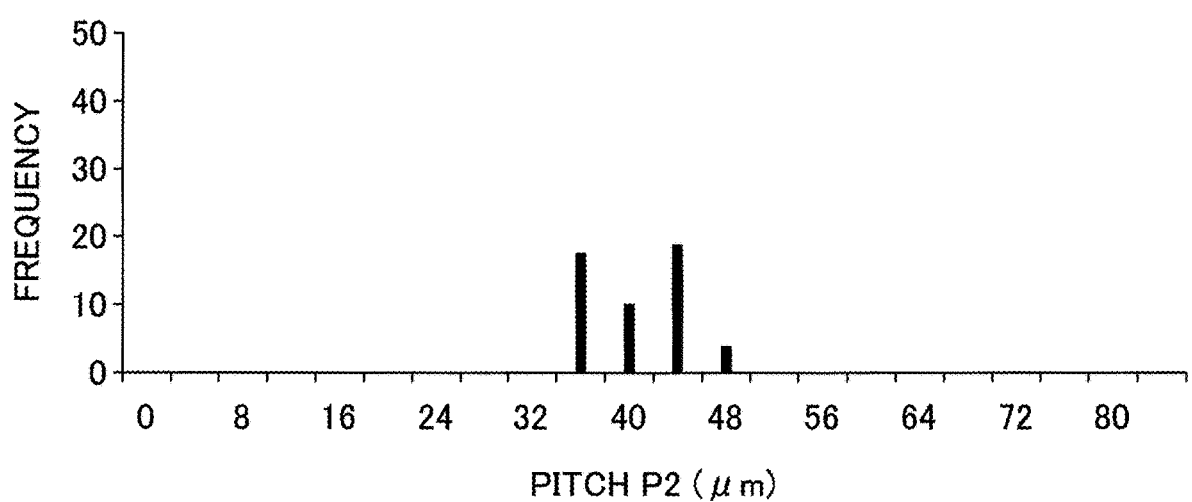
FIG. 26 is a drawing illustrating a histogram (class width 4.0 μm) of pitches of reflective inclined surfaces in the z direction according to Test Example 5.
Figure 27:
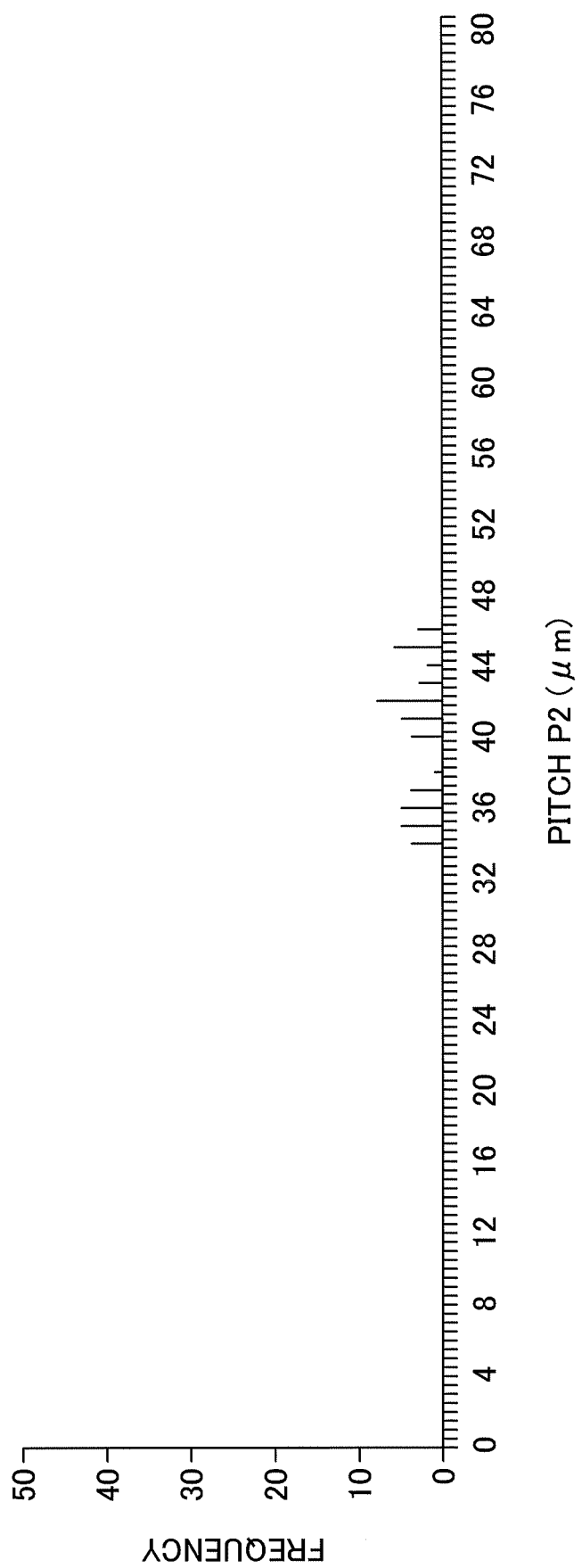
FIG. 27 is a drawing illustrating a histogram (class width 0.5 μm) of pitches of the reflective inclined surfaces in the z direction according to Test Example 5.
Figure 28:
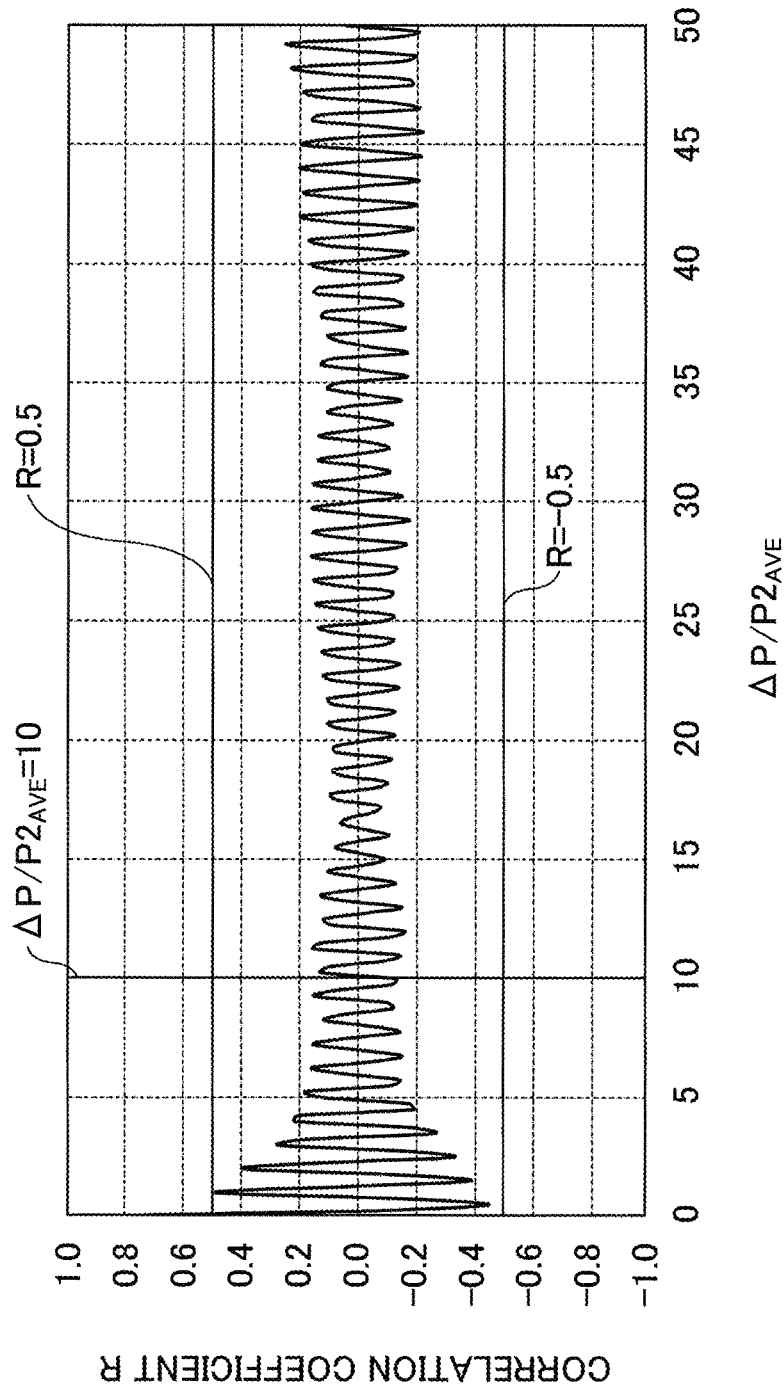
FIG. 28 is a drawing illustrating a correlation coefficient $R(\Delta P)$ of a waviness profile according to Test Example 5.
Figure 29:
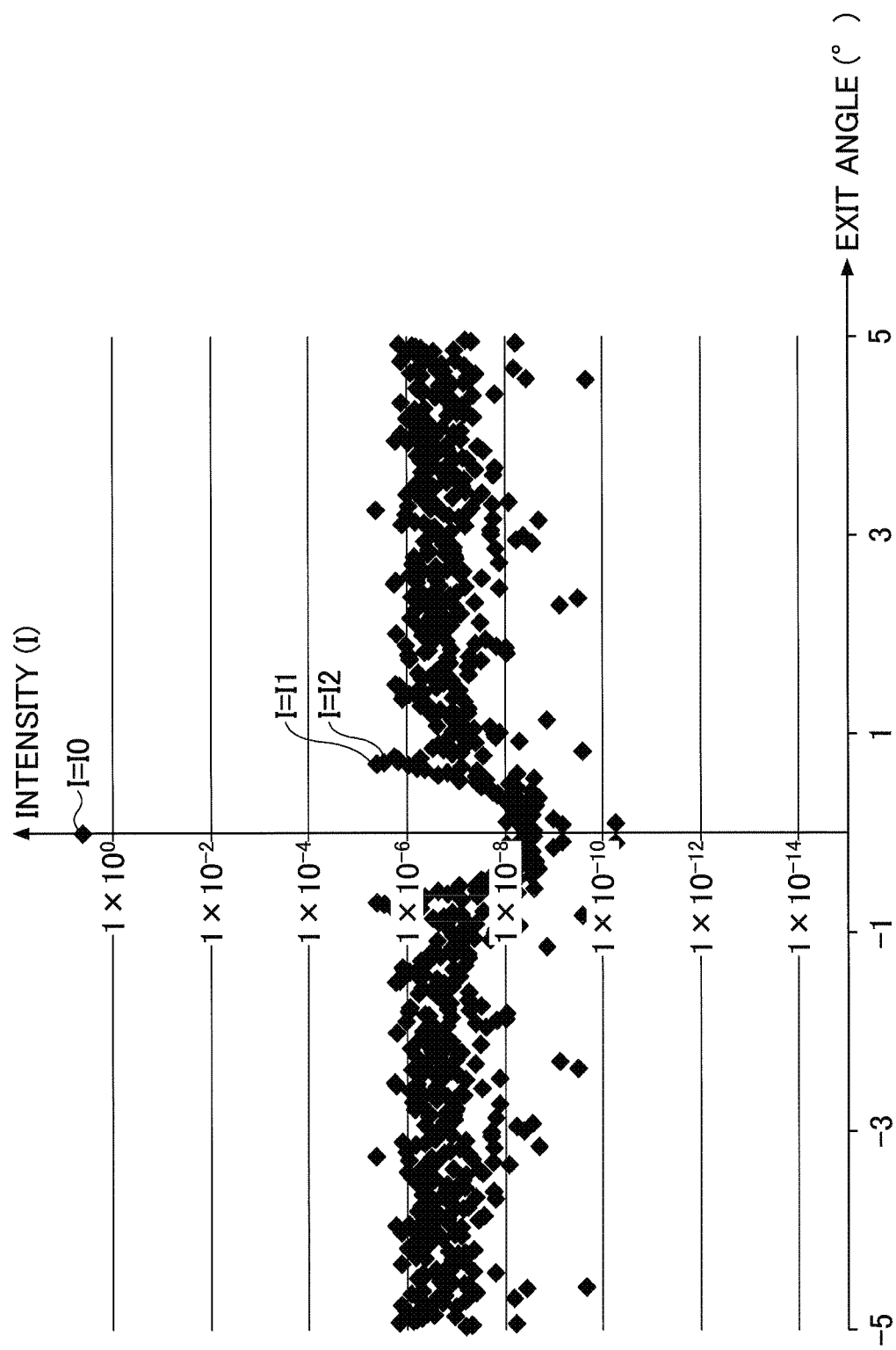
FIG. 29 is a drawing illustrating a relationship between an exit angle and an intensity of a background-transmitted light according to Test Example 5.

FIG. 26 is a drawing illustrating a histogram (class width 4.0 μm) of pitches of reflective inclined surfaces in the z direction according to Test Example 5. FIG. 27 is a drawing illustrating a histogram (class width 0.5 μm) of pitches of reflective inclined surfaces in the z direction according to Test Example 5. FIG. 28 is a drawing illustrating a correlation coefficient R(ΔP) of a waviness profile according to Test Example 5. FIG. 29 is a drawing illustrating a relationship between an exit angle and an intensity of a background-transmitted light according to Test Example 5. An intensity was measured with every 0.014 degrees of an exit angle. In Test Example 5, an intensity ratio (I1/I2) of an intensity I1 (see FIG. 29) of a diffracted light with the highest intensity among diffracted lights to an intensity I2 (see FIG. 29) of a light at a measurement point adjacent to the diffracted light was less than 7, and therefore, the diffracted light was not observed as a double image. In Test Example 5, an intensity ratio (I0/I1) of an intensity I0 of a light of which exit angle is 0 degrees to the intensity I1 of the diffracted light with the highest intensity was $10^5$ or more (more specifically about $10^6$). Since the intensity ratio (I0/I1) was $10^5$ or more, even when the intensity ratio (I1/I2) was less than 7, a point light source of background scenery was not observed as a line.

Figure 41:
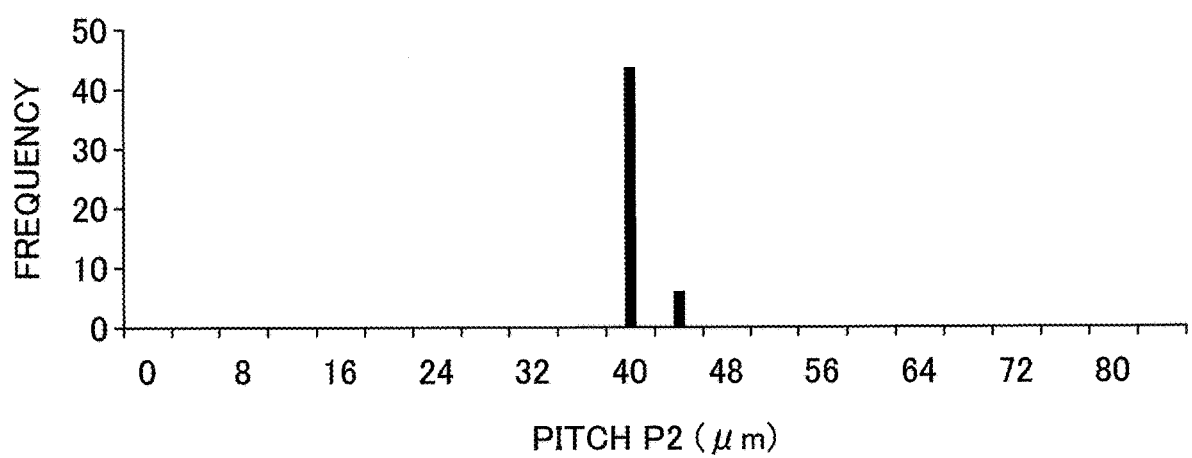
FIG. 41 is a drawing illustrating a histogram (class width 4.0 μm) of pitches of reflective inclined surfaces in the z direction according to Test Example 6.
Figure 42:
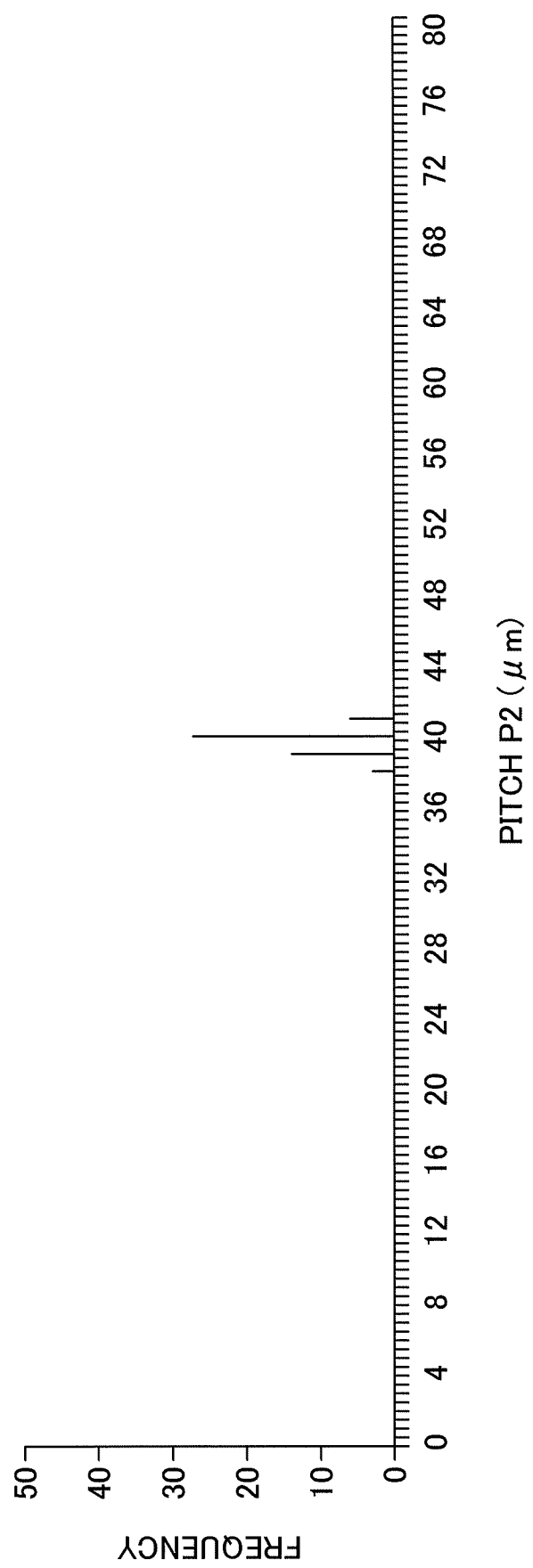
FIG. 42 is a drawing illustrating a histogram (class width 0.5 μm) of pitches of reflective inclined surfaces in the z direction according to Test Example 6.
Figure 43:
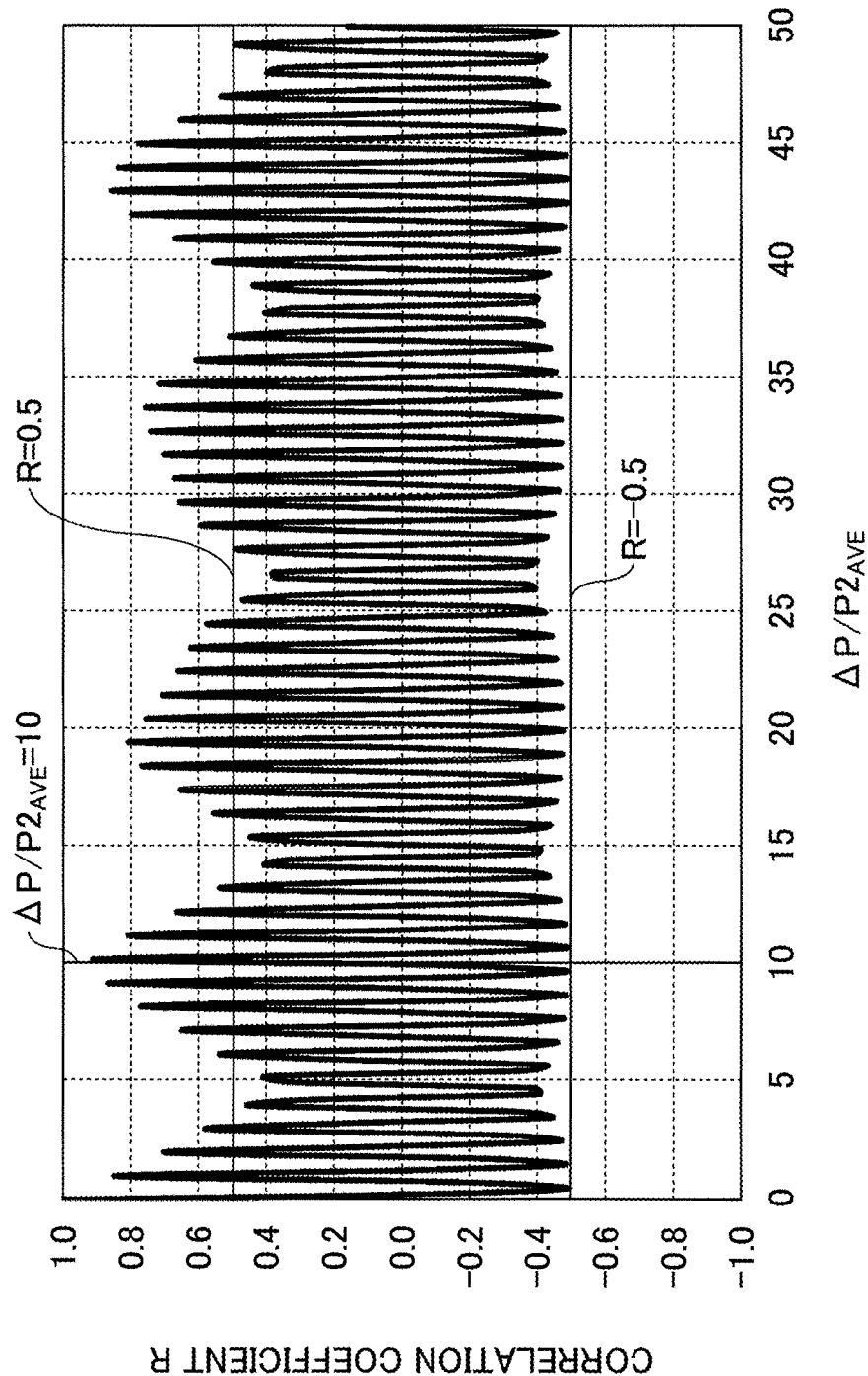
FIG. 43 is a drawing illustrating a correlation coefficient $R(\Delta P)$ of a waviness profile according to Test Example 6.
Figure 44:
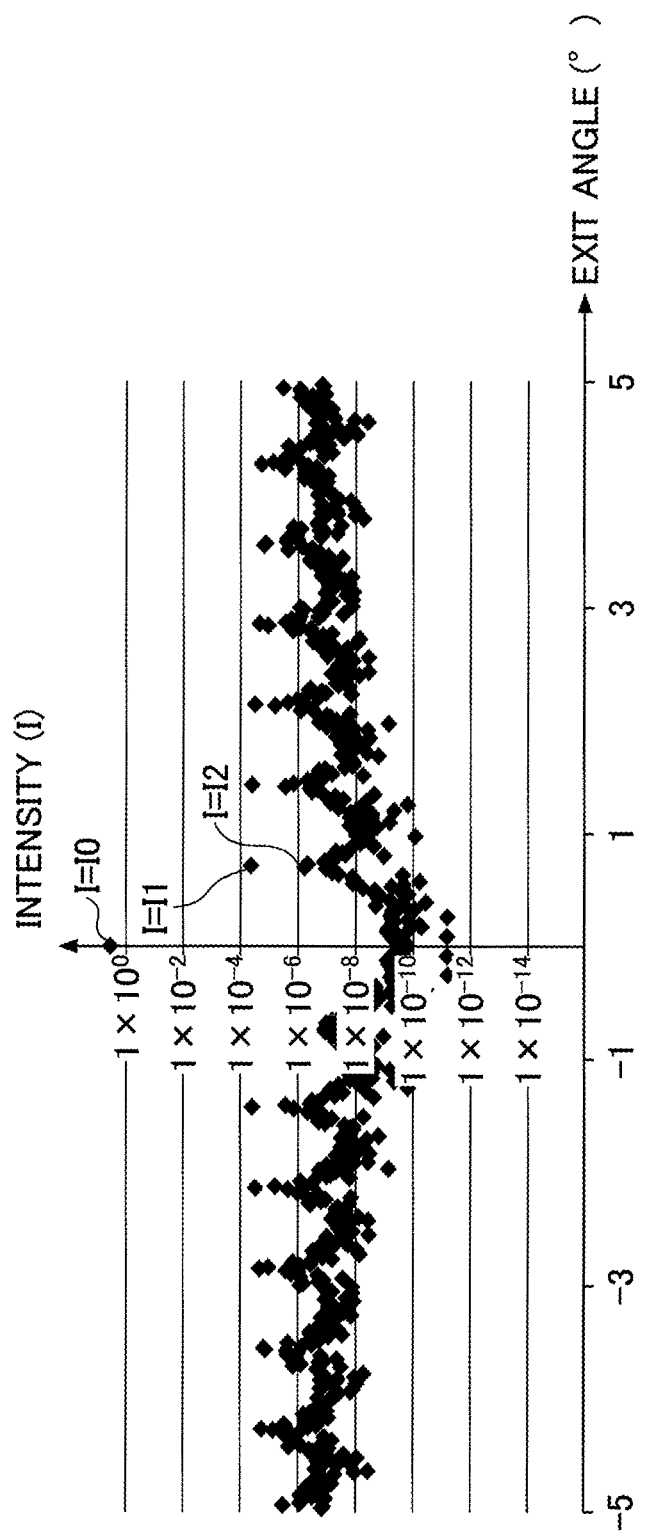
FIG. 44 is a drawing illustrating a relationship between an exit angle and an intensity of a background-transmitted light according to Test Example 6.

FIG. 41 is a drawing illustrating a histogram (class width 4.0 μm) of pitches of reflective inclined surfaces in the z direction according to Test Example 6. FIG. 42 is a drawing illustrating a histogram (class width 0.5 μm) of pitches of reflective inclined surfaces in the z direction according to Test Example 6. FIG. 43 is a drawing illustrating a correlation coefficient R(ΔP) of a waviness profile according to Test Example 6. FIG. 44 is a drawing illustrating a relationship between an exit angle and an intensity of a background-transmitted light according to Test Example 6. An intensity was measured with every 0.014 degrees of an exit angle. In Test Example 6, an intensity ratio (I1/I2) of an intensity I1 (see FIG. 44) of a diffracted light with the highest intensity among diffracted lights to an intensity I2 (see FIG. 44) of a light at a measurement point adjacent to the diffracted light was 7 or more (more specifically about 70), and therefore, the diffracted light was observed as a double image. In Test Example 6, an intensity ratio (I0/I1) of an intensity I0 of a light of which exit angle is 0 degrees to the intensity I1 of the diffracted light with the highest intensity was $10^5$ or more (more specifically about $10^6$).

Figure 45:
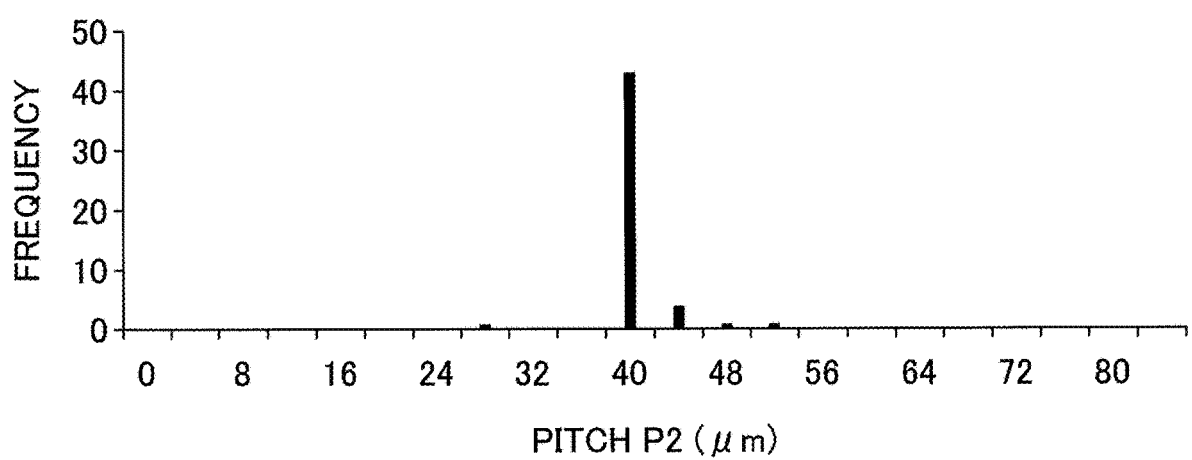
FIG. 45 is a drawing illustrating a histogram (class width 4.0 μm) of pitches of reflective inclined surfaces in the z direction according to Test Example 7.
Figure 46:
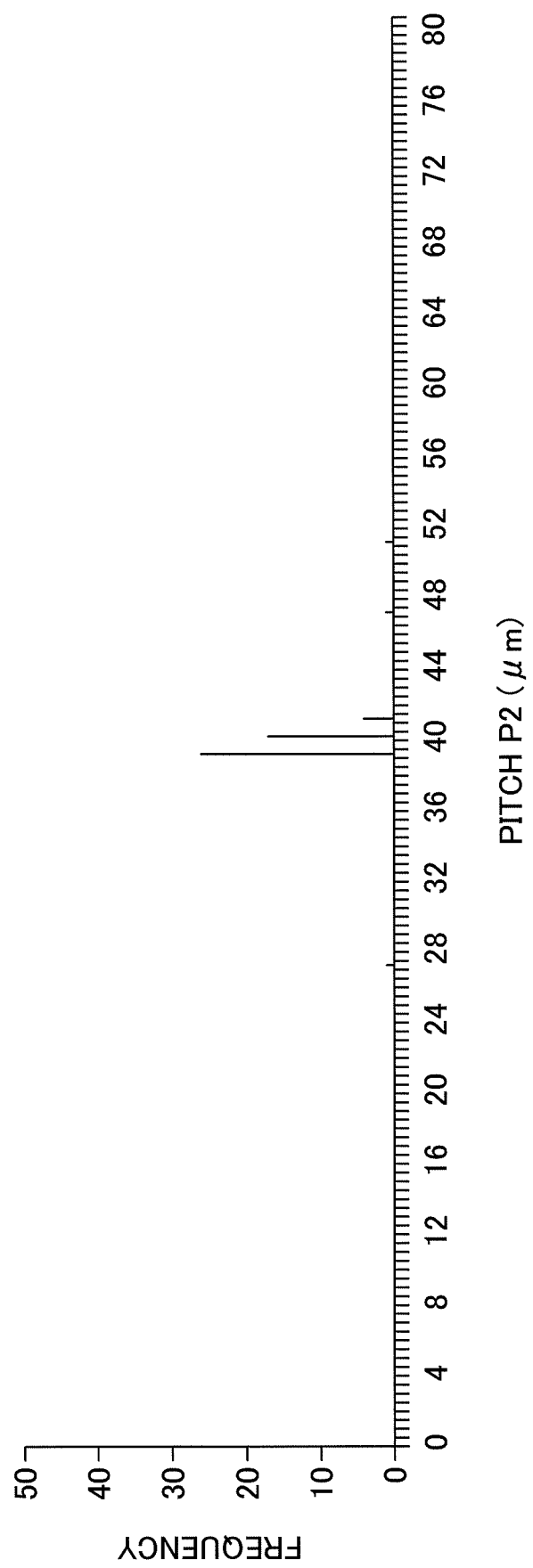
FIG. 46 is a drawing illustrating a histogram (class width 0.5 μm) of pitches of reflective inclined surfaces in the z direction according to Test Example 7.
Figure 47:
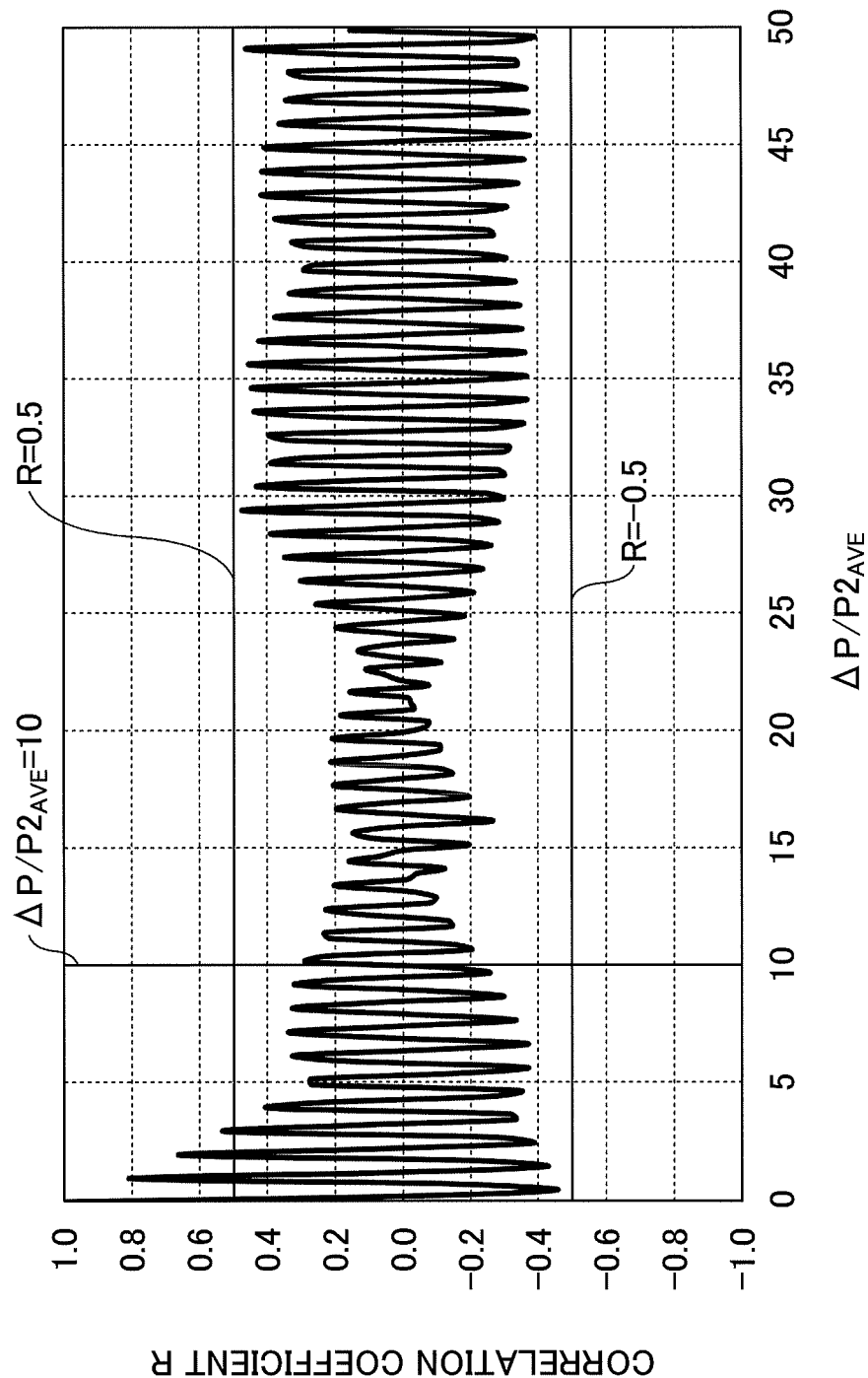
FIG. 47 is a drawing illustrating a correlation coefficient $R(\Delta P)$ of a waviness profile according to Test Example 7.
Figure 48:
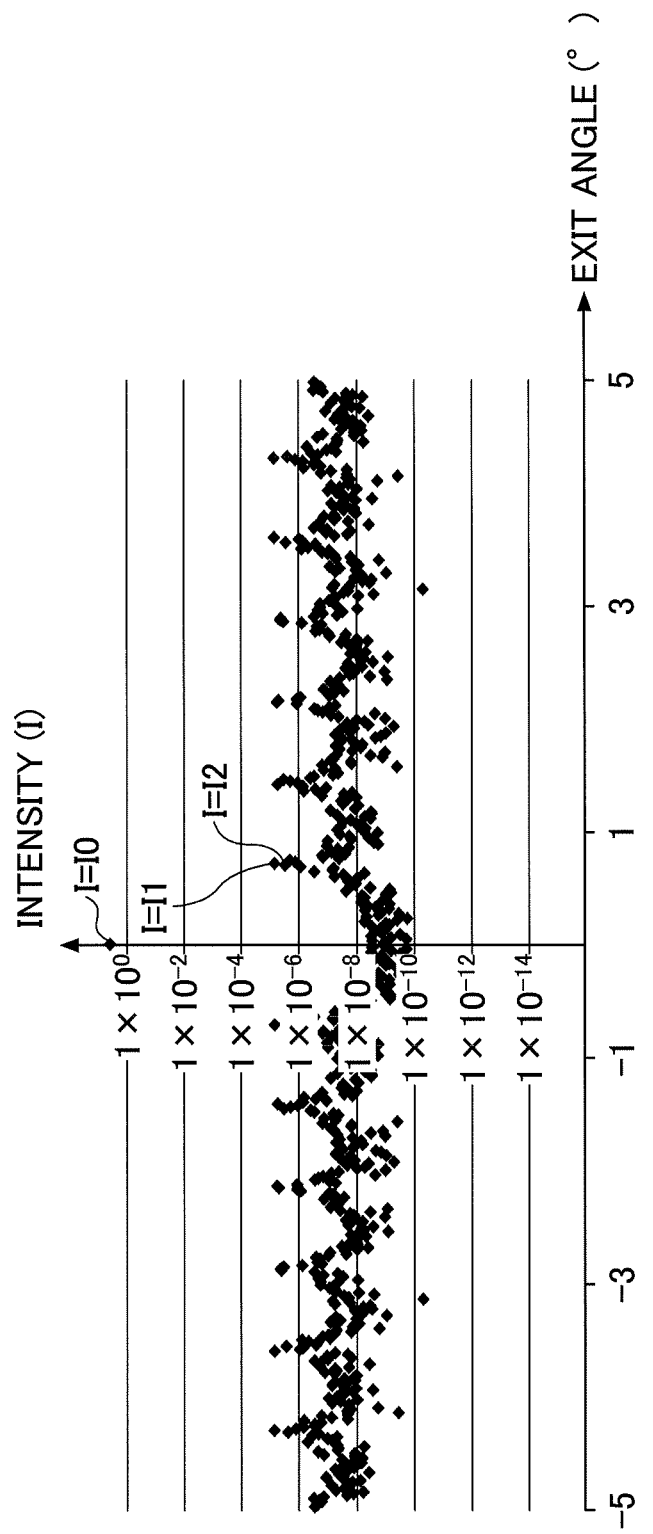
FIG. 48 is a drawing illustrating a relationship between an exit angle and an intensity of background-transmitted light according to Test Example 7.

FIG. 45 is a drawing illustrating a histogram (class width 4.0 μm) of pitches of reflective inclined surfaces in the z direction according to Test Example 7. FIG. 46 is a drawing illustrating a histogram (class width 0.5 μm) of pitches of reflective inclined surfaces in the z direction according to Test Example 7. FIG. 47 is a drawing illustrating a correlation coefficient R(ΔP) of a waviness profile according to Test Example 7. FIG. 48 is a drawing illustrating a relationship between an exit angle and an intensity of a background-transmitted light according to Test Example 7. An intensity was measured with every 0.014 degrees of an exit angle. In Test Example 7, an intensity ratio (I1/I2) of an intensity I1 (see FIG. 48) of a diffracted light with the highest intensity among diffracted lights to an intensity I2 (see FIG. 48) of a light at a measurement point adjacent to the diffracted light was less than 7, and therefore, the diffracted light was not observed as a double image. In Test Example 7, an intensity ratio (I0/I1) of an intensity I0 of a light of which exit angle is 0 degrees to the intensity I1 of the diffracted light with the highest intensity was $10^5$ or more (more specifically about $10^6$). Since the intensity ratio (I0/I1) was $10^5$ or more, even when the intensity ratio (I1/I2) was less than 7, a point light source of background scenery was not observed as a line.

Figure 49:
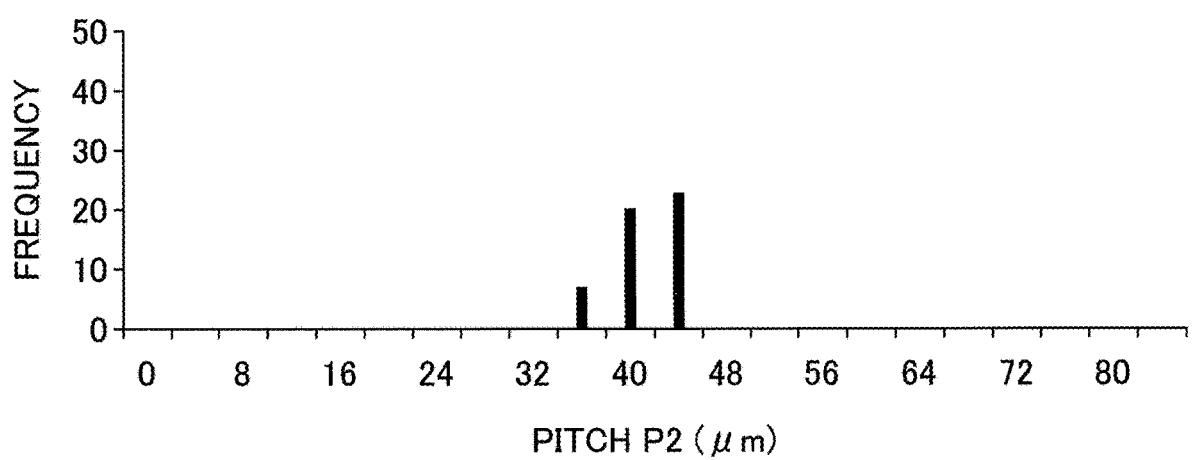
FIG. 49 is a drawing illustrating a histogram (class width 4.0 μm) of pitches of reflective inclined surfaces in the z direction according to Test Example 8.
Figure 50:
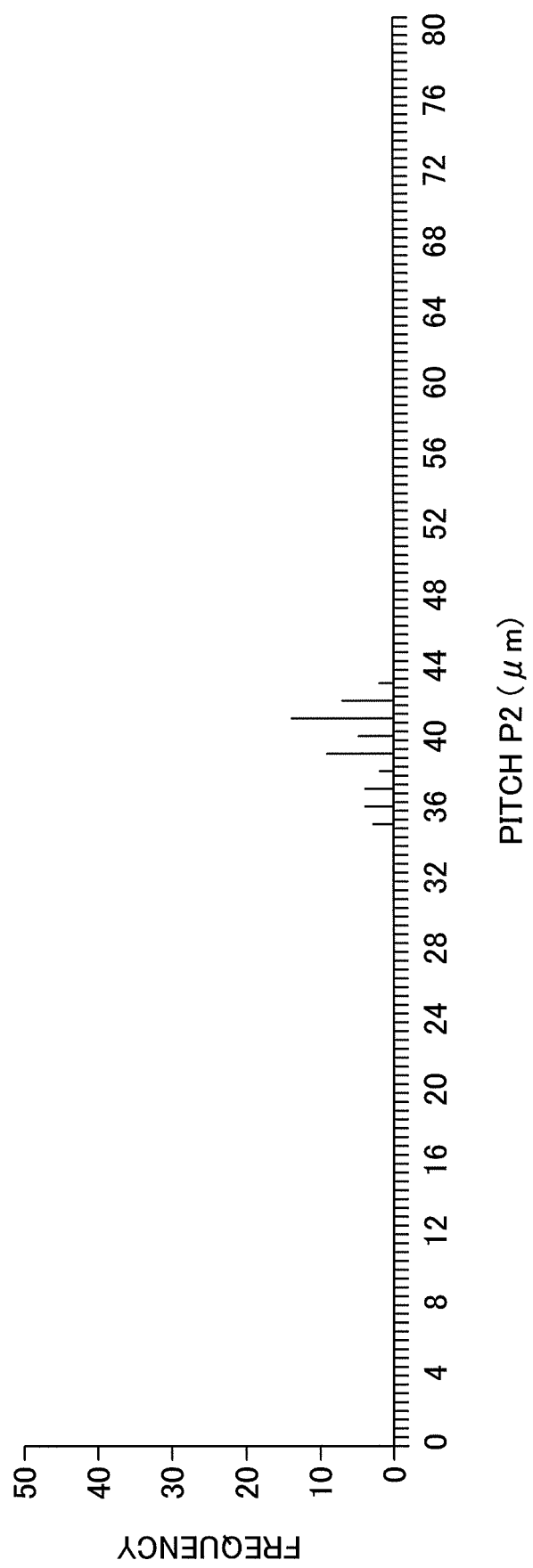
FIG. 50 is a drawing illustrating a histogram (class width 0.5 μm) of pitches of reflective inclined surfaces in the z direction according to Test Example 8.
Figure 51:
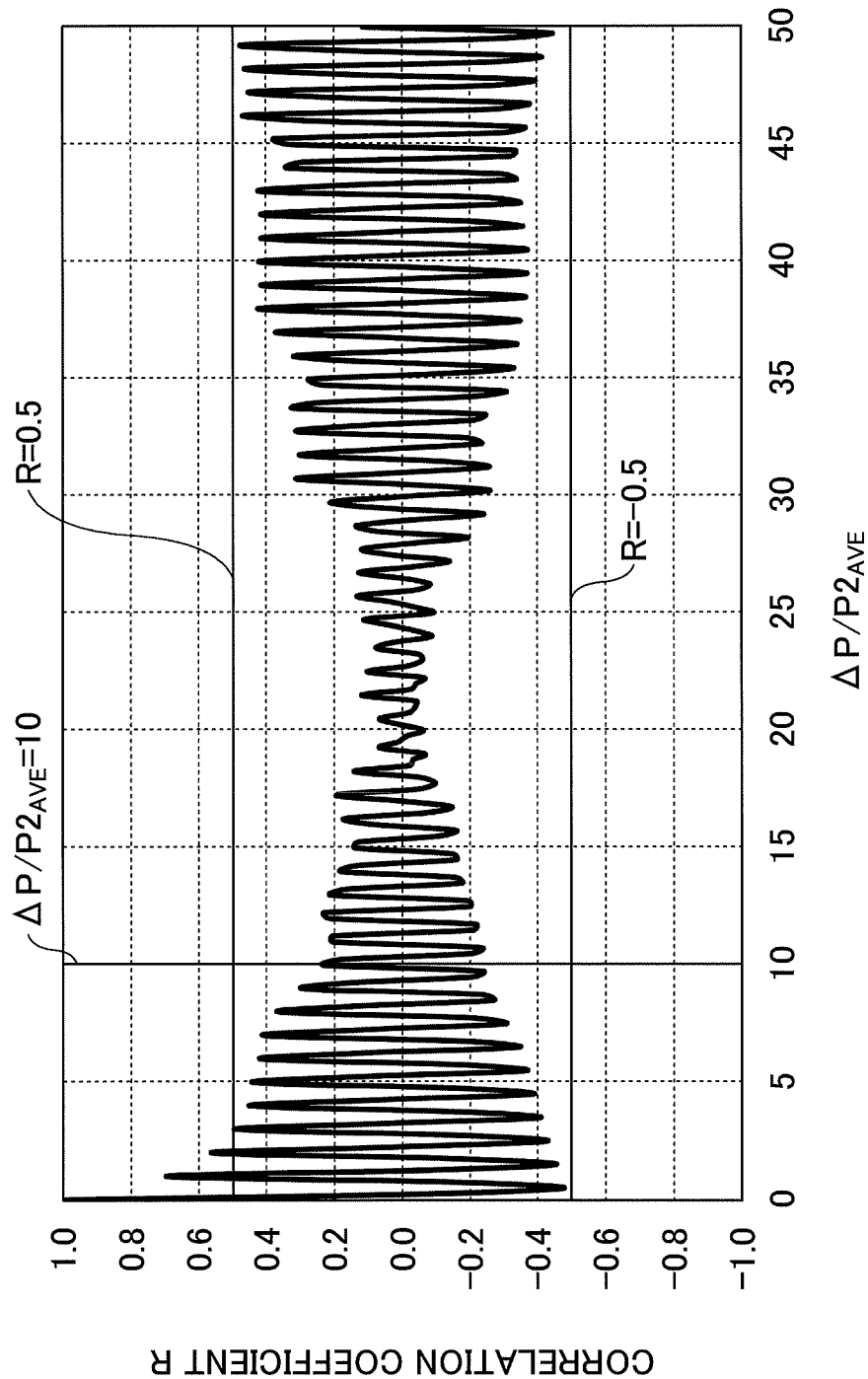
FIG. 51 is a drawing illustrating a correlation coefficient $R(OP)$ of a waviness profile according to Test Example 8.
Figure 52:
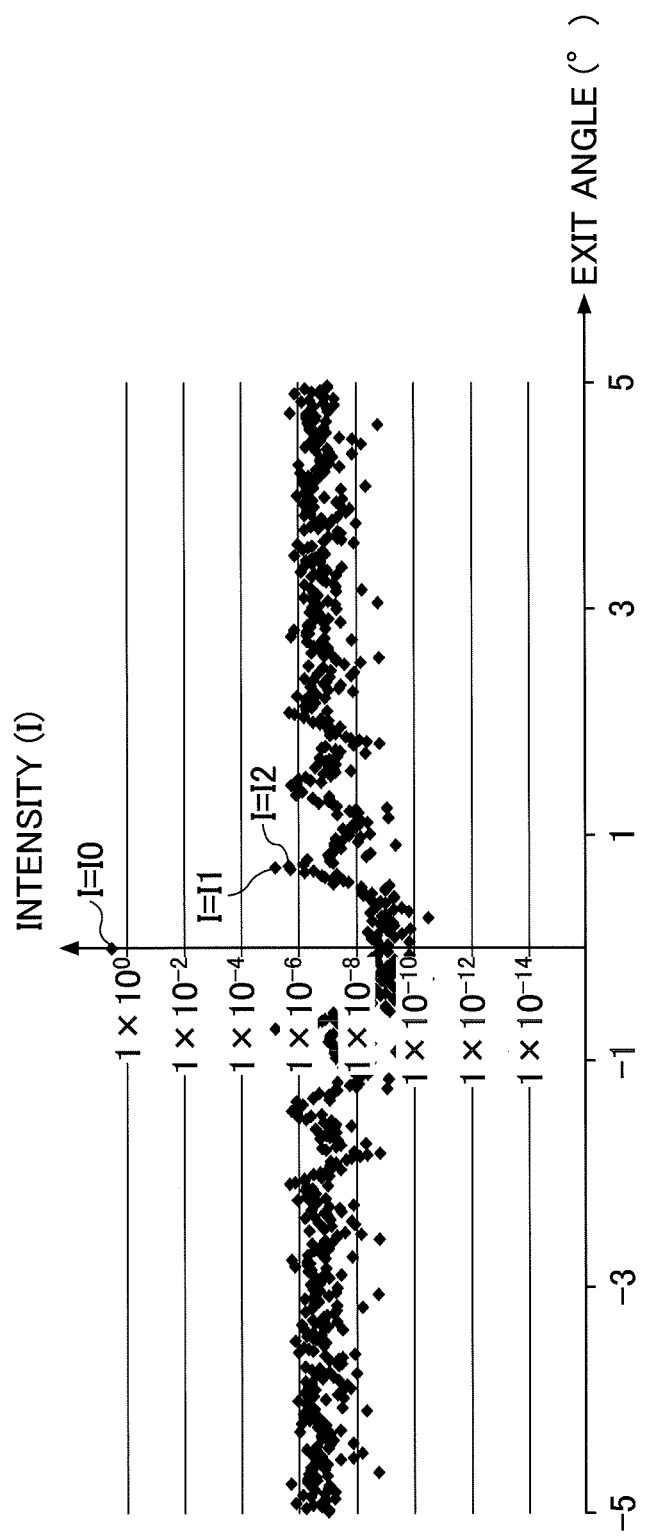
FIG. 52 is a drawing illustrating a relationship between an exit angle and an intensity of a background-transmitted light according to Test Example 8.

FIG. 49 is a drawing illustrating a histogram (class width 4.0 μm) of pitches of reflective inclined surfaces in the z direction according to Test Example 8. FIG. 50 is a drawing illustrating a histogram (class width 0.5 μm) of pitches of reflective inclined surfaces in the z direction according to Test Example 8. FIG. 51 is a drawing illustrating a correlation coefficient R(ΔP) of a waviness profile according to Test Example 8. FIG. 52 is a drawing illustrating a relationship between an exit angle and an intensity of a background-transmitted light according to Test Example 8. An intensity was measured with every 0.014 degrees of an exit angle. In Test Example 8, an intensity ratio (I1/I2) of an intensity I1 (see FIG. 52) of a diffracted light with the highest intensity among diffracted lights to an intensity I2 (see FIG. 52) of a light at a measurement point adjacent to the diffracted light was less than 7, and therefore, the diffracted light was not observed as a double image. In Test Example 8, an intensity ratio (I0/I1) of an intensity I0 of a light of which exit angle is 0 degrees to the intensity I1 of the diffracted light with the highest intensity was $10^5$ or more (more specifically about $10^6$). Since the intensity ratio (I0/I1) was $10^5$ or more, even when the intensity ratio (I1/I2) was less than 7, a point light source of background scenery was not observed as a line.

Subsequently, a relationship between the inclination angle θ2 of the reflective inclined surface 45 and luminance characteristics of the transparent screen will be studied on the basis of Test Example 9 and Test Example 10. In Test Example 9, the inclination angle θ2 of the reflective inclined surface 45 is continuously changed in accordance with the z direction position. The histogram of the pitch P2 of Test Example 9 is the same as the histogram of the pitch P2 of Test Example 4. In contrast, in Test Example 10, the inclination angle θ2 of the reflective inclined surface 45 is maintained constant regardless of the z direction position. The histogram of the pitch P2 of Test Example 10 is the same as the histogram of the pitch P2 of Test Example 1. Normally, the positional relationship between the projector 12, the observer 13, and the transparent screen 20 is fixed, and therefore, the luminance characteristics of the transparent screen 20 is mainly determined by the inclination angle θ2 of the reflective inclined surface 45. The pitch P2 of the reflective inclined surface 45 in the z direction and PV1/P2 do not appreciably affect the luminance characteristics of the transparent screen 20.

Figure 53:
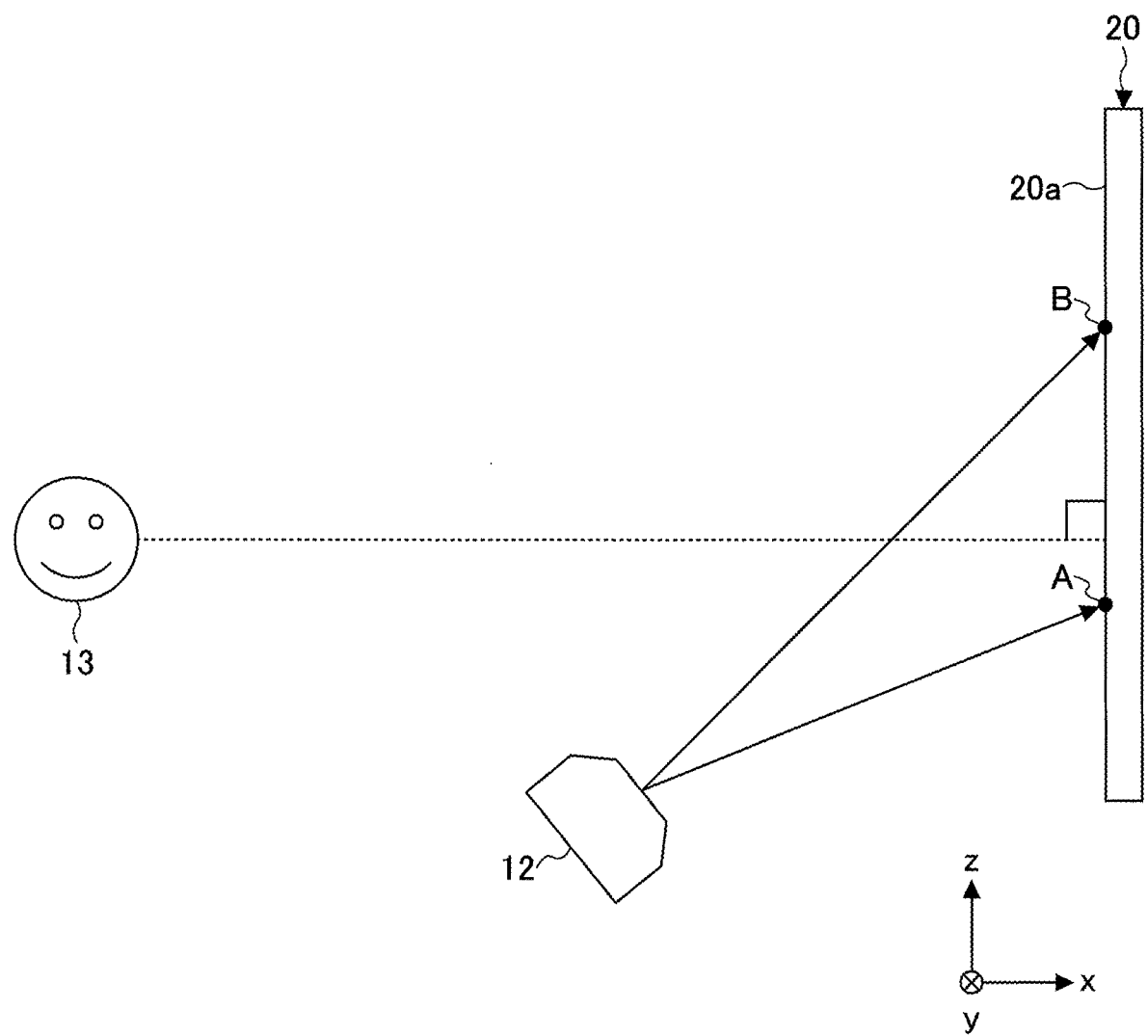
FIG. 53 is an explanatory diagram schematically illustrating a positional relationship between a projector, an observer, and a transparent screen according to Test Example 9 and Test Example 10.

FIG. 53 is an explanatory diagram schematically illustrating a positional relationship between a projector, an observer, and a transparent screen according to Test Example 9 and Test Example 10. In FIG. 53, the y direction positions of the projector 12, the observer 13, and the point A and the point B of the transparent screen 20 are the same. The x direction positions and the z direction positions (unit: mm) of the projector 12, the observer 13, and the point A and the point B of the transparent screen 20 are as illustrated in Table 2.

TABLE 2

|  | X direction position (mm) | Z direction Position (mm) |
| --- | --- | --- |
| Projector 12 | −693 | −400 |
| Observer 13 | −1500 | 0 |
| Point A | 0 | −60 |
| Point B | 0 | 240 |

In Table 2, the x direction position of the front surface 20a of the transparent screen 20 is "0", which is the reference position of the x direction position. The z direction position of the observer 13 is "0", which is the reference position of the z direction position.

The inclination angle θ1 of the inclined surface 42 and the inclination angle θ2 of the reflective inclined surface 45, measured at the point A and the point B of FIG. 53 and Table 2, are as shown in Table 3.

TABLE 3

|  | Test Example 9 | Test Example 10 |
| --- | --- | --- |
| "−θ1" "−θ2" (degrees) at Point A | 8 | 12 |
| "−θ1" "−θ2" (degrees) at Point B | 16 | 12 |

As illustrated in Table 3, either of "−θ1" and "−θ2" at the point A of the transparent screen in Test Example 9 was 8 degrees. Also, either of "−θ1" and "−θ2" at the point B of the transparent screen of Test Example 9 was 16 degrees. Further, "−θ1" and "−β2" at the point A of the transparent screen of Test Example 10 was 12 degrees. Still further, "−θ1" and "−β2" at the point B of the transparent screen of Test Example 10 was 12 degrees.

Figure 54:
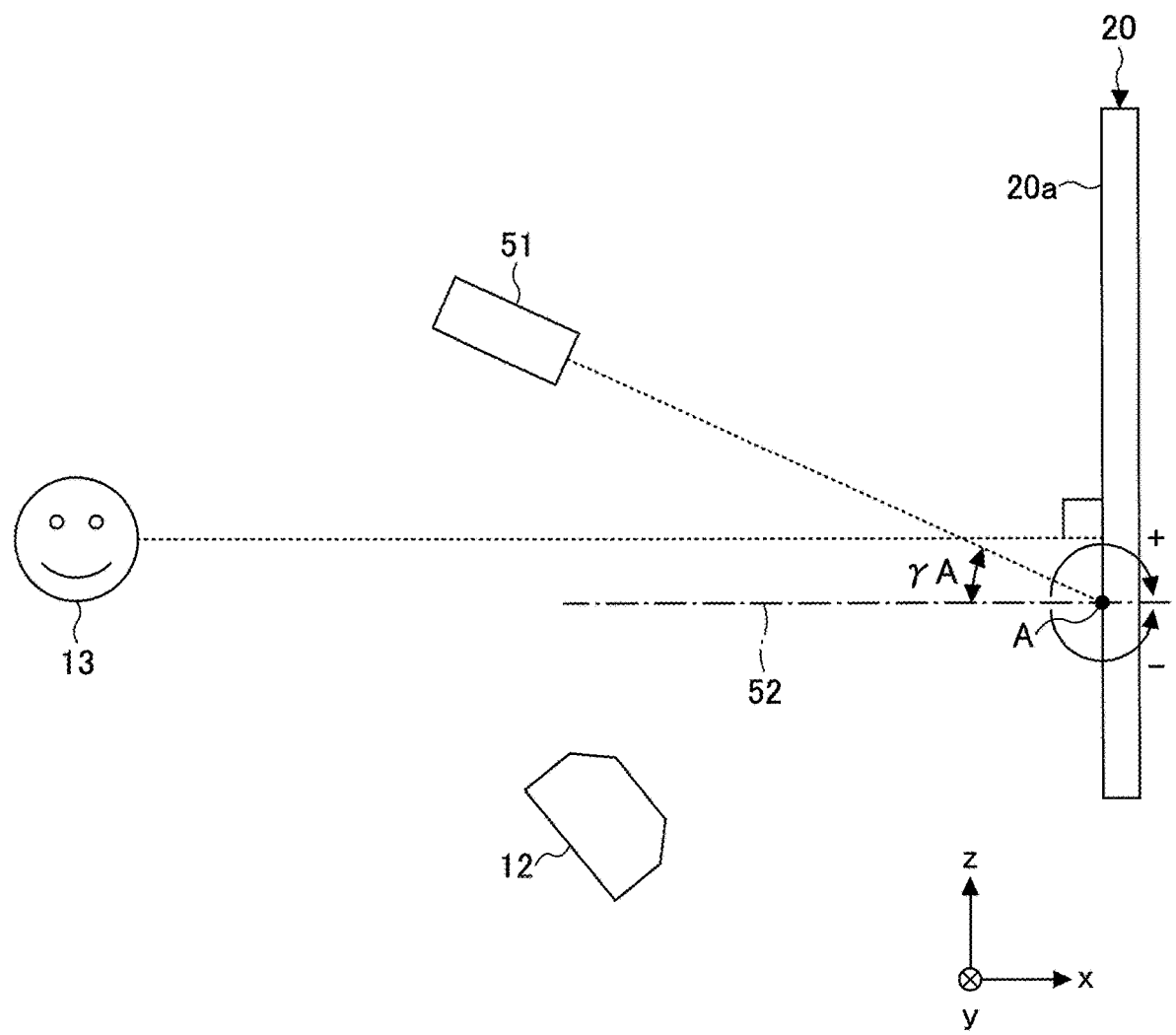
FIG. 54 is a drawing illustrating an arrangement of a luminance meter measuring a luminance at a point A of the transparent screen according to Test Example 9 and Test Example 10.

FIG. 54 is a drawing illustrating an arrangement of a luminance meter for measuring a luminance at the point A of the transparent screen of Test Example 9 and Test Example 10. As illustrated in FIG. 54, the luminance meter 51 is arranged to be able to rotate about the point A of the transparent screen 20 and arranged in a plane including the point A and perpendicular to the y direction. The inclination angle γA of the luminance meter 51 represents an inclination from a normal 52 at the point A of the transparent screen 20. The inclination angle γA being 0 means that the luminance meter 51 is arranged on the normal 52 at the point A of the transparent screen 20. The inclination angle γA being positive means that the luminance meter 51 is arranged at an upper side of the normal 52 in FIG. 54, and the inclination angle γA being negative means that the luminance meter 51 is arranged at a lower side of the normal 52 in FIG. 54. A short focus projector is used as the projector 12 when the luminance at the point A is measured by the luminance meter 51. The inclination angle γA of the luminance meter 51, when the luminance meter 51 is arranged on a line connecting the point A and the observer 13, was 2 degrees.

Figure 55:
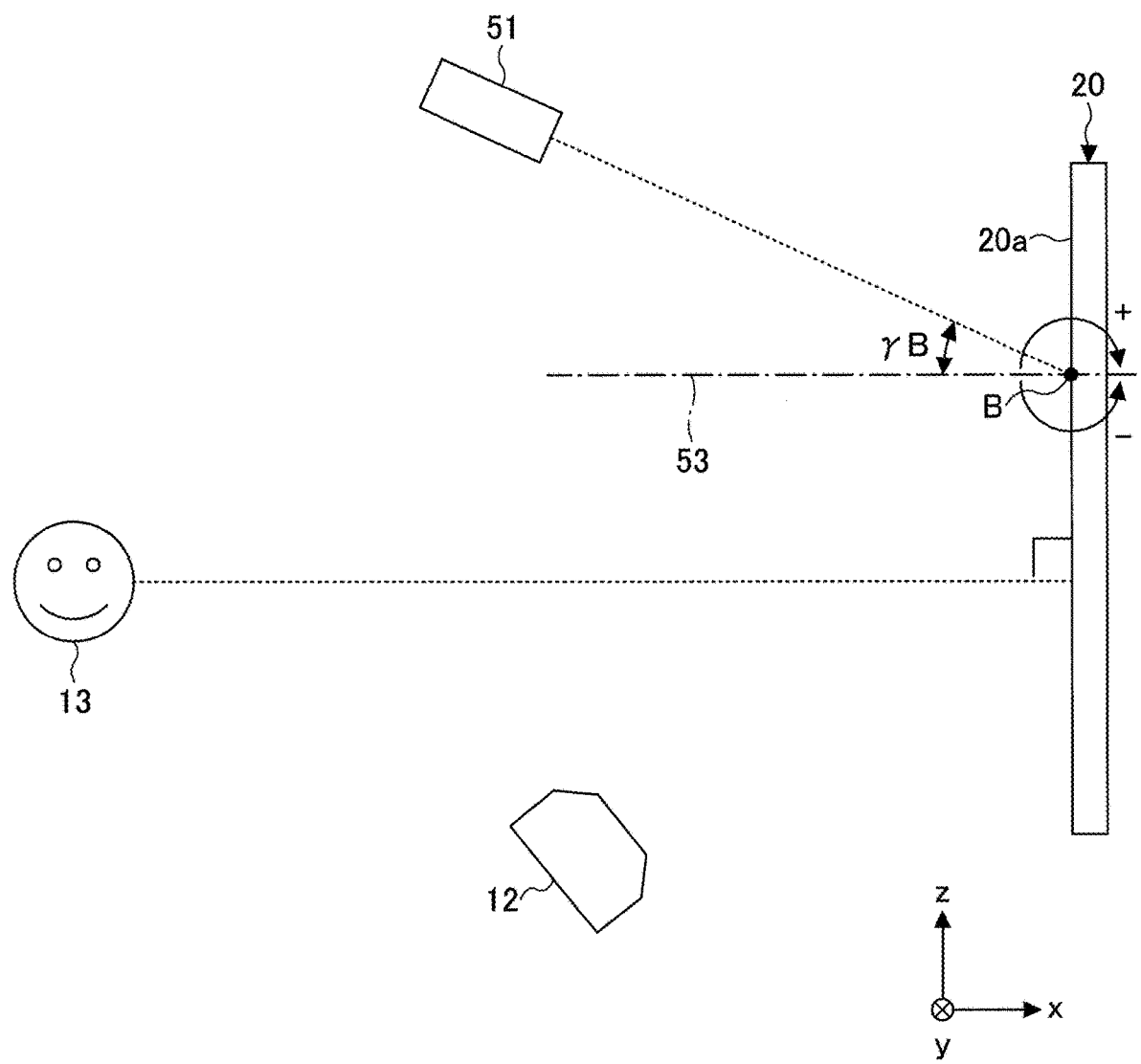
FIG. 55 is a drawing illustrating an arrangement of a luminance meter measuring a luminance at a point B of the transparent screen according to Test Example 9 and Test Example 10.

FIG. 55 is a drawing illustrating an arrangement of a luminance meter for measuring the luminance at the point B of the transparent screen of Test Example 9 and Test Example 10. As illustrated in FIG. 55, the luminance meter 51 is arranged to be able to rotate about the point B of the transparent screen 20 and arranged in a plane including the point B and perpendicular to the y direction. The inclination angle γB of the luminance meter 51 represents an inclination from a normal 53 at the point B of the transparent screen 20. The inclination angle γB being 0 means that the luminance meter 51 is arranged on the normal 53 at the point B of the transparent screen 20. The inclination angle γB being positive means that the luminance meter 51 is arranged at an upper side of the normal 53 in FIG. 55, and the inclination angle γB being negative means that the luminance meter 51 is arranged at a lower side of the normal 53 in FIG. 55. A short focus projector is used as the projector 12 when the luminance at the point B is measured by the luminance meter 51. The inclination angle γB of the luminance meter 51, when the luminance meter 51 is arranged on a line connecting the point B and the observer 13, was −9 degrees.

Figure 56:
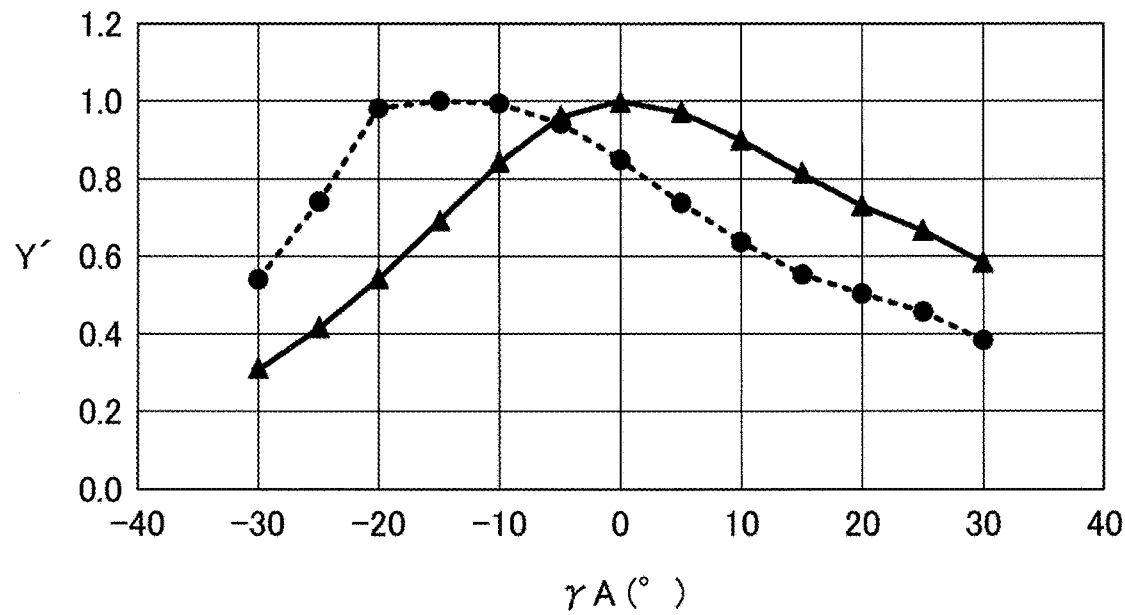
FIG. 56 is a drawing illustrating a relationship between a luminance at the point A of the transparent screen and an inclination angle of a luminance meter measuring the luminance thereof according to Test Example 9 and Test Example 10.

FIG. 56 is a drawing illustrating a relationship between a luminance at the point A of the transparent screen and an inclination angle of a luminance meter for measuring the luminance according to Test Example 9 and Test Example 10. In FIG. 56, a horizontal axis is the inclination angle γA of the luminance meter 51, and the vertical axis is a value Y' obtained by dividing a measured value (cd/m$^2$) of the luminance meter 51 by a maximum value thereof. In FIG. 56, a solid line represents a result of Test Example 9, and a broken line represents a result of Test Example 10. As can be seen from FIG. 56, the inclination angle γA of the luminance meter 51 at which the luminance at the point A of the transparent screen 20 of Test Example 9 becomes maximum was 0 degrees. As can be seen from FIG. 56, the inclination angle γA of the luminance meter 51 at which the luminance at the point A of the transparent screen 20 of Test Example 10 becomes maximum was −15 degrees.

Figure 57:
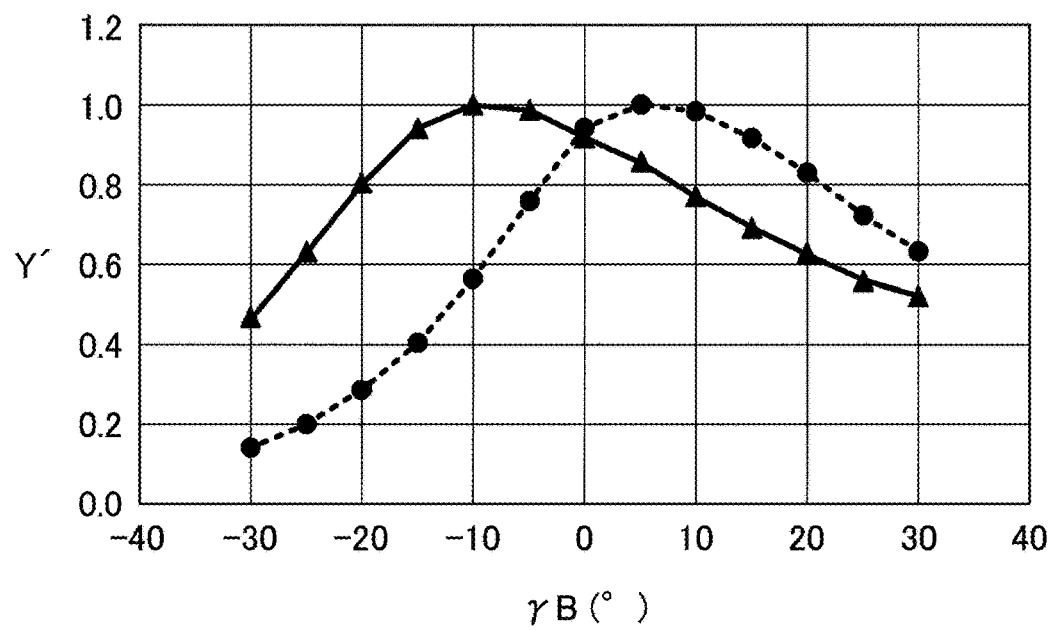
FIG. 57 is a drawing illustrating a relationship between a luminance at the point B of the transparent screen and an inclination angle of a luminance meter measuring the luminance thereof according to Test Example 9 and Test Example 10.

FIG. 57 is a drawing illustrating a relationship between a luminance at the point B of the transparent screen of Test Example 9 and Test Example 10 and an inclination angle of a luminance meter for measuring the luminance. In FIG. 57, the horizontal axis represents the inclination angle γB of the luminance meter 51, and the vertical axis is a value Y' obtained by dividing a measured value (cd/m$^2$) of the luminance meter 51 by a maximum value thereof. In FIG. 57 a solid line represents a result of Test Example 9, and a broken line represents a result of Test Example 10. A can be seen from FIG. 57, the inclination angle γB of the luminance meter 51 at which the luminance at the point B of the transparent screen 20 of Test Example 9 becomes maximum was −10 degrees. As can be seen from FIG. 57, the inclination angle γB of the luminance meter 51 at which the luminance at the point B of the transparent screen 20 of Test Example 10 becomes maximum was 5 degrees.

Results are shown in Table 4.

TABLE 4

|  | Test Example 9 | Test Example 10 |
| --- | --- | --- |
| γA0 (degrees) |  | 2 |
| γA (degrees) | 0 | −15 |
| γA0-γA1 (degrees) | 2 | 17 |
| γE0 (degrees) |  | −9 |
| γE1 (degrees) | −10 | 5 |
| γB0-γB1 (degrees) | 1 | −14 |

In Table 4, γA0 represents the inclination angle γA of the luminance meter 51 when the luminance meter 51 is arranged on a line connecting the point A and the observer 13. γA1 is the inclination angle γA of the luminance meter 51 when the luminance at the point A of the transparent screen 20 becomes maximum. γB0 is the inclination angle γB of the luminance meter 51 when the luminance meter 51 is arranged on a line connecting the point B and the observer 13. γB1 is the inclination angle γB of the luminance meter 51 when a luminance at the point B of the transparent screen 20 becomes maximum. As can be seen from Table 4, in the case of Test Example 9, both of the difference between γA0 and γA1 and the difference between γB0 and γB1 can be reduced, as compared with the case of Test Example 10. Therefore, in the case of Test Example 9, the observer 13 can observe bright light of the same level of brightness at both of the point A and the point B, as compared with the case of Test Example 10.

As hereinabove explained, the reflective layer 34 according to the present embodiment includes a plurality of reflective inclined surfaces 45 inclined with respect to the reference surface 41 and reflecting light of a projected image. A plurality of reflective inclined surfaces 45 are formed in a stripe pattern as seen from a direction normal to the reference surface 41. The reflective inclined surfaces 45 have unevenness, and display an image. Therefore, the reflective inclined surface 45 displaying an image is inclined with respect to surfaces causing a hotspot (e.g., the front surface 11a and the rear surface 11b). A direction in which a bright image is observed becomes a regular reflection direction of the reflective inclined surface 45, and a direction in which a hotspot is observed becomes a regular reflection direction of a front surface 11a and the like. Therefore, a direction in which a hotspot is observed and a direction in which a bright image is observed can be separated from each other, and a position at which a hotspot is not observed but at which a bright image is observed (for example, a position of an observer 13 indicated by a solid line in FIG. 1) can be produced.

Also, in the present embodiment, a plurality of reflective inclined surfaces 45 are formed so that, in at least a part of the image projection area, to which an image is projected, in a section perpendicular to the y direction, the inclination angles θ2 of the reflective inclined surfaces 45, measured on a per-respective reflective inclined surface basis 45, decreases, in a stepwise manner or continuously, away from one end in the z direction (for example, the lower end) toward another end in the z direction (for example, the upper end). Accordingly, at the plurality of reflective inclined surfaces 45 located at different positions in the z direction, a light with the highest intensity among diffusely reflected lights can be directed to the observer 13. Therefore, a difference between brightness of an image-central portion and brightness of an image outer peripheral portion can be reduced, and a direction in which the entire image can be observed brightly can be produced.

(Arrangement of Transparent Screen)

Figure 30:
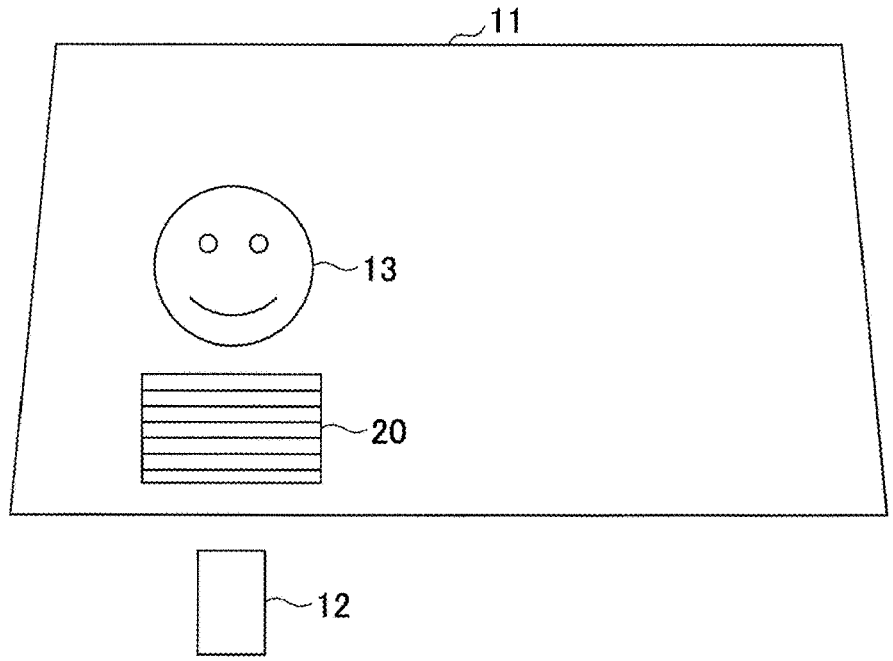
FIG. 30 is a drawing illustrating an example of a positional relationship between a transparent screen of an image projection-laminated plate, a projector, and an observer, as seen from a front side of a vehicle.

FIG. 30 is a drawing illustrating an example of a positional relationship, as seen from a front side of a vehicle, between a transparent screen of an image projection-laminated plate, a projector, and an observer. The image projection-laminated plate 11 is attached to a window at a front of a vehicle. The transparent screen 20 is arranged at a lower portion of the window. The projector 12 is arranged below the window. The eyes of the observer 13 are positioned at the central portion of the window in the vertical direction. In this case, as illustrated in FIG. 30, a plurality of reflective inclined surfaces 45 may form an elongated horizontal stripe extending in the horizontal direction. The observer 13 can observe a bright image at a position where no hotspot is observed.

Figure 31:
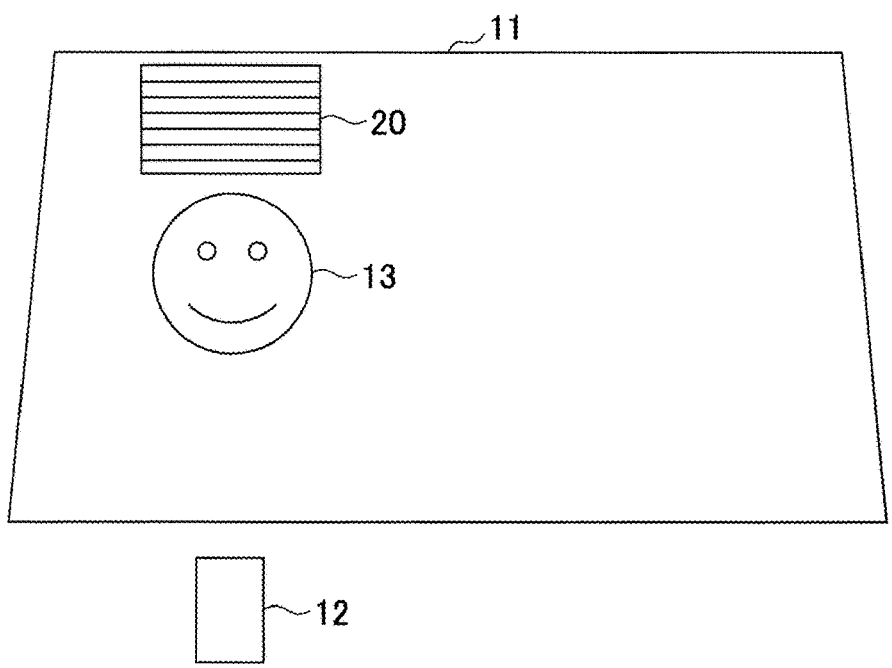
FIG. 31 is a drawing illustrating another example of a positional relationship between a transparent screen of an image projection-laminated plate, a projector, and an observer, as seen from a front side of a vehicle.

FIG. 31 is a drawing illustrating another example of a positional relationship, as seen from a front side of a vehicle, between a transparent screen of an image projection-laminated plate, a projector, and an observer. The image projection-laminated plate 11 is attached to a window at a front of a vehicle. The transparent screen 20 is arranged at an upper portion of the window. The projector 12 is arranged below the window. The eyes of the observer 13 are positioned at the central portion of the window in the vertical direction. Also, in this case, as illustrated in FIG. 31, a plurality of reflective inclined surfaces 45 may form an elongated horizontal stripe extending in the horizontal direction. The observer 13 can observe a bright image at a position where no hotspot is observed.

Figure 32:
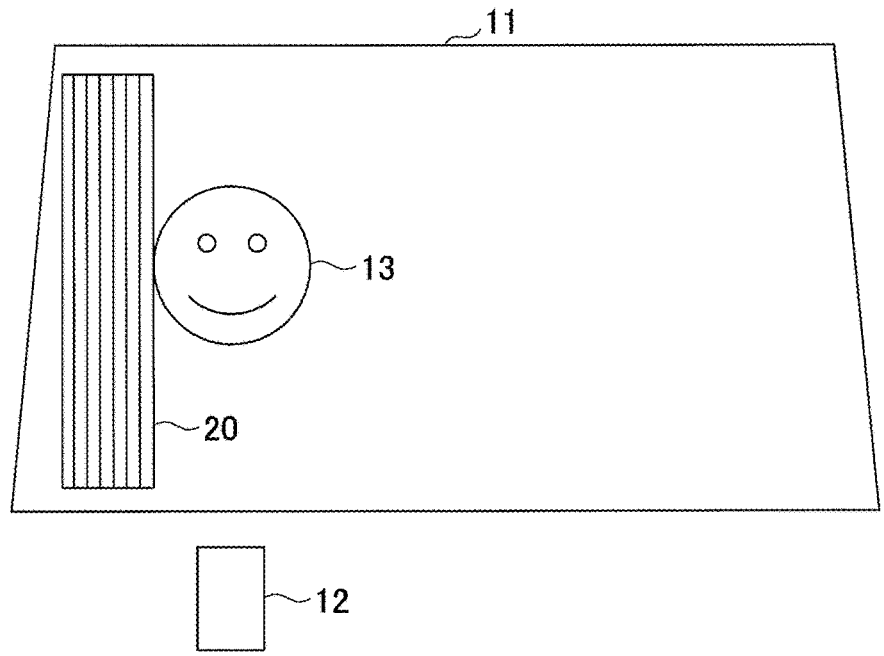
FIG. 32 is a drawing illustrating still another example of a positional relationship between a transparent screen of an image projection-laminated plate, a projector, and an observer, as seen from a front side of a vehicle.

FIG. 32 is a drawing illustrating still another example of a positional relationship, as seen from a front side of a vehicle, between a transparent screen of an image projection-laminated plate, a projector, and an observer. The image projection-laminated plate 11 is attached to a window at a front of a vehicle. The transparent screen 20 is provided at an end of the window in the vehicle-width direction. The projector 12 is arranged below the window. The eyes of the observer 13 are positioned at the central portion of the window in the vertical direction. In this case, as illustrated in FIG. 32, a plurality of reflective inclined surfaces 45 may form an elongated vertical stripe extending in the vertical direction. The observer 13 can observe a bright image at a position where no hotspot is observed.

In FIG. 30 to FIG. 32, the projector 12 may be provided at an upper portion of the window. In FIG. 30 to FIG. 32, the transparent screen 20 may be provided at a central portion of the window. The window on which the transparent screen 20 is provided need not be a front window, but may be, for example, a side window, a rear window, a roof window, or the like. When the window on which the transparent screen 20 is provided is a side window, the projector 12 may be provided around a window frame of the side window (for example, around a side door or a handrail). The projector 12 is provided in the car. A transparent screen may be provided in the combiner instead of the window. The combiner is provided between the front window and the driver's seat. Also in these cases, there is an arrangement in which the observer 13 can observe a bright image at a position where the observer 13 does not observe a hotspot.

(Method for Producing the Transparent Screen)

Figure 33:
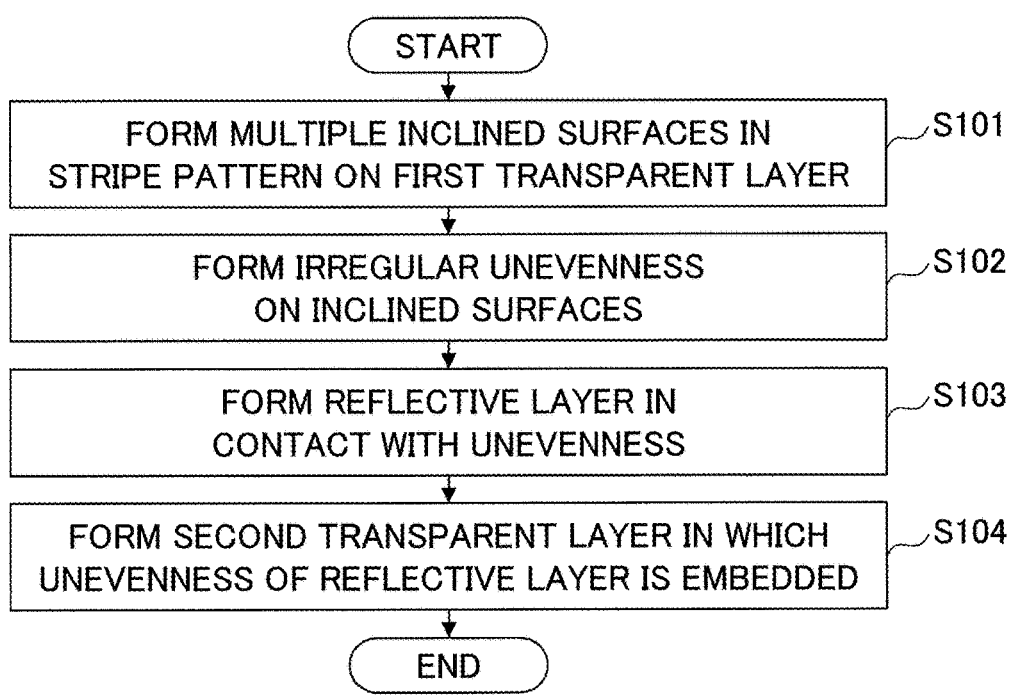
FIG. 33 is a flowchart illustrating a method for producing a transparent screen according to an embodiment.

FIG. 33 is a flowchart illustrating a method for producing the transparent screen according to an embodiment. As illustrated in FIG. 33, the method for producing the transparent screen includes a step S101 for forming a plurality of inclined surfaces 42 in a first transparent layer 32 in a stripe pattern, a step S102 for forming unevenness on each of the plurality of inclined surfaces 42, a step S103 for forming a reflective layers 34 in contact with the unevenness, and a step S104 for forming a second transparent layer 35 in which the unevenness of the reflective layer 34 is embedded.

FIG. 34 is a drawing illustrating an example of a step for forming, in a stripe pattern, a plurality of inclined surfaces on a first transparent layer. In step S101, on an opposite surface of the first transparent layer 32 from the reference surface 41, a plurality of inclined surfaces 42 inclined with respect to the reference surface 41 are formed into a stripe pattern as seen from the direction normal to the reference surface 41. An embossing method is used as the method for forming the inclined surfaces 42, as illustrated in FIG. 34, for example.

The embossing method is a method of transferring an unevenness pattern of a mold 60 to the first transparent layer 32. The embossing method includes an imprint method. The imprinting method is a method in which a resin material to be made into a first transparent layer 32 is sandwiched between the mold 60 and a base material sheet 31, and the unevenness pattern of the mold 60 is transferred to the resin material, and the resin material is solidified.

In the present specification, solidification involves hardening. The method of solidification is appropriately selected according to the type of resin material. The type of resin material may be any of light curable resin, thermoplastic resin, and thermosetting resin. The light curable resin cures when irradiated with light. The thermoplastic resin melts when heated and solidifies when cooled. The thermosetting resin changes from liquid to solid with heat. These resin materials may be applied to the base material sheet 31 or the mold 60 in a liquid state. The coating method is not particularly limited, but for example, a spray coating method, a spin coating method, a gravure coating method, or the like is used.

It should be noted that a cutting method may be used instead of the imprint method. The cutting method is a method of cutting the first transparent layer 32 with a cutting tool. The cutting tool may be a generally-available cutting tool.

FIG. 35 is a drawing illustrating an example of a step for forming unevenness on inclined surfaces of a first transparent layer. As a method of forming unevenness on the inclined surfaces 42, for example, a film forming method in which a coating solution is applied to the inclined surface 42, and a coating film of the coating solution is dried and solidified is used. An example of a method of forming unevenness on the inclined surfaces 42 includes a film forming method in which a coating solution is applied to the inclined surfaces 42, and a coating film of the coating solution is dried and solidified. The coating liquid includes the particles 37 and the matrix 38, and may further include a solvent that dissolves the matrix 38. The method for applying the coating liquid is not particularly limited, but for example, a spray coating method, a spin coating method, a gravure coating method, or the like is used.

FIG. 36 is a drawing illustrating an example of a step for forming a reflective layer. As a method of forming the reflective layer 34, for example, a vacuum evaporation method or a sputtering method is used. The reflective layer 34 is formed along the unevenness of the unevenness layer 33.

FIG. 37 is a drawing illustrating an example of a step for forming a second transparent layer. The second transparent layer 35 is obtained by sandwiching a resin material to be the second transparent layer 35 between the reflective layer 34 and the protective sheet 36 and solidifying the resin material.

It should be noted that, as illustrated in FIG. 1 and FIG. 2, the transparent screen 20 according to the present embodiment includes a first transparent layer 32, an unevenness layer 33, a reflective layer 34, and a second transparent layer 35, which are arranged from the rear side to the front side in this order, but they may be arranged in an opposite order. More specifically, the transparent screen 20 may include the second transparent layer 35, the reflective layer 34, the unevenness layer 33, and the first transparent layer 32, which are arranged from the rear side to the front side in this order. In the reflective layer 34, a contact surface in contact with the unevenness layer 33 and a contact surface in contact with the second transparent layer 35 have the same shape. Therefore, in the reflective layer 34, light of a projected image may be reflected by any of the contact surface in contact with the unevenness layer 33 and the contact surface in contact with the second transparent layer 35.

(Modification and Improvement)

Hereinabove, although the embodiment such as the transparent screen has been described, the present invention is not limited to the embodiment and the like described above, and various modifications and improvements are possible within the scope of the gist of the present invention described in the claims.

Figure 38:
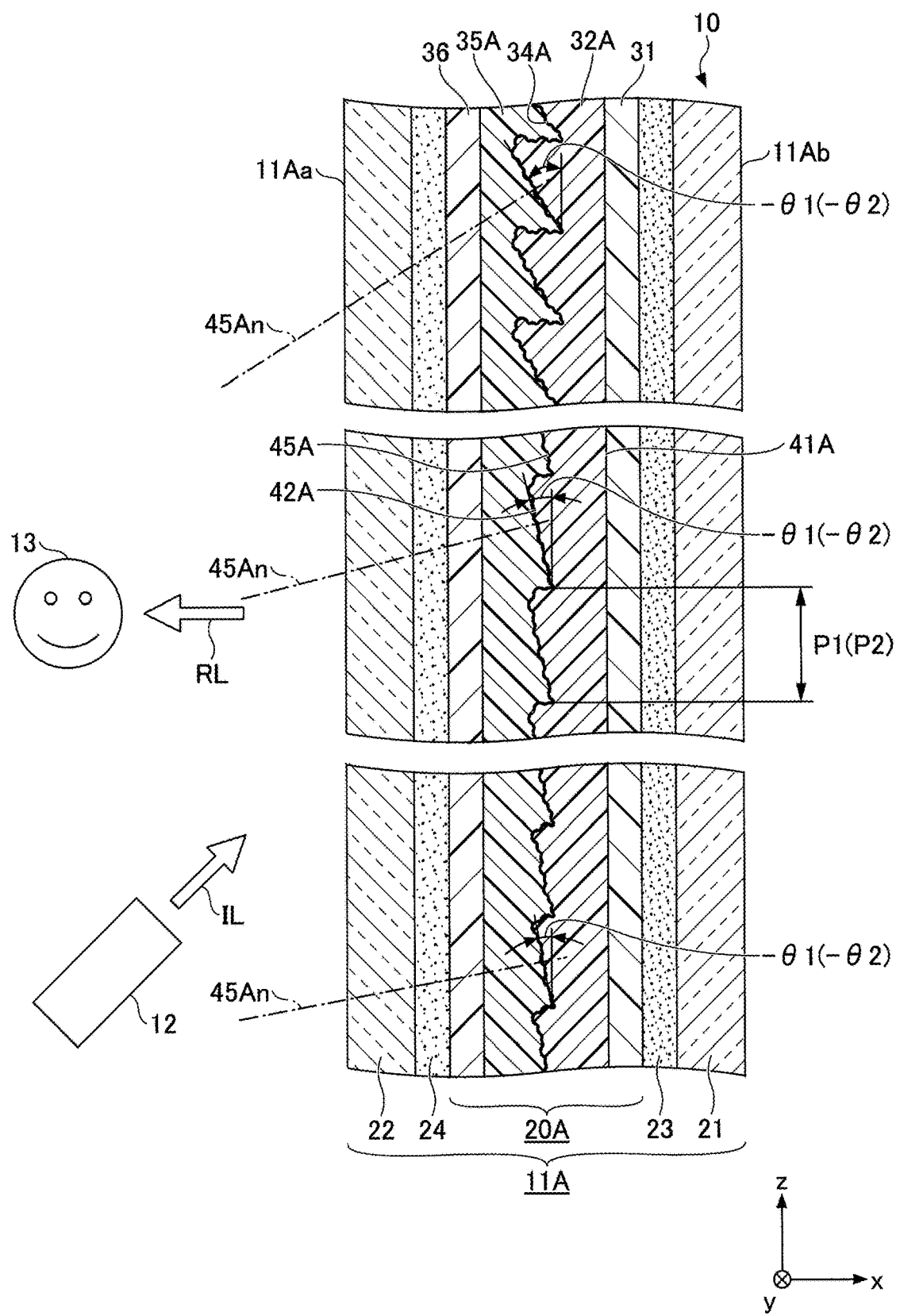
FIG. 38 is a drawing illustrating an image display system according to a modification.
Figure 39:
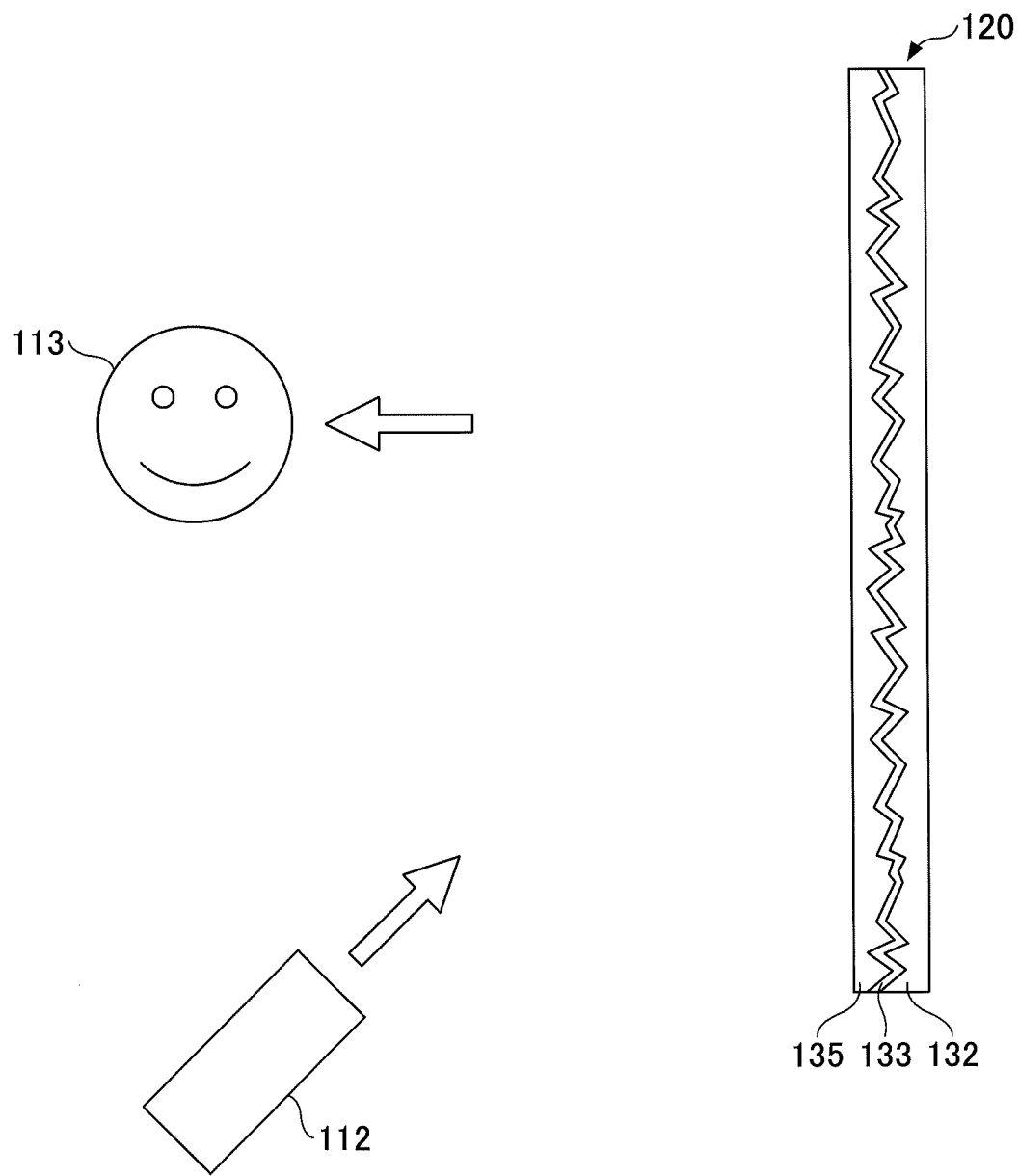
FIG. 39 is a drawing illustrating a conventional transparent screen.

FIG. 38 is a drawing illustrating an image display system according to a modification. An image display system 10A according to the present modification is different from the image display system 10 according to the above embodiment in that the image display system 10A includes a transparent screen 20A. Hereinafter, the difference will be mainly explained.

The transparent screen 20A according to the present modification is different from the transparent screen 20 according to the above embodiment in that the unevenness layer 33 as illustrated in FIG. 2 and the like is not provided between the first transparent layer 32A and the reflective layer 34A, and the reflective layer 34A is in contact with the first transparent layer 32A. The image projection-laminated plate 11A is constituted by the transparent screen 20A, the first transparent plate 21, and the second transparent plate 22.

The first transparent layer 32A includes a plurality of inclined surfaces 42A inclined with respect to the reference surface 41A. The plurality of inclined surfaces 42A are formed in a stripe pattern, as seen from the direction normal to the reference surface 41A. Each of the inclined surfaces 42A includes unevenness. As a method of forming unevenness on the inclined surfaces 42A, for example, an etching method and an imprint method are used.

The etching method is a method in which the inclined surface 42A formed by a stamping method, a cutting method, or the like is etched to form unevenness on the inclined surface 42A. The etching method may be a physical etching method or a chemical etching method.

The physical etching method includes a blast method. The blast method may be either a dry blast method or a wet blast method. In the case of the dry blast method, unevenness is formed on the inclined surface 42A by spraying particles on the inclined surface 42A. As the particles, for example, alumina particles, silicon carbide particles, zircon particles, and the like are used. In the case of wet blasting, unevenness is formed on the inclined surface 42A by spraying a mixed fluid of particles and liquid on the inclined surface 42A.

As illustrated in FIG. 38, in at least a part of the image projection area in a section perpendicular to the y direction, the plurality of inclined surfaces 42A are formed so that the inclination angles θ1 of the inclined surfaces 42A, measured for each of the respective inclined surfaces 42A, decrease, in a stepwise manner or continuously, away from one end in the z direction (for example, the lower end) toward another end in the z direction (for example, the upper end). For example, an inclination angle θ1 (negative value) of the uppermost inclined surface 42A in FIG. 38 is less than an inclination angle θ1 (negative value) of the lowermost inclined surface 42A in FIG. 38. The inclination angles θ1 of the inclined surfaces 42A may change only in a negative range, may change only in a positive range, and may change over both the negative range and the positive range.

A pitch P1 of the inclined surface 42A in the z direction is, for example, 15 μm or more, preferably 20 μm or more. When the pitch P1 of the inclined surface 42A in the z direction is 15 μm or more, the exit angle of a diffracted light with the highest intensity among diffracted lights can be reduced, and it is less likely to recognize a double image of an image as a ghost. The pitch P1 of the inclined surface 42A in the z direction is 300 μm or less. When the pitch P1 of the inclined surface 42A in the z direction is 300 μm or less, the stripes of the inclined surfaces 42A are so narrow that they cannot be seen from the observer 13.

Like the pitch P2 of the reflective inclined surface 45A in the z direction explained later, the pitch P1 of the inclined surface 42A in the z direction may have irregularity. Therefore, diffraction of light passing through the transparent screen 20 from the rear side to the front side can be reduced, and background scenery is less likely to appear double.

The reflective layer 34A includes a plurality of reflective inclined surfaces 45A inclined with respect to the reference surface 41A and reflect light of a projected image. The plurality of reflective inclined surfaces 45A are formed in a stripe pattern as seen from the direction normal to the reference surface 41A.

For example, the reflective layer 34A has a thickness of 5 nm or more and 5000 nm or less, and is formed along the unevenness of the inclined surface 42A. Therefore, each of the reflective inclined surfaces 45A has unevenness. The unevenness of the reflective layer 34A is embedded in the second transparent layer 35A.

As illustrated in FIG. 38, in at least a part of the image projection area in a section perpendicular to the y direction, the plurality of reflective inclined surfaces 45A are formed so that the inclination angles θ2 of the reflective inclined surfaces 45A, measured on for each of the respective reflective inclined surfaces 45A, decrease, in a stepwise manner or continuously, away from one end in the z direction (for example, the lower end) to another end in the z direction (for example, the upper end). For example, the inclination angle θ2 (negative value) of the uppermost reflective inclined surface 45A in FIG. 38 is less than the inclination angle θ2 (negative value) of the lowermost reflective inclined surface 45A in FIG. 38. At the plurality of reflective inclined surfaces 45A located at different positions in the z direction, a light with the highest intensity among diffusely reflected lights can be directed to the observer 13. Therefore, a difference between brightness of an image-central portion and brightness of an image outer peripheral portion can be reduced, and a direction in which the entire image can be observed brightly can be produced. The inclination angles θ2 of the reflective inclined surfaces 45A may change only in a negative range, may change only in a positive range, and may change over both the negative range and the positive range.

In at least a part of the image projection area in a section perpendicular to the y direction, the reflective inclined surfaces 45 may be formed to satisfy an expression of $θ2=(α'+β')/2$. In this case, a light with the highest intensity among lights diffusely reflected by the reflective inclined surface 45 can be directed to the observer 13. Therefore, a difference between brightness of an image-central portion and brightness of an image outer peripheral portion can be reduced, and a direction in which the entire image can be observed brightly can be produced.

As illustrated in FIG. 38, in at least a part of the image projection area in a section perpendicular to the y direction, the plurality of reflective inclined surfaces 45A may be formed to have normals 45An approaching each other in accordance with being further toward a front direction away from the transparent screen 20A. Accordingly, a direction in which the entire image can be observed brightly can be produced. It should be noted that the directions of the normals 45An of the reflective inclined surfaces 45A can be expressed as θ2+90 degrees or θ2−90 degrees.

The pitch P2 of the reflective inclined surface 45A in the z direction is, for example, 15 μm or more, preferably 20 μm or more. When the pitch P2 of the reflective inclined surface 45A in the z direction is 15 μm or more, the exit angle of a diffracted light with the highest intensity among diffracted lights can be reduced, which makes it less likely that a double image of an image is seen as a ghost. The pitch P2 of the reflective inclined surface 45A in the z direction is 300 μm or less. When the pitch P2 of the reflective inclined surface 45A in the z direction is 300 μm or less, the stripes of the reflective inclined surface 45A are so narrow that they cannot be seen from the observer 13. The pitch P2 of the reflective inclined surface 45A in the z direction and the pitch P1 of the inclined surface 42A in the z direction are substantially the same between the reflective inclined surface 45A and the inclined surface 42A which are at the same z direction position.

The pitch P2 of the reflective inclined surface 45A in the z direction may have irregularity in order to reduce a diffraction of the background-transmitted light reduced by reducing a periodic change in the transmittance of background-transmitted light in the z direction. Therefore, the diffraction of the background-transmitted light can be reduced, and background scenery is less likely to appear double.

According to the present modification, like the above embodiment, the reflective inclined surface 45A displaying an image is inclined with respect to surfaces causing a hotspot (e.g., a front surface 11Aa and a rear surface 11Ab). As a result, a direction in which a hotspot is observed and a direction in which a bright image is observed can be separated from each other, and a position at which a hotspot is not observed but at which a bright image is observed (for example, the position of the observer 13 as illustrated in FIG. 38) can be produced.

In addition, according to the present modification, like the above embodiment, the plurality of reflective inclined surfaces 45A are formed so that, in at least a part of the image projection area, to which an image is projected, in a section perpendicular to the y direction, the inclination angles θ2 of the reflective inclined surfaces 45A, measured on a per-respective reflective inclined surface basis 45A, decrease, in a stepwise manner or continuously, away from one end in the z direction (for example, the lower end) to another end in the z direction (for example, the upper end). Therefore, at the plurality of reflective inclined surfaces 45A located at different positions in the z direction, a light with the highest intensity among diffusely reflected lights can be directed to the observer 13. Therefore, a difference between brightness of an image-central portion and brightness of an image outer peripheral portion can be reduced, and a direction in which the entire image can be observed brightly can be produced.

In the above embodiment and the above modification, the resin layer is used as the first transparent layers 32, 32A. Alternatively, a glass layer may be used instead. As a method of forming a plurality of inclined surfaces in a stripe pattern on a glass layer, for example, an embossing method is used. The embossing method is a method of transferring an unevenness pattern of a mold to a glass layer softened at a high temperature.

The embossing method is a method of transferring an unevenness pattern of a mold 60 to the first transparent layer 32. The first transparent plate 21 may be used as the first transparent layers 32, 32A. When the first transparent plate 21 is a glass plate, bending and embossing may be performed simultaneously by press molding.

When the first transparent plate 21 is used as the first transparent layer 32, the unevenness layer 33 and the reflective layer 34 are formed on the first transparent plate 21. When the first transparent plate 21 is used as the first transparent layer 32A, the reflective layer 34A is formed on the first transparent plate 21.

The second adhesive layer 24 may be used as the second transparent layers 35, 35A, and the second transparent plate 22 may be used instead of the protective sheet 36.

In the above embodiment and the above modification, the step of forming the plurality of inclined surfaces 42 into a stripe pattern and the step of forming unevenness on the inclined surfaces 42 are performed in this order, but may be performed simultaneously. For example, in the case of the embossing method, when the unevenness pattern surface of the mold 60 is roughened by etching in advance, these steps can be performed simultaneously.

The image projection-laminated plates 11, 11A and the like may further have a functional layer (not shown). Examples of functional layers include a light reflection prevention layer that reduces light reflection, a light attenuation layer that attenuates a part of light, and an infrared shielding layer that suppresses transmission of infrared light. Further, examples of functional layers include a functional layer such as a vibration layer that functions as a speaker that vibrates in response to application of a voltage and a sound insulation layer that reduces sound transmission. The number of functional layers and the positions of the function layers are not particularly limited.

This application claims priority based on Japanese Patent Application No. 2017-205634 filed with the Japan Patent Office on Oct. 24, 2017, and the entire content of Japanese Patent Application No. 2017-205634 is incorporated herein by reference.

What is claimed is:

1. A transparent screen including a first transparent layer, a reflective layer configured to reflect light of a projected image, and a second transparent layer disposed at an opposite side of the reflective layer from the first transparent layer, the transparent screen allowing background scenery to be seen,
wherein when an opposite surface of the first transparent layer from the reflective layer is defined as a reference surface, the reflective layer includes a plurality of reflective inclined surfaces inclined with respect to the reference surface and reflecting light of the image,
the plurality of reflective inclined surfaces have unevenness, and are formed in a stripe pattern as seen from a direction normal to the reference surface,
the direction normal to the reference surface is defined as a first direction, a direction which is perpendicular to the first direction and in which each of the plurality of reflective inclined surfaces extend as seen from the first direction is defined as a second direction, and a direction which is perpendicular to the first direction and the second direction and in which the plurality of reflective inclined surfaces are arranged side by side is defined as a third direction, and
in at least a part of an image projection area, to which the image is projected, in a section perpendicular to the second direction, the plurality of reflective inclined surfaces are formed so that inclination angles of the plurality of reflective inclined surfaces, measured on a per-reflective inclined surface basis, decrease, in a stepwise manner or continuously, away from one end in the third direction toward another end in the third direction, and the plurality of reflective inclined surfaces are formed to have irregular pitches in the third direction.

2. The transparent screen according to claim 1, wherein in the section the light of the image projected from a projector is incident on a front surface of the transparent screen at a first incidence angle $\alpha$ and refracted at the front surface at a first refraction angle $\alpha'$, and subsequently, the light is reflected by one of the plurality of reflective inclined surfaces inclined at an inclination angle $\theta$ with respect to the reference surface, and subsequently, the light is incident on the front surface of the transparent screen at a second incidence angle $\beta'$ and is refracted at the front surface at a second refraction angle $\alpha$, and thereafter the light enters eyes of an observer,
in the section in which the front surface of the transparent screen faces a left-hand side, and each of the first incidence angle $\alpha$, the first refraction angle $\alpha'$, the second incidence angle $\beta'$, the second refraction angle $\beta$, and the inclination angle $\theta$ is defined as positive in a clockwise direction, and is defined as negative in a counterclockwise direction,
in the section, the plurality of reflective inclined surfaces are formed so that an expression $\theta=(\alpha'+\beta')/2$ is satisfied in the at least part of the image projection area.

3. The transparent screen according to claim 1, wherein in the at least part of the image projection area in the section, the plurality of reflective inclined surfaces are formed to have normals approaching each other in accordance with being further toward a front direction away from the transparent screen.

4. The transparent screen according to claim 1, wherein the first transparent layer has a plurality of inclined surfaces inclined with respect to the reference surface,
the plurality of inclined surfaces are formed in a stripe pattern as seen in the direction normal to the reference surface,
in the at least part of the image projection area in the section, the plurality of inclined surfaces are formed so that inclination angles of the plurality of inclined surfaces, measured on a per-reflective inclined surface basis, decrease, in the stepwise manner or continuously, away from the one end in the third direction toward the another end in the third direction, the transparent screen further comprises, between the first transparent layer and the reflective layer, an unevenness layer for forming unevenness on the plurality of inclined surfaces of the first transparent layer,
the unevenness layer includes particles and a matrix, and has unevenness on a surface in contact with the reflective layer, and
the plurality of reflective inclined surfaces are formed along the unevenness of the unevenness layer.

5. The transparent screen according to claim 1, wherein the first transparent layer has a plurality of inclined surfaces inclined with respect to the reference surface,
each of the plurality of inclined surfaces has unevenness, and the plurality of inclined surfaces are formed in a stripe pattern as seen in the direction normal to the reference surface,
in the at least part of the image projection area in the section, the plurality of inclined surfaces are formed so that inclination angles of the plurality of inclined surfaces, measured on a per-inclined surface basis, decrease, in a stepwise manner or continuously, away from the one end in the third direction toward another end in the third direction, and
the plurality of reflective inclined surfaces are formed along the unevenness of the unevenness layer.

6. The transparent screen according to claim 1, wherein in the section, a ratio (PV1/P2) of a maximum height difference (PV1) in the first direction of the plurality of reflective inclined surfaces to a pitch (P2) in the third direction of the plurality of reflective inclined surfaces is 0.6 or less.

7. The transparent screen according to claim 1, wherein the reflective layer includes at least one of a metal layer and a dielectric layer.

8. The transparent screen according to claim 1, wherein a haze of the transparent screen is 10% or less.

9. An image projection-laminated plate comprising:
the transparent screen according to claim 1;
a first transparent plate disposed at one side of the transparent screen; and
a second transparent plate disposed at another side of the transparent screen.

10. The image projection-laminated plate according to claim 9, wherein the image projection-laminated plate is used as a window for a vehicle.

11. An image display system comprising:
the transparent screen according to claim 1; and
a projector configured to project an image onto the transparent screen.

12. A method for producing a transparent screen including a first transparent layer, a reflective layer configured to reflect light of a projected image, and a second transparent layer disposed at an opposite side of the reflective layer from the first transparent layer, the transparent screen allowing background scenery to be seen,
wherein an opposite surface of the first transparent layer from the reflective layer is defined as a reference surface,
the method comprising:
forming, in a stripe pattern as seen from a direction normal to the reference surface, a plurality of inclined surfaces, inclined with respect to the reference surface, on an opposite surface of the first transparent layer from the reference surface;
forming unevenness on each of the plurality of inclined surfaces;
forming the reflective layer in contact with the unevenness and forming the second transparent layer in which unevenness of the reflective layer is embedded,
wherein the direction normal to the reference surface is defined as a first direction a direction which is perpendicular to the first direction and in which each of the plurality of inclined surfaces extend as seen from the first direction is defined as a second direction, and a direction which is perpendicular to the first direction and the second direction and in which the plurality of inclined surfaces are arranged side by side is defined as a third direction,
the method further comprising:
forming, in at least a part of an image projection area, to which the image is projected, in a section perpendicular to the second direction, the plurality of inclined surfaces so that inclination angles of the plurality of inclined surfaces, measured on a per-reflective inclined surface basis, decrease, in a stepwise manner or continuously, away from one end in the third direction toward another end in the third direction, and pitches in the third direction of the plurality of inclined surfaces are irregular.

13. The method for producing the transparent screen according to claim 12, wherein in the section, the light of the image projected from a projector is incident on a front surface of the transparent screen at a first incidence angle α and is refracted at the front surface at a first refraction angle α', subsequently, the light is reflected by one of the plurality of inclined surfaces inclined at an inclination angle θ with respect to the reference surface, and subsequently, the light is incident on the front surface of the transparent screen at a second incidence angle β' and is refracted at the front surface at a second refraction angle β, and thereafter the light enters eyes of an observer,
the section in which the front surface of the transparent screen faces a left-hand side, each of the first incidence angle α, the first refraction angle α', the second incidence angle β', the second refraction angle β, and the inclination angle θ is defined as positive in a clockwise direction, and is defined as negative in a counterclockwise direction,
in the at least part of the image projection area in the section, the plurality of inclined surfaces are formed so that an expression θ=(α'+β')/2 is satisfied.

14. The method for producing the transparent screen according to claim 12, wherein in the at least part of the image projection area in the section, the plurality of inclined surfaces are formed to have normals approaching each other in accordance with being further toward a front direction away from the transparent screen.

15. The method for producing the transparent screen according to claim 12, wherein the forming of unevenness on each of the plurality of inclined surfaces comprises a film forming method in which a liquid containing particles and matrix is applied the inclined surfaces and dried.

16. The method for producing the transparent screen according to claim 12, wherein the forming of unevenness on each of the plurality of inclined surfaces comprises an etching method for etching the inclined surfaces.

17. The method for producing the transparent screen according to claim 12, wherein the forming of the plurality of inclined surfaces comprises an embossing method in which an unevenness pattern of a mold is transferred to the first transparent layer.

18. The method for producing the transparent screen according to claim 12, wherein the forming of the plurality of inclined surfaces comprises a cutting method in which the first transparent layer s cut with a cutting tool.

* * * * *